(12) United States Patent
Wang et al.

(10) Patent No.: US 12,323,807 B2
(45) Date of Patent: Jun. 3, 2025

(54) METHOD FOR MUTUAL RECOGNITION OR MUTUAL TRUST BETWEEN BLUETOOTH DEVICES

(71) Applicant: HUAWEI TECHNOLOGIES CO., LTD., Shenzhen (CN)

(72) Inventors: Sishan Wang, Beijing (CN); Ya Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 469 days.

(21) Appl. No.: 17/633,793

(22) PCT Filed: Aug. 6, 2020

(86) PCT No.: PCT/CN2020/107464
§ 371 (c)(1),
(2) Date: Feb. 8, 2022

(87) PCT Pub. No.: WO2021/027686
PCT Pub. Date: Feb. 18, 2021

(65) Prior Publication Data
US 2022/0330029 A1 Oct. 13, 2022

(30) Foreign Application Priority Data
Aug. 9, 2019 (CN) .......................... 201910736534.3

(51) Int. Cl.
*H04W 12/50* (2021.01)
*H04W 12/0471* (2021.01)
(Continued)

(52) U.S. Cl.
CPC ....... *H04W 12/50* (2021.01); *H04W 12/0471* (2021.01); *H04W 12/069* (2021.01); *H04W 12/71* (2021.01)

(58) Field of Classification Search
CPC . H04W 12/50; H04W 12/0471; H04W 12/71; H04W 12/069
See application file for complete search history.

(56) References Cited

U.S. PATENT DOCUMENTS 10,299,300 B1 * 5/2019 Young ...................... H04R 3/12
2007/0123166 A1 5/2007 Sheynman et al.
(Continued)

FOREIGN PATENT DOCUMENTS

| CN | 103942963 A | 7/2014 |
|---|---|---|
| CN | 104410968 A | 3/2015 |

(Continued)

OTHER PUBLICATIONS

Hager et al., "An analysis of Bluetooth security vulnerabilities," 2003 IEEE Wireless Communications and Networking, 2003. WCNC 2003., New Orleans, LA, USA, 2003, pp. 1825-1831 vol.3, doi: 10.1109/WCNC.2003.1200664. (Year: 2003).*
(Continued)

*Primary Examiner* — Peter C Shaw
(74) *Attorney, Agent, or Firm* — HAUPTMAN HAM, LLP

(57) ABSTRACT

A method includes receiving, by a first Bluetooth device, an identity resolving key (IRK) from a server, and generating a resolvable private address based on the IRK. The method further includes sending, by the first Bluetooth device, a broadcast message. The broadcast message includes the resolvable private address. The resolvable private address is successfully verified by a second Bluetooth device preconfigured with the IRK.

17 Claims, 28 Drawing Sheets

```
┌─────────────────────────────────────────────────────────┐
│ A first Bluetooth device receives an identity resolving │── S201
│ key IRK sent by a server, and generates a resolvable    │
│ private address by using the IRK                        │
└─────────────────────────────────────────────────────────┘
                          │
                          ▼
┌─────────────────────────────────────────────────────────┐
│ The first Bluetooth device sends a broadcast message    │── S202
│ that carries the resolvable private address, where the  │
│ resolvable private address can be successfully verified │
│ by a second Bluetooth device pre-configured with a      │
│ same IRK                                                │
└─────────────────────────────────────────────────────────┘
                          │
                          ▼
┌─────────────────────────────────────────────────────────┐
│ The first Bluetooth device receives a scan request sent │── S301
│ by the second Bluetooth device after the resolvable     │
│ private address is successfully verified, and feeds     │
│ back an answer that carries a unique identifier based   │
│ on the scan request, where the answer is used to        │
│ indicate the second Bluetooth device to upload the      │
│ identifier to the server and initiate user identity     │
│ authentication in the server                            │
└─────────────────────────────────────────────────────────┘
```

(51) Int. Cl.
*H04W 12/069* (2021.01)
*H04W 12/71* (2021.01)

(56) References Cited

U.S. PATENT DOCUMENTS

| | | | | |
|---|---|---|---|---|
| 2013/0259230 | A1* | 10/2013 | Polo | H04L 63/0272 |
| | | | | 380/270 |
| 2014/0105396 | A1* | 4/2014 | Engelien-Lopes | H04W 12/04 |
| | | | | 380/270 |
| 2016/0309323 | A1 | 10/2016 | Zarakas et al. | |
| 2018/0198752 | A1 | 7/2018 | Zhang et al. | |
| 2019/0098494 | A1* | 3/2019 | Pry | H04W 12/068 |
| 2019/0108324 | A1* | 4/2019 | Graube | H04L 63/0861 |
| 2019/0356485 | A1* | 11/2019 | Young | H04L 9/3242 |
| 2021/0044971 | A1* | 2/2021 | Pandey | H04W 4/80 |

FOREIGN PATENT DOCUMENTS

| | | | | |
|---|---|---|---|---|
| CN | 105046754 | A | | 11/2015 |
| CN | 103270707 | B | | 2/2016 |
| CN | 105430760 | A | | 3/2016 |
| CN | 105991164 | A | | 10/2016 |
| CN | 106211159 | A | | 12/2016 |
| CN | 107038777 | A | | 8/2017 |
| CN | 107197429 | A | | 9/2017 |
| CN | 107317606 | A * | 11/2017 | H04B 5/0025 |
| CN | 107454558 | A | | 12/2017 |
| CN | 108769973 | A | | 11/2018 |
| CN | 108900490 | A | | 11/2018 |
| CN | 108990055 | A | | 12/2018 |
| CN | 109413624 | A | | 3/2019 |
| CN | 110084022 | A | | 8/2019 |
| CN | 112351390 | A * | 2/2021 | H04L 61/5038 |
| EP | 2720404 | A1 | | 4/2014 |
| WO | WO2017171745 | * | 10/2017 | H04W 12/06 |
| WO | WO-2018088952 | A1 * | 5/2018 | |
| WO | 2018197737 | A1 | | 11/2018 |
| WO | WO2018197737 | * | 11/2018 | H04L 29/08 |
| WO | WO2019007172 | * | 1/2019 | H04B 5/00 |

OTHER PUBLICATIONS

Mondal et al., "Architecture of Bluetooth Security for Pairing Key and Better Authentication," 2021 5th International Conference on Information Systems and Computer Networks (ISCON), Mathura, India, 2021, pp. 1-6, doi: 10.1109/ISCON52037.2021.9702335. (Year: 2021).*

Extended European Search Report issued in corresponding European Application No. 20851914.0, dated Aug. 19, 2022, pp. 1-9.

* cited by examiner

METHOD FOR MUTUAL RECOGNITION OR MUTUAL TRUST BETWEEN BLUETOOTH DEVICES

This application is a National Stage of International Application No. PCT/CN2020/107464, filed on Aug. 6, 2020, which claims priority to Chinese Patent Application No. 201910736534.3, filed on Aug. 9, 2019, both of which are hereby incorporated by reference in their entireties.

TECHNICAL FIELD

This application relates to the field of communications technologies, and in particular, to a method for mutual recognition or mutual trust between Bluetooth devices.

BACKGROUND

Bluetooth, as a radio technology that supports short-range communication between devices, can be used for wireless information exchange between terminal devices such as a mobile phone, a tablet computer, a wireless headset, and a laptop computer. The Bluetooth technology can be used to effectively simplify communication between mobile communications terminal devices, and successfully simplify communication between a terminal device and the Internet (Internet), so that data is transmitted more rapidly and efficiently, and a path for wireless communication is widened.

Currently, for example, in a facial recognition payment scenario based on a mobile phone and a facial recognition machine, a user manually enters a mobile phone number during facial recognition payment to complete user identity authentication. For another example, in a scenario in which a digital car key is shared based on a mobile phone and a car, after a car owner successfully verifies a terminal device of a friend, the friend manually performs an operation on the terminal device to implement a Bluetooth connection between the terminal device of the friend and the car. As a result, user operations are complex and efficiency is low in the two scenarios.

SUMMARY

One or more embodiments of this application provide a method for mutual recognition or mutual trust between Bluetooth devices, to resolve problems that user operations are complex and efficiency is low in the related technology.

According to a first aspect, at least an embodiment of this application provides a method for mutual recognition between Bluetooth devices.

In a possible implementation of the first aspect, a same IRK is configured in at least two Bluetooth devices. When one of the Bluetooth devices generates a resolvable private address by using the IRK sent by a server, and sends a broadcast message that carries the resolvable private address. The other Bluetooth device holding the same IRK can successfully verify the resolvable private address carried in the broadcast message.

In the technical solution, the resolvable private address is successfully verified, and the Bluetooth devices holding the same IRK are screened out. This implements a technical effect of mutual recognition between the Bluetooth devices without an active operation of a user, and resolves a technical problem that user operations are complex. In addition, because the Bluetooth devices holding the same IRK are screened out, an object range for collecting information can be narrowed. This greatly protects user privacy, and improves data security.

According to a second aspect, at least an embodiment of this application provides a method for mutual trust between Bluetooth devices.

In a possible implementation of the second aspect, a first Bluetooth device sends, to a server, a Bluetooth address of a terminal of a second Bluetooth device that is verified successfully. The server sends Bluetooth binding information to the second Bluetooth device and a third Bluetooth device, so that a Bluetooth binding relationship is established between the second Bluetooth device and the third Bluetooth device.

In a possible implementation of the second aspect, a server obtains a Bluetooth address of a terminal of a second Bluetooth device, and the server verifies the second Bluetooth device. When the verification succeeds, the server sends Bluetooth binding information to the second Bluetooth device and a third Bluetooth device, so that a Bluetooth binding relationship is established between the second Bluetooth device and the third Bluetooth device.

In the technical solution, the server configures the Bluetooth binding information of each other in the two Bluetooth devices, so that a secure Bluetooth connection can be established between the two Bluetooth devices when one of the Bluetooth devices requests the other designated Bluetooth device to establish the connection. This resolves a technical problem that user operations are complex, and implements a technical effect of mutual trust between the Bluetooth devices without an active operation of a user.

According to a third aspect, at least an embodiment of this application provides an apparatus for mutual recognition between Bluetooth devices.

In a possible implementation of the third aspect, the apparatus for mutual recognition between Bluetooth devices is configured in a first Bluetooth device. The apparatus includes:
 a generation module, configured to receive an identity resolving key IRK sent by a server, and generate a resolvable private address by using the IRK; and
 a broadcast module, configured to send a broadcast message, where the broadcast message carries the resolvable private address, and the resolvable private address can be successfully verified by a second Bluetooth device pre-configured with a same IRK.

In some embodiments, the apparatus further includes:
 an IRK receiving module, configured to send a service subscription request to the server, where the service subscription request is used to indicate the server to send the IRK to the first Bluetooth device.

In some embodiments, the apparatus further includes:
 a feedback answer module, configured to receive a scan request sent by the second Bluetooth device after the resolvable private address is successfully verified, and feed back an answer based on the scan request, where the answer carries an identifier of the first Bluetooth device, and the answer is used to indicate the second Bluetooth device to upload the identifier to the server and initiate user identity authentication in the server.

In some embodiments, the apparatus further includes:
 a Bluetooth connection establishment module, configured to receive a Bluetooth connection request sent by the second Bluetooth device after the resolvable private address is successfully verified, where the first Bluetooth device establishes a Bluetooth connection to the second Bluetooth device; and an identifier sending module, configured to send an identifier to the second Bluetooth device through the Bluetooth connection, where the identifier is used to indicate the second Bluetooth device to upload the identifier to the server and initiate user identity authentication in the server.

In some embodiments, the broadcast message further carries an identifier of the first Bluetooth device; and the broadcast module is specifically configured to:

send the broadcast message, where the broadcast message carries the resolvable private address and the identifier, and the broadcast message is used to indicate the second Bluetooth device to upload the identifier to the server after the resolvable private address is successfully verified.

In some embodiments, the apparatus further includes:

a user identity information upload module, configured to upload user identity information to the server; and a response information receiving module, configured to receive response information returned by the second Bluetooth device after the resolvable private address is successfully verified, where the response message includes an identifier; and the first Bluetooth device uploads the identifier to the server, where the identifier is used to indicate the server to complete user identity authentication based on the user identity information and the identifier.

In some embodiments, the apparatus further includes:

a user identity information upload module, configured to upload user identity information to the server;

a Bluetooth connection establishment module, configured to receive a Bluetooth connection request sent by the second Bluetooth device after the resolvable private address is successfully verified, where the first Bluetooth device establishes a Bluetooth connection to the second Bluetooth device; and an identifier receiving upload module, configured to receive, through the Bluetooth connection, an identifier sent by the second Bluetooth device, and upload the identifier to the server, where the identifier is used to indicate the server to complete user identity authentication based on the user identity information and the identifier.

In some embodiments, that the identifier is uploaded to the server includes:

The first Bluetooth device positions all second Bluetooth devices that send the identifier to the first Bluetooth device, and uploads the identifier of a second Bluetooth device closest to the first Bluetooth device to the server.

In some embodiments, the apparatus further includes:

an authentication result receiving module, configured to receive an authentication result generated when the server completes the user identity authentication.

In some embodiments, the identifier includes at least one of a Bluetooth address of a terminal and a user identifier.

In a possible implementation of the third aspect, the apparatus for mutual recognition between Bluetooth devices is configured in a second Bluetooth device. The second Bluetooth device is pre-configured with an identity resolving key IRK that is the same as an IRK in a first Bluetooth device. The apparatus includes:

a parsing module, configured to successfully verify a resolvable private address by using the pre-configured IRK when a broadcast message sent by the first Bluetooth device is scanned, where the broadcast message carries the resolvable private address, and the resolvable private address is generated by the first Bluetooth device by using the IRK sent by a server.

In some embodiments, the IRK in the first Bluetooth device is sent by the server to the first Bluetooth device when the server receives a service subscription request sent by the first Bluetooth device.

In some embodiments, the apparatus further includes:

a user identity information upload module, configured to upload user identity information to the server;

an answer receiving module, configured to send a scan request to the first Bluetooth device after the resolvable private address is successfully verified, receive an answer fed back by the first Bluetooth device based on the scan request, where the answer carries an identifier of the first Bluetooth device; and the second Bluetooth device uploads the identifier to the server, where the identifier is used to indicate the server to complete user identity authentication based on the user identity information and the identifier.

In some embodiments, the apparatus further includes:

a user identity information upload module, configured to upload user identity information to the server;

a Bluetooth connection establishment module, configured to send a Bluetooth connection request after the resolvable private address is successfully verified, where the second Bluetooth device establishes a Bluetooth connection to the first Bluetooth device; and an identifier receiving and upload module, configured to receive, through the Bluetooth connection, an identifier sent by the first Bluetooth device, and upload the identifier to the server, where the identifier is used to indicate the server to complete user identity authentication based on the user identity information and the identifier.

In some embodiments, the apparatus further includes: a user identity information upload module, where the user identity information upload module is configured to upload user identity information to the server, and the broadcast message further carries an identifier of the first Bluetooth device; and the parsing module is further configured to:

after the resolvable private address is successfully verified, obtain the identifier of the first Bluetooth device, and upload the identifier to the server, where the identifier is used to indicate the server to complete user identity authentication based on the user identity information and the identifier.

In some embodiments, that the identifier is uploaded to the server includes:

The second Bluetooth device positions all first Bluetooth devices that send the identifier to the second Bluetooth device, and uploads the identifier of a first Bluetooth device closest to the second Bluetooth device to the server.

In some embodiments, the apparatus further includes:

an authentication result receiving module, configured to receive an authentication result generated when the server completes the user identity authentication.

In some embodiments, the apparatus further includes:

a response information returning module, configured to return response information to the first Bluetooth device after the resolvable private address is successfully verified, where the response information includes an identifier of the second Bluetooth device, and the response message is used to indicate the first Bluetooth device to upload the identifier to the server and initiate user identity authentication in the server.

In some embodiments, the apparatus further includes:
a Bluetooth connection establishment module, configured to send a Bluetooth connection request to the first Bluetooth device after the resolvable private address is successfully verified, where the second Bluetooth device establishes a Bluetooth connection to the first Bluetooth device; and
an identifier sending module, configured to send an identifier to the first Bluetooth device through the Bluetooth connection, where the identifier is used to indicate the first Bluetooth device to upload the identifier to the server and initiate user identity authentication in the server.

In some embodiments, the identifier includes at least one of a Bluetooth address of a terminal and a user identifier.

In a possible implementation of the third aspect, the apparatus for mutual recognition between Bluetooth devices is configured in a server. The apparatus includes:
a request receiving module, configured to receive a service subscription request sent by a first Bluetooth device; and
an IRK sending module, configured to send an identity resolving key IRK to the first Bluetooth device based on the service subscription request, where the IRK is used to indicate the first Bluetooth device to generate a resolvable private address by using the IRK and send a broadcast message, the broadcast message carries the resolvable private address, and the resolvable private address can be successfully verified by a second Bluetooth device pre-configured with a same IRK.

In some embodiments, the apparatus further includes:
an association storage module, configured to store an identifier of the first Bluetooth device in association with user account information, where the identifier includes at least one of a Bluetooth address of a terminal of the first Bluetooth device and a user identifier.

In some embodiments, the apparatus further includes:
an identity authentication module, configured to receive user identity information and the identifier of the first Bluetooth device that are sent by the second Bluetooth device, and complete user identity authentication based on the user identity information and the identifier.

In some embodiments, the apparatus further includes: a Bluetooth binding information sending module, configured to generate Bluetooth binding information, and send the Bluetooth binding information to the first Bluetooth device and the second Bluetooth device, where the Bluetooth binding information is used for Bluetooth binding between the first Bluetooth device and the second Bluetooth device.

In some embodiments, the Bluetooth binding information includes a Bluetooth communication key link key, a Bluetooth address of a terminal of the first Bluetooth device, and a Bluetooth address of a terminal of the second Bluetooth device, and the link key is a Bluetooth communication key for Bluetooth communication between the first Bluetooth device and the second Bluetooth device.

In some embodiments, the apparatus further includes:
a user identifier sending module, configured to generate a user identifier of the first Bluetooth device, store the user identifier in association with user account information, and send the user identifier to the first Bluetooth device;
a service identifier sending module, configured to obtain a service identifier, and send the service identifier to the first Bluetooth device; or
a link key sending module, configured to obtain a Bluetooth communication key link key, and send the link key to the first Bluetooth device, where the link key is a Bluetooth communication key between the first Bluetooth device and the second Bluetooth device.

According to a fourth aspect, at least an embodiment of this application provides an apparatus for mutual trust between Bluetooth devices.

In a possible implementation of the fourth aspect, the apparatus for mutual trust between Bluetooth devices is configured in a first Bluetooth device. The apparatus includes:
an obtaining module, configured to obtain a Bluetooth address of a terminal of a second Bluetooth device; and
a sending module, configured to send verification success information to a server after the second Bluetooth device is verified successfully, where the verification success information includes the Bluetooth address of the terminal, the verification success information is used to indicate the server to send Bluetooth binding information to the second Bluetooth device and a third Bluetooth device, and the Bluetooth binding information is used for Bluetooth binding between the second Bluetooth device and the third Bluetooth device.

In some embodiments, the verification success information further includes an identity resolving key IRK, and the IRK is generated when the first Bluetooth device and the third Bluetooth device perform Bluetooth pairing and is configured on the first Bluetooth device and the third Bluetooth device; and
the verification success information is further used to indicate the server to send the IRK to the second Bluetooth device, the IRK is used to indicate the second Bluetooth device or the third Bluetooth device to generate a resolvable private address and send a broadcast message, and the broadcast message carries the resolvable private address.

In some embodiments, the verification success information is further used to indicate the server to generate and send an identity resolving key IRK to the second Bluetooth device and the third Bluetooth device, the IRK is used to indicate the second Bluetooth device or the third Bluetooth device to generate a resolvable private address and send a broadcast message, and the broadcast message carries the resolvable private address.

In a possible implementation of the fourth aspect, the apparatus for mutual trust between Bluetooth devices is configured in a second Bluetooth device. The apparatus includes:
a sending module, configured to send a Bluetooth address of a terminal of the second Bluetooth device to a first Bluetooth device, where the Bluetooth address of the terminal is used to indicate the first Bluetooth device to send verification success information to a server after the second Bluetooth device is successfully verified, and the verification success information carries the Bluetooth address of the terminal; and
a receiving module, configured to receive Bluetooth binding information sent by the server based on the verification success information, and configure the Bluetooth binding information, where the Bluetooth binding information is used for Bluetooth binding between the second Bluetooth device and a third Bluetooth device, and the third Bluetooth device is a device that completes mutual authentication with the first Bluetooth device.

In a possible implementation of the fourth aspect, the apparatus for mutual trust between Bluetooth devices is configured in a server. The apparatus includes:

a receiving module, configured to receive verification success information sent by a first Bluetooth device, where the verification success information includes a Bluetooth address of a terminal of a second Bluetooth device, and the verification success information is generated after the first Bluetooth device successfully verifies the second Bluetooth device and is sent to the server; and a Bluetooth binding information sending module, configured to send Bluetooth binding information to the second Bluetooth device and a third Bluetooth device based on the verification success information, and the Bluetooth binding information is used for Bluetooth binding between the second Bluetooth device and the third Bluetooth device.

In some embodiments, the apparatus further includes: an IRK sending module, configured to generate and send an identity resolving key IRK to the second Bluetooth device and the third Bluetooth device, where the IRK is used to indicate the second Bluetooth device or the third Bluetooth device to generate a resolvable private address and send a broadcast message, and the broadcast message carries the resolvable private address; or configured to send, when the verification success information further includes an IRK in the first terminal device, the IRK to the second Bluetooth device, where the IRK is used to indicate the second Bluetooth device or the third Bluetooth device to generate a resolvable private address and send a broadcast message, the broadcast message carries the resolvable private address, and the IRK is generated when the first Bluetooth device and the third Bluetooth device perform Bluetooth pairing and is configured on the first Bluetooth device and the third Bluetooth device.

In some embodiments, the Bluetooth binding information includes a Bluetooth address of a terminal of the second Bluetooth device, a Bluetooth address of a terminal of the third Bluetooth device, and a Bluetooth communication key link key, and the link key is used for encryption and decryption of Bluetooth communication between the second Bluetooth device and the third Bluetooth device.

In some embodiments, the Bluetooth binding information includes a Bluetooth address of a terminal of the second Bluetooth device, a Bluetooth address of a terminal of the third Bluetooth device, and a Bluetooth communication key link key seed, and the link key seed is used by the second Bluetooth device and the third Bluetooth device to generate a Bluetooth communication key link key.

According to a fifth aspect, at least an embodiment of this application provides a terminal device, including a Bluetooth module, a memory, a processor, and a computer program that is stored in the memory and can be run on the processor. When executing the computer program, the processor implements the method applied to the terminal device in the first aspect or the second aspect.

According to a sixth aspect, at least an embodiment of this application provides a server, including a memory, a processor, and a computer program that is stored in the memory and can be run on the processor. When executing the computer program, the processor implements the method applied to the server in the first aspect or the second aspect.

According to a seventh aspect, at least an embodiment of this application provides a computer-readable storage medium. The computer-readable storage medium stores a computer program. When the computer program is executed by a processor, the method according to the first aspect or the second aspect is implemented.

According to an eighth aspect, at least an embodiment of this application provides a computer program product. When the computer program product runs on a terminal device, the terminal device is enabled to perform the method according to any one of the first aspect or the second aspect.

DESCRIPTION OF EMBODIMENTS

Figure 1:
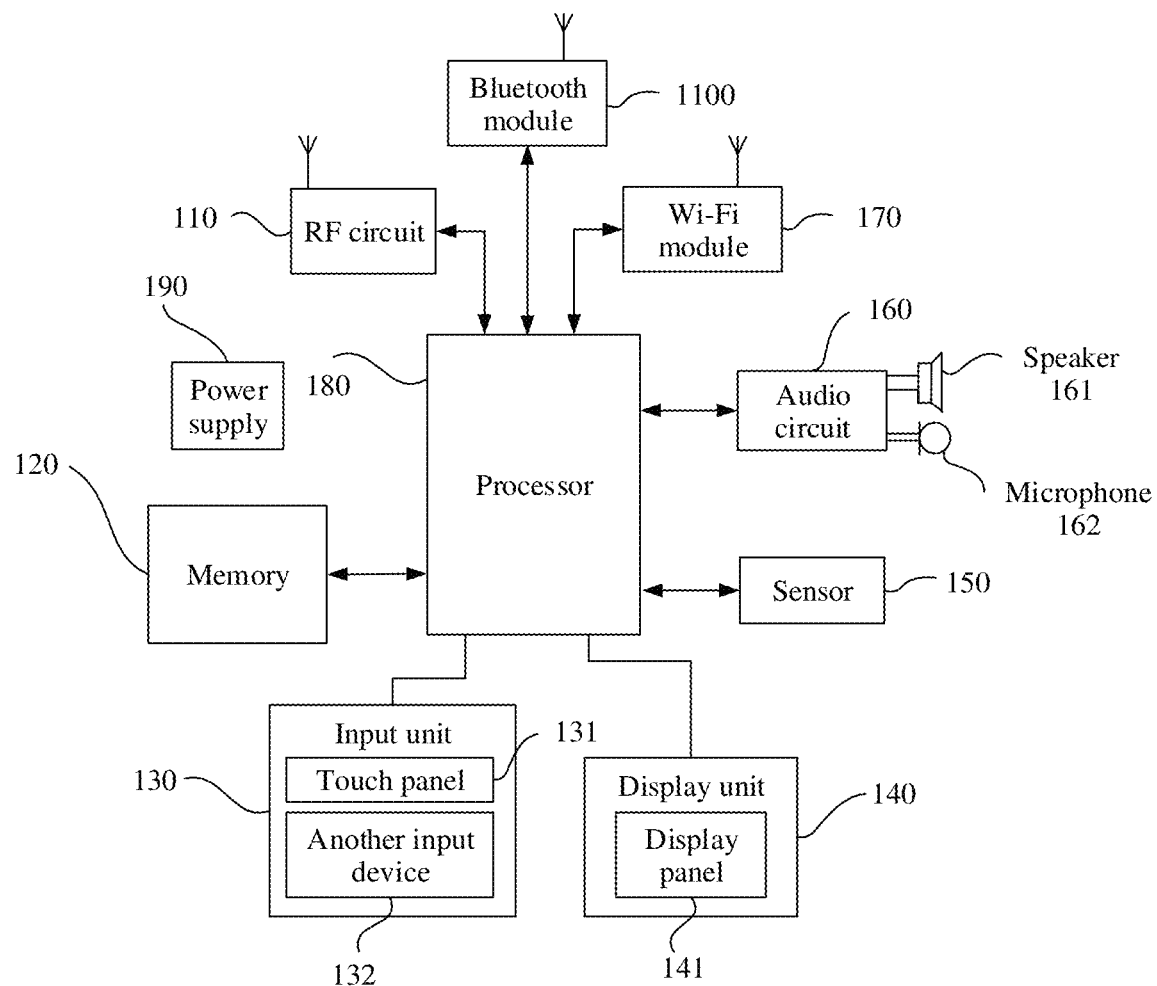
FIG. 1 is a schematic diagram of a structure of a mobile phone to which a method for mutual recognition or mutual trust between Bluetooth devices is applied according to at least an embodiment of this application.

In the following description, to illustrate rather than limit, specific details such as a particular system structure, and a technology are provided to make a thorough understanding of embodiments of this application. However, persons skilled in the art should know that this application may be implemented in other embodiments without these specific details. In other cases, detailed descriptions of well-known systems, apparatuses, circuits, and methods are omitted, so that this application is described without being obscured by unnecessary details.

Terms used in the following embodiments are merely intended to describe specific embodiments, but are not intended to limit this application. Terms "one", "a", "the", "the foregoing", "this", and "the one" of singular forms used in this specification and the appended claims of this application are also intended to include forms like "one or more", unless otherwise specified in the context clearly. It should be further understood that, in the embodiments of this application, "one or more" means one, two, or more.

It should be noted that, in terms in the specification, claims, and accompanying drawings of this application, descriptions involving "first" or "second" are only used to distinguish similar objects, and cannot be understood as indicating or implying relative importance thereof or implicitly indicating a quantity of indicated technical features. That is, these descriptions do not necessarily indicate a specific order or sequence. In addition, it should be understood that these descriptions are interchangeable in an appropriate circumstance, so as to describe the embodiments of this application.

A method for mutual recognition or mutual trust between Bluetooth devices provided in the embodiments of this application may be applied to a terminal device, such as a mobile phone, a tablet computer, a wearable device, a vehicle-mounted device, a facial recognition machine, an intelligent lock/gate, an augmented reality (AR) device/a virtual reality (VR) device, a notebook computer, an ultra-mobile personal computer (UMPC), a netbook, a personal digital assistant (PDA), a server, or a cloud server. A specific type of the terminal device is not limited in the embodiments of this application.

For example, the terminal device may be a station (ST) in a WLAN, and may be a cellular phone, a cordless phone, a session initiation protocol (SIP) phone, a wireless local loop (WLL) station, a PDA, a handheld device with a wireless communication function, a computing device or other processing device connected to a wireless modem, a vehicle-mounted device, an internet of vehicle terminal, a computer, a laptop computer, a handheld communications device, a handheld computing device, a satellite wireless device, a wireless modem card, a television set-top box (STB), a customer premise equipment (CPE), or another device for communicating over a wireless system, and a next-generation communications system, for example, a mobile terminal in a 5G network, or a mobile terminal in a future evolved public land mobile network (PLMN).

By way of example and not limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is a hardware device, and implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and work with other devices such as smartphones, such as various smart bands or smart jewelry for monitoring physical signs.

For example, the terminal device is a mobile phone. FIG. 1 is a block diagram of a partial structure of the mobile phone according to at least an embodiment of this application. Refer to FIG. 1. The mobile phone includes components, such as a radio frequency (RF) circuit 110, a memory 120, an input unit 130, a display unit 140, a sensor 150, an audio circuit 160, a wireless fidelity (Wi-Fi) module 170, a processor 180, a power supply 190, and a Bluetooth module 1100. Persons skilled in the art may understand that the structure of the mobile phone shown in FIG. 1 does not constitute a limitation on the mobile phone. The mobile phone may include more or fewer components than those shown in the figure, may include a combination of some components, or may include different component arrangements.

The following describes each component of the mobile phone in detail with reference to FIG. 1.

The RF circuit 110 may be configured to receive and send a signal in an information receiving or sending process or a call process. Particularly, after receiving downlink information from a base station, the RF circuit sends the downlink information to the processor 180 for processing, and sends designed uplink data to the base station. The RF circuit usually includes but is not limited to an antenna, at least one amplifier, a transceiver, a coupler, a low noise amplifier (LNA), a duplexer, and the like. In addition, the RF circuit 110 may further communicate with a network and another device through wireless communication. Any communication standard or protocol may be used in the wireless communication, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 120 may be configured to store a software program and a module. The processor 180 performs various functional applications and data processing of the mobile phone by running the software program and the module that are stored in the memory 120. The memory 120 may mainly include a program storage area and a data storage area. The program storage area may store an operating system, an application (such as a sound playing function or an image playing function) that is required by at least one function, a boot loader (Boot Loader), and the like. The data storage area may store data (such as audio data or a phone book) that is created based on use of the mobile phone, and the like. In addition, the memory 120 may include a high-speed random access memory, or may include a nonvolatile memory, such as at least one magnetic disk storage component, a flash memory component, or another volatile solid-state storage component. It may be understood that, in this embodiment of this application, the memory 120 stores a program for mutual recognition or mutual trust between Bluetooth devices.

The input unit 130 may be configured to: receive entered digit or character information, and generate a button signal input related to user setting and function control of the mobile phone 100. Specifically, the input unit 130 may include a touch panel 131 and another input device 132. The touch panel 131, also referred to as a touchscreen, may collect a touch operation performed by a user on or near the touch panel 131 (for example, an operation performed by the user on or near the touch panel 131 by using any appropriate object or accessory such as a finger or a stylus), and drives a corresponding connection apparatus according to a preset program. In some embodiments, the touch panel 131 may include two parts: a touch detection apparatus and a touch controller. The touch detection apparatus detects a touch location of the user, detects a signal brought by a touch operation, and sends the signal to the touch controller. The touch controller receives touch information from the touch detection apparatus, converts the touch information into touch point coordinates, sends the touch point coordinates to the processor 180, and can receive and execute a command sent by the processor 180. In addition, the touch panel 131 may be implemented in a plurality of types, such as a resistive type, a capacitive type, an infrared type, and a surface acoustic wave type. In addition to the touch panel 131, the input unit 130 may further include the another input device 132. Specifically, the another input device 132 may include but is not limited to one or more of a physical keyboard, a function button (such as a volume control button or a power on/off button), a trackball, a mouse, a joystick, and the like.

The display unit 140 may be configured to display information entered by the user or information provided for the user, and various menus of the mobile phone. The display unit 140 may include a display panel 141. In some embodiments, the display panel 141 may be configured by using a liquid crystal display (LCD), an organic light-emitting diode (OLED), or the like. Further, the touch panel 131 may cover the display panel 141. After detecting the touch operation on or near the touch panel 131, the touch panel 131 transmits the touch operation to the processor 180 to determine a type of a touch event, and then the processor 180 provides a corresponding visual output on the display panel 141 based on the type of the touch event. Although, in FIG. 1, the touch panel 131 and the display panel 141 are used as two separate parts to implement input and output functions of the mobile phone, the touch panel 131 and the display panel 141 may be integrated to implement the input and output functions of the mobile phone in some embodiments.

The mobile phone 100 may further include at least one type of sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 or backlight when the mobile phone moves to an ear. As a type of the motion sensor, an acceleration sensor may detect a value of an acceleration in each direction (generally, three axes), may detect a value and a direction of gravity in a static state, and may be used in an application for identifying a posture (such as screen switching between landscape and portrait modes, a related game, or magnetometer posture calibration) of the mobile phone, a function related to vibration identification (such as a pedometer or a knock), and the like. For another sensor such as a gyroscope, a barometer, a hygrometer, a thermometer, or an infrared sensor that may be further disposed on the mobile phone, details are not described herein.

The audio circuit 160, a speaker 161, and a microphone 162 may provide an audio interface between the user and the mobile phone. The audio circuit 160 may convert received audio data into an electrical signal, and transmit the electrical signal to the speaker 161, and the speaker 161 converts the electrical signal into a sound signal for output. In addition, the microphone 162 converts a collected sound signal into an electrical signal. The audio circuit 160 receives the electrical signal, converts the electrical signal into audio data, and then outputs the audio data to the processor 180 for processing. The processor sends the audio data to, for example, another mobile phone by using the RF circuit 110, or outputs the audio data to the memory 120 for further processing.

Wi-Fi belongs to a short-range wireless transmission technology. The mobile phone may help, by using the Wi-Fi module 170, the user to receive and send an email, browse a web page, access streaming media, and the like. The Wi-Fi module provides wireless broadband Internet access for the user. Although FIG. 1 shows the Wi-Fi module 170, it may be understood that the Wi-Fi module 170 is not a mandatory part of the mobile phone 100, and can be omitted according to a requirement without changing the present disclosure.

The processor 180 is a control center of the mobile phone, connects various parts of the entire mobile phone through various interfaces and lines, and executes various functions of the mobile phone and processes data by running or executing the software program and a module stored in the memory 120 and invoking the data stored in the memory 120, to perform overall monitoring on the mobile phone. In some embodiments, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the modem processor may be not integrated into the processor 180. It may be understood that, in this embodiment of this application, the memory 120 stores the program for mutual recognition or mutual trust between Bluetooth devices, and the processor 180 may be configured to invoke and execute the program for mutual recognition or mutual trust between Bluetooth devices stored in the memory 120, to implement the method for mutual recognition or mutual trust between Bluetooth devices in the embodiments of this application.

The mobile phone 100 further includes the power supply 190 (such as a battery) that supplies power to each component. Preferably, the power supply may be logically connected to the processor 180 by using a power supply management system, thereby implementing functions such as charging management, discharging management, and power consumption management by using the power supply management system.

A Bluetooth technology belongs to a short-range wireless transmission technology. The mobile phone may establish, by using the Bluetooth module 1100, a Bluetooth connection to another terminal device having a Bluetooth module, so as to transmit data through the Bluetooth communication link. The Bluetooth module 1100 may be Bluetooth low energy (Bluetooth Low Energy, BLE) or a classic Bluetooth module according to an actual requirement. It may be understood that in this embodiment of this application, when a terminal device is a user terminal and a service machine, the terminal device includes the Bluetooth module. However, it may be understood that the Bluetooth module is not a mandatory component of the terminal device, and may be completely omitted according to a requirement without changing the present disclosure. For example, a server may not include the Bluetooth module.

Although not shown, the mobile phone 100 may further include a camera. In some embodiments, the camera on the mobile phone 100 may be a front-facing camera, rear-facing camera, or built-in camera (which may extend out of the body when being used). This is not limited in this embodiment of this application.

In some embodiments, the mobile phone 100 may include a single camera, dual-camera, triple-lens camera, or the like. This is not limited in this embodiment of this application. The camera includes but is not limited to a wide-angle camera, a long-focus camera, a depth camera, or the like.

For example, the mobile phone 100 may include a triple-lens camera, where one is a primary camera, one is a wide-angle camera, and one is a long-focus camera.

In some embodiments, when the mobile phone 100 includes a plurality of cameras, all of the plurality of cameras may be front-facing cameras, rear-facing cameras, built-in cameras, at least some front-facing cameras, at least some rear-facing cameras, at least some built-in cameras, or the like. This is not limited in this embodiment of this application.

Embodiment 1

Figure 2A:
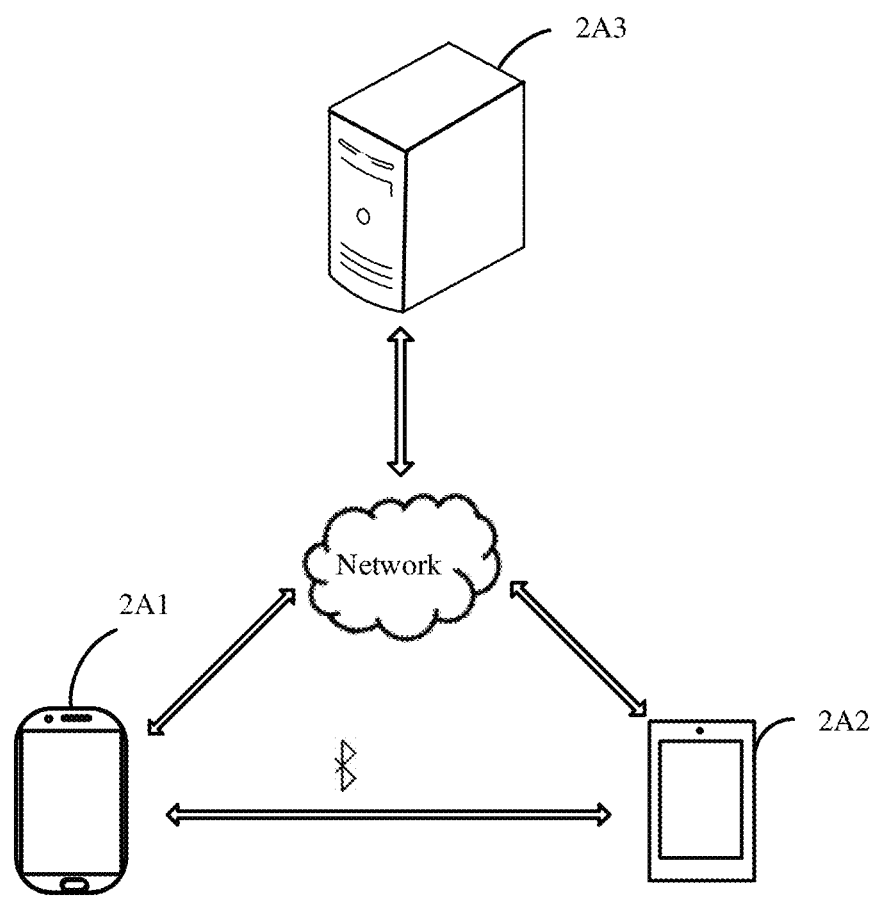
FIG. 2A is a schematic diagram of an application scenario of a method for mutual recognition between Bluetooth devices according to at least an embodiment of this application.

FIG. 2A is a schematic diagram of an application scenario of a method for mutual recognition between Bluetooth devices according to at least an embodiment of this application. The application scenario relates to a mobile phone 2A1, a facial recognition machine 2A2, and a server 2A3. The mobile phone 2A1 and the facial recognition machine 2A2 each include a Bluetooth module, and can exchange data through a Bluetooth broadcast message channel and a communication channel. The mobile phone 2A1 and the facial recognition machine 2A2 each exchange data with the server 2A3 through a network. It should be noted that, in another application scenario, the mobile phone may alternatively be another user terminal, including but not limited to a tablet computer, a wearable device, an AR device/a VR device, a notebook computer, an UMPC, a netbook, a PDA, and the like. The facial recognition machine may alternatively be another service machine, including but not limited to an intelligent lock/gate, a vehicle-mounted device, and the like.

Figure 2B:
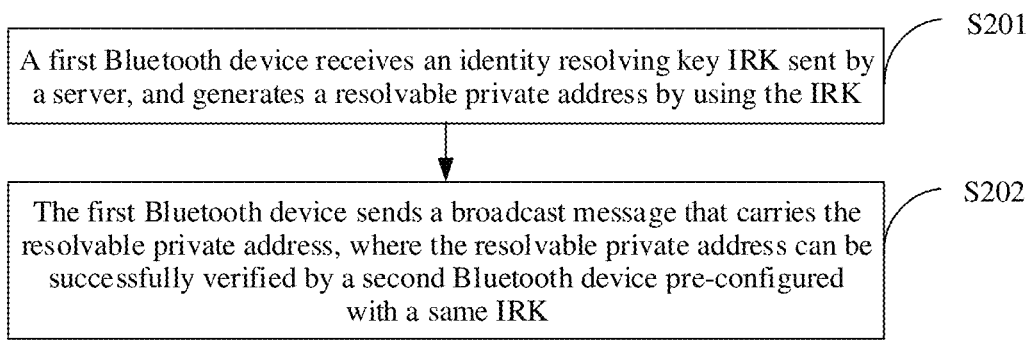
FIG. 2B is a schematic flowchart of a method for mutual recognition between Bluetooth devices according to at least an embodiment of this application.

FIG. 2B is a schematic flowchart of a method for mutual recognition between Bluetooth devices according to this application. The method is applied to a first Bluetooth device, and the first Bluetooth device may be a user terminal or a service machine. For example, the first Bluetooth device may be the mobile phone or the facial recognition machine in the application scenario shown in FIG. 2A. When the first Bluetooth device is the mobile phone, a second Bluetooth device is a facial recognition machine. When the first Bluetooth device is the facial recognition machine, a second Bluetooth device is a mobile phone. In the method for mutual recognition between the Bluetooth devices shown in FIG. 2B, a specific implementation principle of each step is as follows:

S201: The first Bluetooth device receives an identity resolving key IRK sent by a server, and generates a resolvable private address by using the IRK.

The first Bluetooth device is a terminal device including a Bluetooth module.

A Bluetooth address includes a public device address (Public Device Address) and a random device address (Random Device Address). The random device address is classified into a static random address (Static Device Address) and a private random address (Private Device Address). The private random address may further be classified into a non-resolvable private address (Non-resolvable Private Address) and a resolvable private address (Resolvable Private Address) based on whether the address is encrypted. The resolvable private address improves reliability and security of the Bluetooth address in two methods: periodic update and address encryption.

After being powered on, the Bluetooth module generates the resolvable private address by using the identity resolving key (IRK) sent by the server.

For example, the resolvable private address is generated by using a random number prand and the IRK. The random number may be generated by using code, or may be generated by using a random number generator, and usually occupies 24 bits (bits). The resolvable private address usually occupies 48 bits. The most significant 24 bits are occupied by the random number, and the least significant 24 bits are occupied by hash values. The random number includes two most significant fixed bits and a 22-bit random part. The two most significant fixed bits are "10" and are used to identify an address type, where the most significant bit is 0, and the second most significant bit is 1. The hash value is obtained by performing a hash operation on the random number and the IRK. The operation formula is hash=ah (IRK, prand), where ah is a function that generates a random address. The Bluetooth device may screen, by using the IRK, a broadcast message sent by a Bluetooth device holding a same IRK, or may send, by using the IRK, directional information to a Bluetooth device holding a same IRK.

In a case in which the first Bluetooth device is the user terminal

The IRK in the first Bluetooth device is the IRK sent by the server, and the server may be an application server, for example, a server or a cloud server of a service application such as payment or unlocking. When a user sends a service subscription request to the server by using the first Bluetooth device, the server reviews user account information during registration of the user to determine whether the user has service subscription permission. When the user has the subscription permission, that is, the service subscription request is approved, the server sends the IRK to the first Bluetooth device based on the service subscription request. The first Bluetooth device receives the IRK, registers the IRK with a host host of a Bluetooth module or a Bluetooth chip, and performs Bluetooth broadcast by using the resolvable private address. A second terminal device is preconfigured with an IRK that is the same as that in the first terminal device.

A preset service may be a service based on biometric recognition on a service machine, for example, a payment service or an unlocking service performed based on a fingerprint, a face, a pupil, an iris, or the like. The preset service may be subscribed to based on the fact that the user installs a corresponding application, an applet, or the like on and registers the corresponding application, the applet, or the like with the first terminal device, registers a corresponding service website, or the like. In the following embodiments, for ease of description, descriptions are provided by using the service application as an example.

It should be noted that, in an example of another application, the IRK may alternatively not come from the server. The IRK may be an IRK pre-registered with the host host of the Bluetooth module or the Bluetooth chip, that is, the IRK is pre-configured in the first Bluetooth device. When the first Bluetooth device sends the service subscription request to the server, for example, a preset service subscription request, and the server receives the service subscription request and approves the service subscription request, the first Bluetooth device activates the IRK, that is, registers the IRK with the host host of the Bluetooth module or the Bluetooth chip of the first Bluetooth device. In this way, the first Bluetooth device can generate the resolvable private address by using the IRK.

In a case in which the first Bluetooth device is the service machine

The IRK in the first Bluetooth device is the IRK sent by the server. After deployment is completed, the first Bluetooth device establishes a communication link with the server. The first Bluetooth device receives the IRK sent by the server. The first Bluetooth device receives the IRK, and registers the IRK with a host of a Bluetooth module or a Bluetooth chip. A second terminal device is also configured with a same IRK.

In an example of another application, the IRK may be an IRK pre-configured in the first Bluetooth device. A manufacturer of a Bluetooth device usually configures the IRK in the first Bluetooth device before delivery, that is, registers the IRK with the host of the Bluetooth module or the Bluetooth chip.

It should be noted that, IRKs corresponding to different service scenarios are usually different, to distinguish between the different service scenarios. Different users may use a same IRK in same service scenarios. The service scenario is not uniquely limited in this embodiment of this application.

It should be further noted that, in the first Bluetooth device and the second Bluetooth device, one of the Bluetooth devices may actively send a broadcast message, and the other Bluetooth device scans (scans) the broadcast message. Therefore, which sends the broadcast message and which scans the broadcast message is not specifically limited in the first Bluetooth device and the second Bluetooth device, and roles of the first Bluetooth device and the second Bluetooth device may be exchanged. Embodiment 1 of this application includes the two possible implementations.

S202: The first Bluetooth device sends the broadcast message, where the broadcast message carries the resolvable private address, and the resolvable private address can be successfully verified by the second Bluetooth device pre-configured with the same IRK.

After generating the resolvable private address by using the IRK, the first Bluetooth device sends the broadcast message that carries the resolvable private address. A Bluetooth module of the second Bluetooth device is configured with the same IRK as that in the first Bluetooth device. Therefore, after scanning the broadcast message from the first Bluetooth device, the second Bluetooth device can successfully verify the resolvable private address after obtaining, through parsing the broadcast message, the resolvable private address carried in the broadcast message. It should be noted that the second terminal device verifies the resolvable private address carried in the broadcast message. The Bluetooth module of the second terminal device enables an address verification function, to verify the resolvable private address.

For example, a host of BLE in the first Bluetooth device actively generates the resolvable private address at a period of T_GAP (private_addr_int), and sends the broadcast message that carries the resolvable private address. A process in which BLE in the second Bluetooth device verifies the resolvable private address is performed at a data link layer (Link layer). The BLE performs hash calculation by using the IRK configured by the BLE and prand in the resolvable private address. If a hash value obtained through calculation is the same as the hash value in the resolvable private address, the BLE successfully verifies the resolvable private address.

In a process in which the first Bluetooth device sends the broadcast message, another terminal device scans the broadcast message. Because the second Bluetooth device is pre-configured with the same IRK as that in the first Bluetooth device, the second Bluetooth device can scan and successfully verify, by using the same IRK, the resolvable private address that is carried in the broadcast message. Based on this, the first Bluetooth device and the second Bluetooth device that were without interaction before implement a process of mutual recognition between the second Bluetooth device and the first Bluetooth device because holding the IRK and parsing broadcast sent by the Bluetooth terminal holding the same IRK.

In a case in which the first Bluetooth device is the user terminal, and the second Bluetooth device is a service machine Because the second Bluetooth device can successfully parse the broadcast message sent by the first terminal device, the second Bluetooth device may determine the resolvable private address from the first terminal device, and further exchange direction data with the first Bluetooth device to complete a procedure of the service such as payment or unlocking.

By way of example and not limitation, the second Bluetooth device may start to scan a nearby Bluetooth device only after a merchant or the user triggers a transaction event on the second Bluetooth device. For example, when a user or a cashier initiates a payment transaction on a facial recognition machine, the facial recognition machine starts to scan another nearby Bluetooth device, and verifies, by using an IRK, a resolvable private address carried in a broadcast message sent by the other device. When the verification succeeds, it indicates that the first Bluetooth device is identified. Subsequently, only information about the first Bluetooth device is reported to a server. The server completes user identity authentication.

In some embodiments, when the second Bluetooth device is the service machine, because the service machine is set for implementing a specific service, the second Bluetooth device may be further set to verify only the carried random private address that is generated by using the IRK, that is, the service machine is configured with only one IRK. This restriction further narrows a scope for collecting information. In some embodiments, a Bluetooth broadcast filter is configured in the service machine to receive only a broadcast message sent through a random private address.

In a case in which the first Bluetooth device is the service machine, and the second Bluetooth device is a user terminal By way of example and not limitation, the first Bluetooth device sends the broadcast message that carries the resolvable private address. The second Bluetooth device may verify the resolvable private address, and when the verification succeeds, determine that a first terminal device is an object with which interaction is to be performed. Based on this, data is exchanged subsequently with the first Bluetooth device to complete the procedure of the service such as payment or unlocking.

In another embodiment of this application, when the merchant or the user triggers the transaction event on the first Bluetooth device, the first Bluetooth device starts to send the broadcast message that carries the resolvable private address, and the second Bluetooth device scans the nearby device. For example, when a user initiates a payment transaction on a facial recognition machine, the facial recognition machine starts to send a broadcast message that carries a resolvable private address. A mobile phone scans a nearby device to verify a resolvable private address in a broadcast message sent by another device. After successfully verifies the resolvable private address, the mobile phone identifies the facial recognition machine, and may send directional information to the facial recognition machine subsequently.

It should be noted that the service application may register a periodic broadcast service with the host host of the Bluetooth module of the first Bluetooth device, and configure dedicated data that is to be carried in the broadcast message. In this embodiment of this application, the dedicated data (the resolvable private address) carried in the broadcast message is configured in the host.

In this embodiment of this application, the same IRK is deployed in the first Bluetooth device and the second Bluetooth device. When the first Bluetooth device generates the resolvable private address by using the IRK, and sends the broadcast message that carries the resolvable private address, the resolvable private address carried in the broadcast message can be successfully verified by the second terminal device. When the second Bluetooth device generates the resolvable private address by using the IRK, and sends the broadcast message that carries the resolvable private address, the resolvable private address carried in the broadcast message can be successfully verified by the first terminal device. The first Bluetooth device and the second Bluetooth device that were without interaction before achieve an effect of mutual recognition between the two Bluetooth terminal devices without an active operation of the user because holding the IRK and verifying the broadcast message sent by the Bluetooth terminal holding the same IRK. On the other hand, because the second Bluetooth device screens out the first Bluetooth device that generates the resolvable private address by using the same IRK, a quantity of nearby Bluetooth devices reported by the second terminal device to the server can be reduced. This avoids a possible problem in which user privacy is infringed, narrows an object range for collecting information, greatly protects user privacy, and improves overall security of a system.

Embodiment 2

Figure 3:
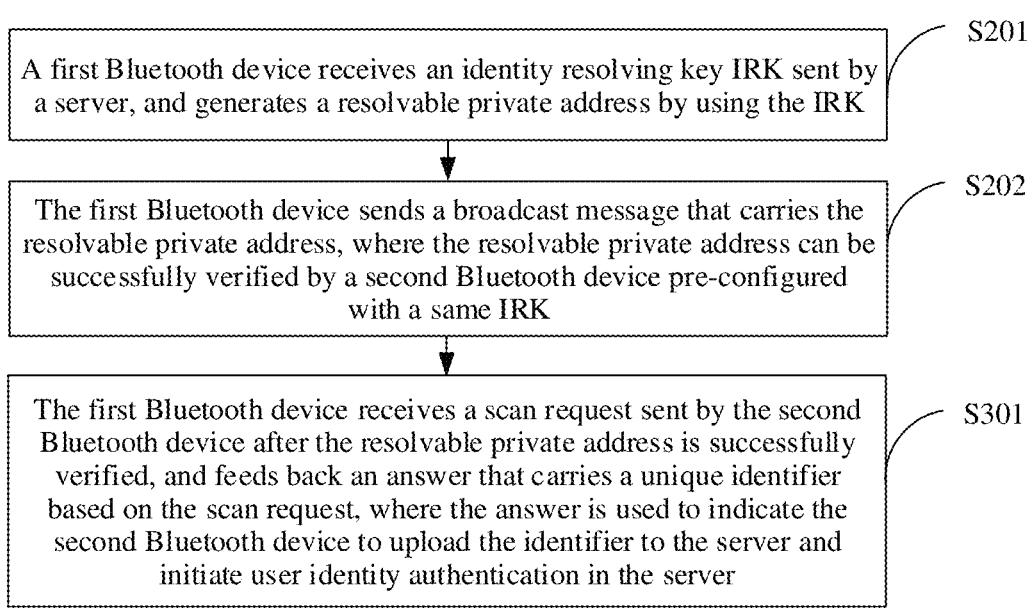
FIG. 3 is a schematic flowchart of another method for mutual recognition between Bluetooth devices according to at least an embodiment of this application.

On the basis of a case in which the first Bluetooth device is the user terminal and the second Bluetooth device is the service machine in the embodiment shown in FIG. 2B, FIG. 3 is a flowchart of an implementation of another method for mutual recognition between Bluetooth devices. As shown in FIG. 3, step 301 is further added after step 202 in the embodiment shown in FIG. 2B. It should be noted that steps that are the same as those in the foregoing embodiment are not described herein again. For details, refer to the foregoing embodiment.

S201: A first Bluetooth device receives an identity resolving key IRK sent by a server, and generates a resolvable private address by using the IRK.

S202: The first Bluetooth device sends a broadcast message, where the broadcast message carries the resolvable private address, and the resolvable private address can be successfully verified by a second Bluetooth device pre-configured with a same IRK.

S301: The first Bluetooth device receives a scan request sent by the second Bluetooth device after the resolvable private address is successfully verified, and feeds back an answer based on the scan request, where the answer carries an identifier of the first Bluetooth device, and the answer is used to indicate the second Bluetooth device to upload the identifier to the server and initiate user identity authentication in the server.

In this embodiment of this application, the second Bluetooth device directionally sends the scan request to a first terminal device after the resolvable private address in the broadcast message from the first terminal device is successfully verified. The first terminal device feeds back, to the second terminal device, the answer that carries the identifier. The server completes user identity authentication based on the identifier sent by a second terminal device. It should be noted that in this case, the server further is configured to receive current user identity information collected by the second terminal device. In addition, the broadcast message sent by the first Bluetooth device to the second Bluetooth device is a broadcast message with an acceptable scan request (SCAN_REQ).

By way of example and not limitation, the first Bluetooth device sends the broadcast message that carries the resolvable private address. After detecting a transaction event triggered by a user, scanning the broadcast message, and successfully verifying the resolvable private address, the second Bluetooth device sends the scan request to the first Bluetooth device. The first Bluetooth device feeds back the answer to the second Bluetooth device based on the scan request, where the answer carries the identifier of the first Bluetooth device. After receiving the answer, the second Bluetooth device uploads the identifier to the server, and the second Bluetooth device further is configured to obtain the current user identity information (for example, user's face, user's pupil, user's iris, or user's fingerprint) and uploads the user identity information to the server. The server finds user account information according to the identifier, compares the obtained current user identity information with the user account information, and performs user identity authentication. When the authentication succeeds, a service transaction, for example, a service transaction such as payment or unlocking, is completed. It should be noted that the server stores the identifier in association with the user account information in advance. The user account information includes user identity information, such as user's face, user's pupil, user's iris, or user's fingerprint, that is approved by the server in a user registration process. In other words, the user account information includes an object that is to be compared with the user identity information.

The identifier is used to identify a user or user equipment. The identifier may include at least one of a Bluetooth address of a terminal and a user identifier. In some embodiments, the identifier may be used to uniquely identify a user or user equipment, that is, the identifier is a unique identifier, and the unique identifier may include at least one of a Bluetooth address of a terminal and a unique user identifier.

For a terminal device including a classic Bluetooth module, a Bluetooth address of the terminal is a 48-bit number and a MAC address of the device.

For a terminal device including BLE, a Bluetooth address of the terminal is a public device address or a static random address.

By way of example and not limitation, when the first Bluetooth device sends a service subscription request to the server, the service subscription request carries the Bluetooth address of the terminal, and the server stores the Bluetooth address of the terminal in association with the user account information.

The user identifier is used to distinguish different users who have subscribed to a same service, and may be a single digit or a pure digit string, a single letter or a pure letter string, a single symbol or a pure symbol string, or a character string including a combination of at least two of a digit, a letter, and a symbol. A specific form of the user identifier is not limited in this application. In some embodiments, the user identifier may be a unique user identifier, and is used to uniquely identify different users who subscribe to a same service.

By way of example and not limitation, the user identifier may be pre-configured in the first Bluetooth device. The first Bluetooth device activates the user identifier when downloading and installing a preset service application. After the user successfully registers with the service application, the first Bluetooth device uploads the user identifier to the server, and the server stores the user identifier in association with the user account information.

By way of another example and not limitation, the user identifier may come from the server. After the first Bluetooth device sends the service subscription request to the server, the server reviews the service subscription request, and the server randomly generates the user identifier after the request is approved. The server further sends the user identifier to the first Bluetooth device while sending the IRK to the first Bluetooth device. In addition, the server is configured to store the user identifier in association with the user account information.

It should be noted that, the service application may configure, for a host of a Bluetooth module of the first Bluetooth device, dedicated data that is needs to be carried in the scan answer. In this embodiment of this application, the service application configures in the host, that when the scan request sent by the device holding the IRK is identified, the scan response carries the Bluetooth address of the terminal, the user identifier, or the dedicated data (the Bluetooth address of the terminal, and the user identifier). Based on this, when receiving the scan request from the second Bluetooth device holding the same IRK1, the first Bluetooth device holding the IRK1 sends the answer that carries the Bluetooth address of the terminal, the user identifier, or the Bluetooth address of the terminal and the user identifier.

In this embodiment of this application, the server establishes a mapping relationship between a user account for subscribing to the service and a device. The same IRK is deployed in the first Bluetooth device and the second Bluetooth device. The first Bluetooth device generates the resolvable private address by using the IRK, and the second Bluetooth device can successfully verify the resolvable private address. The second Bluetooth device sends the direction scan request to the first Bluetooth device which is successfully verified. The first Bluetooth device sends the identifier to the second Bluetooth device by using a scan response, and the second Bluetooth device uploads the identifier to the server. The server performs user identity verification on a specific user in a specified user group instead of an entire service system based on the received identifier, thereby improving accuracy and efficiency of remote identity authentication. The specified user group is delimited by using user equipment, and identity authentication is initiated on the specific user without user's active intervention. This reduces user operations, improves efficiency, and improves user experience.

Embodiment 3

Figure 4:
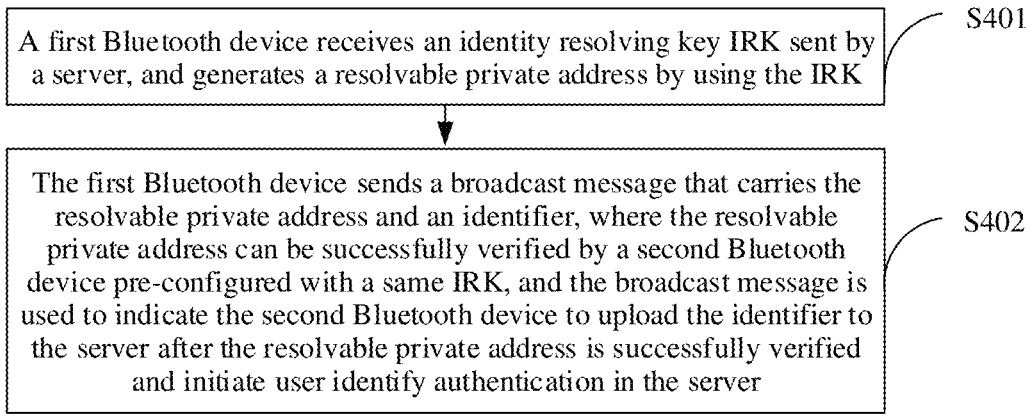
FIG. 4 is a schematic flowchart of another method for mutual recognition between Bluetooth devices according to at least an embodiment of this application.

On the basis of a case in which the first Bluetooth device is the user terminal and the second Bluetooth device is the service machine in the embodiment shown in FIG. 2B, FIG. 4 is a flowchart of an implementation of another method for mutual recognition between Bluetooth devices. As shown in FIG. 4, on the basis of the embodiment shown in FIG. 2B, the broadcast message further carries an identifier. It should be noted that steps that are the same as those in the foregoing embodiment are not described herein again. For details, refer to the foregoing embodiment.

S401: A first Bluetooth device receives an identity resolving key IRK sent by a server, and generates a resolvable private address by using the IRK.

S402: The first Bluetooth device sends the broadcast message, where the broadcast message carries the resolvable private address and the identifier of the first Bluetooth device, the resolvable private address can be successfully verified by a second Bluetooth device pre-configured with the same IRK, and the broadcast message is used to indicate the second Bluetooth device to upload the identifier to the server after the resolvable private address is successfully verified and initiate user identify authentication on the server.

In this embodiment of this application, the first Bluetooth device sends the broadcast message that carries the resolvable private address and the identifier. After scanning the broadcast message and successfully verifying the resolvable private address, the second Bluetooth device uploads the identifier to the server, and the server completes user identity authentication.

It should be noted that the service application may register a periodic broadcast message service with the host host of the Bluetooth module of the first Bluetooth device, and configure dedicated data that is to be carried in the broadcast message. In this embodiment of this application, two pieces of dedicated data (the resolvable private address and the identifier) are configured to be carried in the broadcast message in the host. The host controls or configures a Bluetooth controller to send, receive, and process a Bluetooth data packet.

In this embodiment of this application, the first Bluetooth device includes the resolvable private address and the identifier in the broadcast message. After successfully verifying the resolvable private address, the second Bluetooth device determines that the identifier that is to be uploaded to the server is the identifier in the broadcast message that is successfully verified. This narrows an object range for collecting information, reduces complexity of user identity authentication by the server, and implements a solution that can complete a procedure of the service without an active operation of the user.

Embodiment 4

Figure 5:
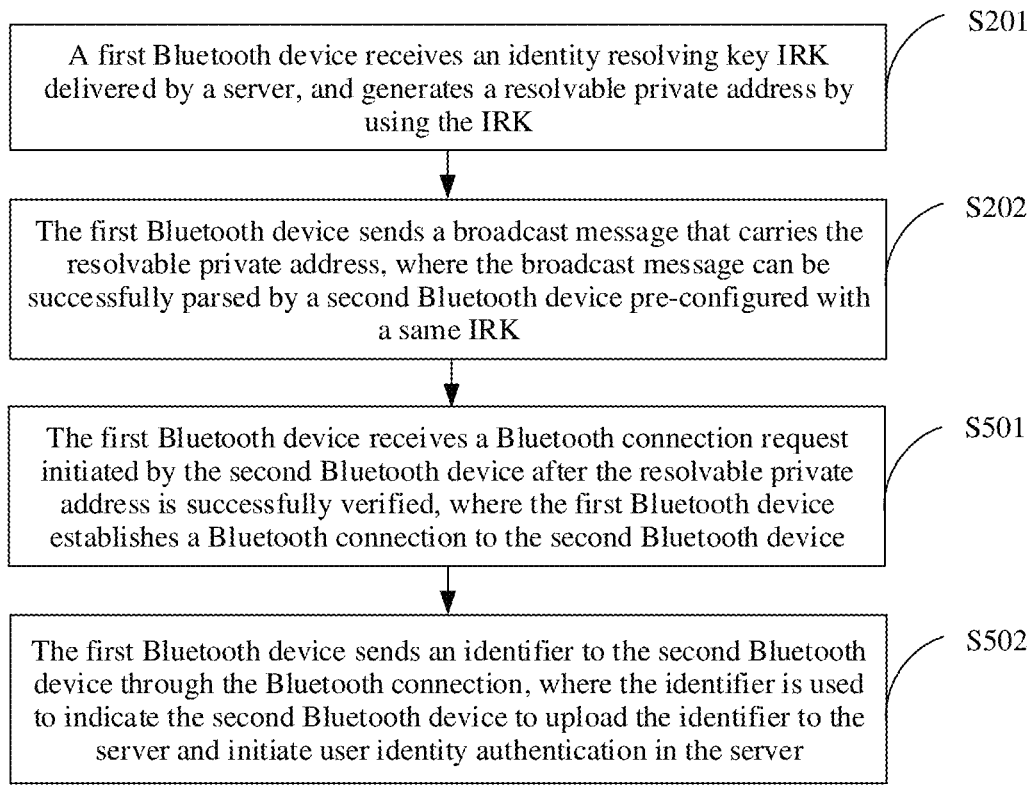
FIG. 5 is a schematic flowchart of another method for mutual recognition between Bluetooth devices according to at least an embodiment of this application.

On the basis of a case in which the first Bluetooth device is the user terminal and the second Bluetooth device is the service machine in the embodiment shown in FIG. 2B, FIG. 5 is a flowchart of an implementation of another method for mutual recognition between Bluetooth devices. As shown in FIG. 5, steps 501 and 502 are further added after step 202 in the embodiment shown in FIG. 2B. It should be noted that steps that are the same as those in the foregoing embodiment are not described herein again. For details, refer to the foregoing embodiment.

S201: A first Bluetooth device receives an identity resolving key IRK sent by a server, and generates a resolvable private address by using the IRK.

S202: The first Bluetooth device sends a broadcast message, where the broadcast message carries the resolvable private address, and the resolvable private address can be successfully verified by a second Bluetooth device pre-configured with a same IRK.

S501: The first Bluetooth device receives a Bluetooth connection request sent by the second Bluetooth device after the resolvable private address is successfully verified, and the first Bluetooth device establishes a Bluetooth connection to the second Bluetooth device.

S502: The first Bluetooth device sends an identifier to the second Bluetooth device through the Bluetooth connection, where the identifier is used to indicate the second Bluetooth device to upload the identifier to the server and initiate user identity authentication in the server.

In this embodiment of this application, the first Bluetooth device and the second Bluetooth device are pre-configured with Bluetooth binding information for Bluetooth binding between each other, and the Bluetooth binding information includes a Bluetooth address of a terminal of the peer device and a Bluetooth communication key link key. In Bluetooth modules in two terminal devices, the Bluetooth address of the terminal of the other peer device is bound to the link key. After the resolvable private address carried in the broadcast message is successfully verified, the second Bluetooth device sends the Bluetooth connection request to the first Bluetooth device to establish the Bluetooth connection between the first Bluetooth device and the second Bluetooth device, without an active operation of a user in a binding process. It should be noted that in this case, the broadcast message sent by the first Bluetooth device to the second Bluetooth device may be broadcast data that can be connected to.

By way of example and not limitation, after obtaining the Bluetooth address of the terminal of the first Bluetooth device, the server generates the Bluetooth binding information and sends the Bluetooth binding information to the first Bluetooth device and the second Bluetooth device. In some embodiments, the Bluetooth binding information may be sent together with the IRK. The Bluetooth binding information sent to the first Bluetooth device includes the Bluetooth address of the terminal of the second Bluetooth device and the link key. The Bluetooth binding information sent to the second Bluetooth device includes the Bluetooth address of the terminal of the first Bluetooth device and the link key. The link key is used for encryption and decryption during Bluetooth communication. Based on the Bluetooth binding information sent by the server, the first Bluetooth device and the second Bluetooth device deploy the Bluetooth binding information of each other in advance. It should be noted that, the link key may be the same for scenarios with a same service, that is, the same link key is deployed on all service machines and user terminals that have the same service. The service machines may perform, by using the link key, Bluetooth connections to the plurality of user terminals that have subscribed to the same service, to implement data communication.

After establishing the Bluetooth connection to the second Bluetooth device, the first Bluetooth device sends the identifier to the second Bluetooth device through the Bluetooth connection. In other words, the first Bluetooth device encrypts the identifier by using the link key and sends the identifier that is encrypted to the second Bluetooth device.

In this embodiment of this application, on the basis of Embodiment 1, Bluetooth binding is performed between the first Bluetooth device and the second Bluetooth device in advance, so that the Bluetooth connection between the first Bluetooth device and the second Bluetooth device can be implemented in a service interaction process without a user operation. In addition, the identifier is encrypted and transmitted through Bluetooth communication. This further improves security of data interaction and implements a more secure solution.

On the basis of Embodiment 2 to Embodiment 4, optionally, in another embodiment of this application, after the server performs user identity authentication, the server returns an authentication result, a transaction result, or an authentication result and a transaction result to the first Bluetooth device. In this case, the first Bluetooth device receives the authentication result generated when the server completes user identity authentication, receives the transaction result generated when the server executes the transaction, or receives the authentication result generated when the server completes user identity authentication and the transaction result generated when the server executes the transaction. In addition, on this basis, the server may further send the authentication result, the transaction result, or the authentication result and the transaction result to the second Bluetooth device.

On the basis of Embodiment 2 to Embodiment 4, optionally, in another embodiment of this application, the step in which the first Bluetooth device sends a broadcast message that carries the resolvable private address includes: The first Bluetooth device sends a broadcast that carries the resolvable private address and the service identifier. Such setting ensures that the second Bluetooth device can quickly identify the broadcast message that comes from the first Bluetooth device, and does not parse all broadcast messages. This improves processing efficiency. It should be noted that the service identifier is to be configured in the Bluetooth module of the second terminal device in advance, so that a second terminal device can first screen, based on the service identifier, the broadcast sent by the first terminal device, and parse only the broadcast that includes the service identifier. This improves processing efficiency. The server may send the service identifier to the second terminal device. The service identifier is configured on the Bluetooth module, or the service identifier is pre-configured on the Bluetooth module of the second terminal device before the second terminal device is delivered from the factory.

The service identifier is used to identify different services, so as to distinguish the services from other services. For example, different service identifiers are used for facial recognition payment and unlocking. Service identifiers corresponding to different first Bluetooth devices in the scenarios with the same service may be the same. In some embodiments, the service identifier may be a unique service identifier, and is used to uniquely identify a same service.

The service identifier may be a Bluetooth service UUID. More generally, the service identifier may be a single digit or a pure digit string, a single letter or a pure letter string, a single symbol or a pure symbol string, or a character string including a combination of at least two of a digit, a letter, and a symbol. A specific form of the service identifier is not limited in this application. The service identifier may be pre-stored by the first Bluetooth device, activated and configured in the Bluetooth module when the corresponding service is subscribed to, or may be sent by the server and configured in the Bluetooth module. A process of sending the service identifier is similar to a process of sending the user identifier. The service identifier is configured for the Bluetooth module of the first Bluetooth device, and the service identifier is also configured to be carried in the broadcast.

On the basis of Embodiment 2 to Embodiment 4, optionally, in another embodiment of this application, that the second Bluetooth device uploads the identifier to the server includes: The second Bluetooth device positions all first Bluetooth devices that send the identifier to the second Bluetooth device, and uploads the identifier of the first Bluetooth device closest to the second Bluetooth device to the server.

When there may be a plurality of first Bluetooth devices that are near the second Bluetooth device and that have subscribed to the preset service, the second Bluetooth device can receive the identifiers sent by the plurality of first Bluetooth devices. In this case, the second Bluetooth device sends all the received identifiers to the server, and the server may perform identity authentication on a specific user in a range corresponding to the plurality of first Bluetooth devices, instead of an entire database. This can greatly improve efficiency and performance of retrieval and comparison during biometric recognition.

This embodiment further has a limitation that the second Bluetooth device positions all the first Bluetooth devices that send the identifier to the second Bluetooth device, and uploads the identifier of the nearest first Bluetooth device to the server, so that the server performs a 1:1 identity authentication process. This greatly shortens transaction duration, simplifies algorithm development, improves algorithm performance, and reduces system resource usage.

By way of example and not limitation, the second Bluetooth device positions the first Bluetooth device based on strength of a received signal, and uses the first Bluetooth device with the strongest signal as the nearest first Bluetooth device. It should be further noted that, when the Bluetooth device modulates signal strength, a signal strength field may be carried in the broadcast message, so that a receiver can more accurately determine an object with the strongest signal.

By way of another example and not limitation, the second Bluetooth device positions, based on angle of arrival (AOA) information, all the first Bluetooth devices that send the identifier to the second Bluetooth device, to determine the nearest first Bluetooth device.

By way of another example and not limitation, the second terminal device positions, based on a high accuracy distance measurement (HADM) technology, all the first terminal devices that send the identifier to the second terminal device, to determine the nearest first terminal device.

Embodiment 5

Figure 6:
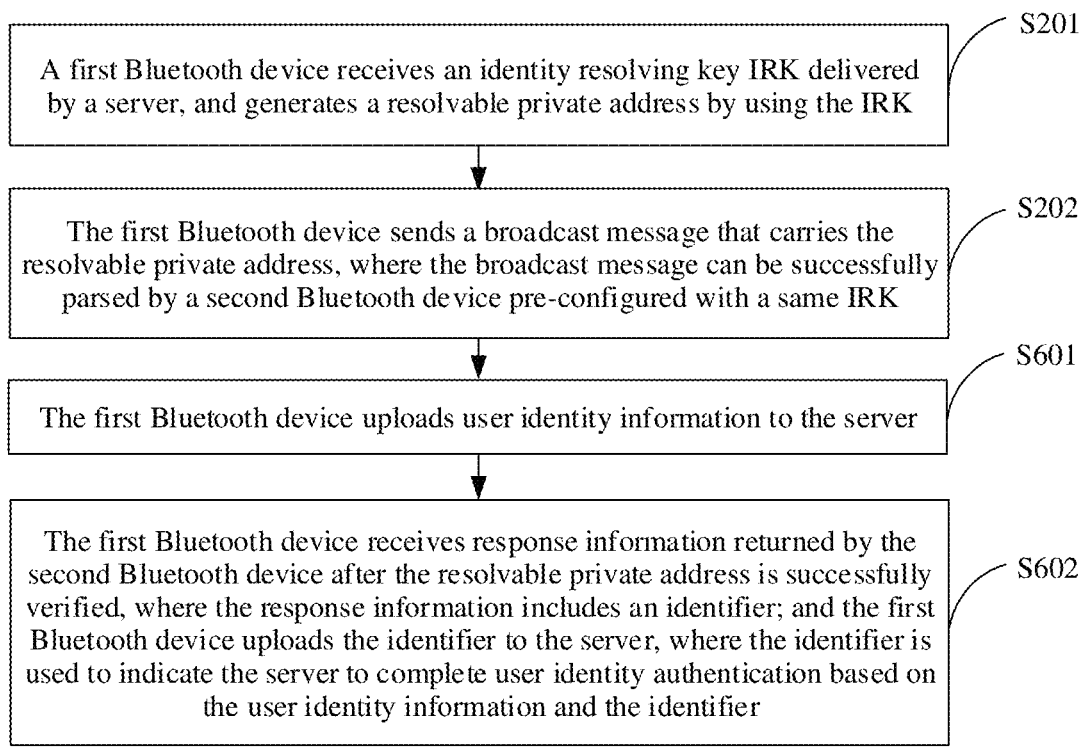
FIG. 6 is a schematic flowchart of another method for mutual recognition between Bluetooth devices according to at least an embodiment of this application.

On the basis of a case in which the first Bluetooth device is the service machine and the second Bluetooth device is the user terminal in the embodiment shown in FIG. 2B, FIG. 6 is a flowchart of an implementation of another method for mutual recognition between Bluetooth devices. As shown in FIG. 6, steps 601 and 602 are further added after step 202 in the embodiment shown in FIG. 2B. It should be noted that steps that are the same as those in the foregoing embodiment are not described herein again. For details, refer to the foregoing embodiment.

S201: A first Bluetooth device receives an identity resolving key IRK sent by a server, and generates a resolvable private address by using the IRK.

S202: The first Bluetooth device sends a broadcast message that carries the resolvable private address, where the broadcast message can be successfully parsed by a second Bluetooth device pre-configured with a same IRK.

S601: The first Bluetooth device uploads user identity information to the server.

S602: The first Bluetooth device receives response information returned by the second Bluetooth device after the resolvable private address is successfully verified, where the response information includes an identifier; and the first Bluetooth device uploads the identifier to the server, where the identifier is used to indicate the server to complete user identity authentication based on the user identity information and the identifier.

In this embodiment of this application, the first Bluetooth device sends the broadcast message that carries the resolvable private address. After the broadcast message is successfully parsed, the second Bluetooth device returns the response information including the identifier to the first Bluetooth device. A first terminal device uploads the user identity information and the identifier to the server, and the server completes user identity authentication.

By way of example and not limitation, when a user or a merchant initiates a service transaction on the first Bluetooth device, that is, after the first Bluetooth device detects that a transaction event is triggered, for example, a user or a cashier triggers a transaction request, such as a facial recognition payment request, the first Bluetooth device collects current user identity information (for example, user's face, user's pupil, user's iris, or user's fingerprint) and uploads the user identity information to the server.

It should be noted that the user identity information and the identifier may be uploaded to the server together, or may be separately uploaded to the server. This is not limited in this application.

The server stores the identifier in association with user account information in advance. The server finds the user account information based on the identifier, and compares the obtained current user identity information with the user account information, so as to perform user identity authentication. The transaction, such as payment or unlocking, is completed after user identity authentication succeeds.

In this embodiment of this application, the server establishes a mapping relationship between a user account for subscribing to a service and a device. The same IRK is deployed in the first Bluetooth device and the second Bluetooth device. The first Bluetooth device generates the resolvable private address by using the IRK, and the second Bluetooth device receives the broadcast message that carries the resolvable private address, and returns the identifier to the first Bluetooth device after the broadcast message is successfully parsed. The first Bluetooth device collects the user identity information, and uploads the user identity information and the identifier to the server. The server performs user identity authentication on a specific user in a specified user group instead of an entire service system based on the received identifier. This can improve accuracy and efficiency of remote identity authentication, narrows an object range for collecting information, and greatly protects user privacy. The specified user group is delimited by using user equipment, and identity authentication is initiated on the specific user without user's active intervention. This reduces user operations, improves efficiency, and improves user experience.

Embodiment 6

Figures 7, 8:
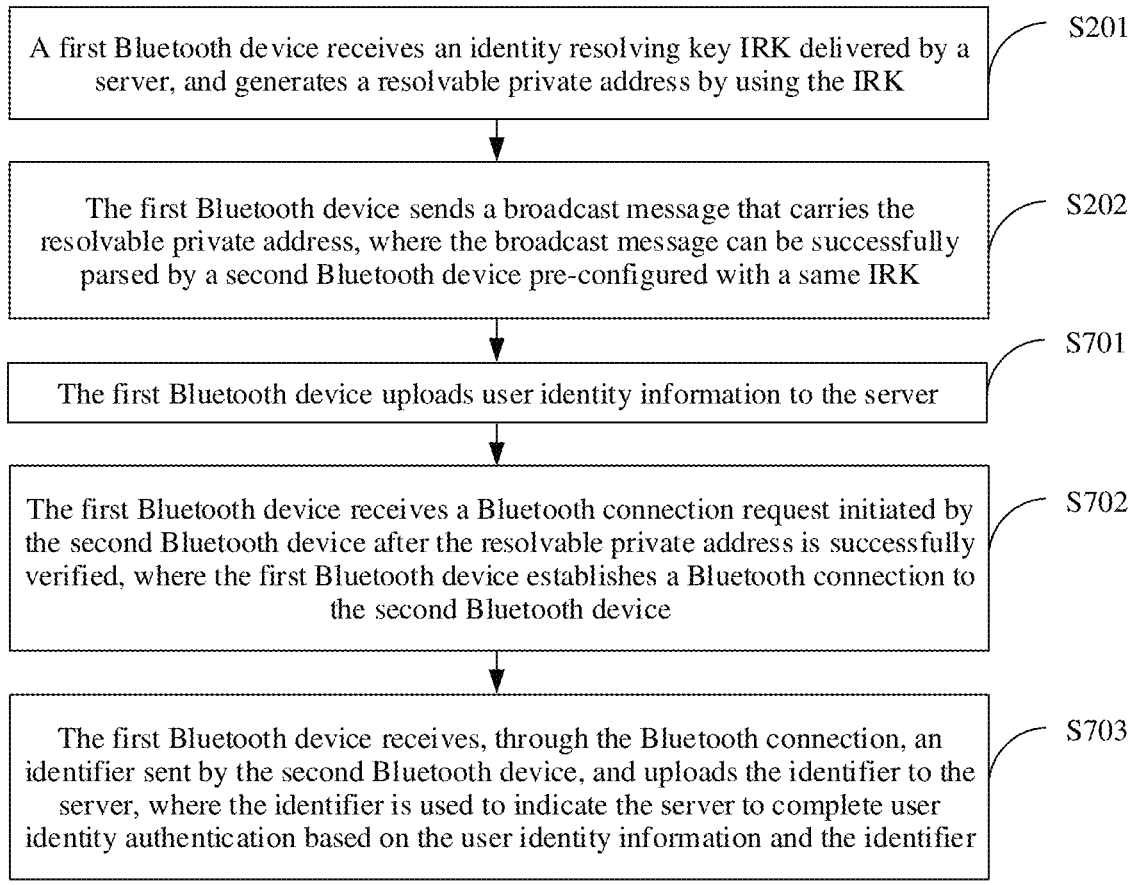
FIG. 7 is a schematic flowchart of another method for mutual recognition between Bluetooth devices according to at least an embodiment of this application.
FIG. 8 is a schematic flowchart of another method for mutual recognition between Bluetooth devices according to at least an embodiment of this application.

On the basis of a case in which the first Bluetooth device is the service machine and the second Bluetooth device is the user terminal in the embodiment shown in FIG. 2B, FIG. 7 is a flowchart of an implementation of another method for mutual recognition between Bluetooth devices. As shown in FIG. 7, steps 701 to 703 are further added after step 202 in the embodiment shown in FIG. 2B. It should be noted that steps that are the same as those in the foregoing embodiment are not described herein again. For details, refer to the foregoing embodiment.

S201: A first Bluetooth device receives an identity resolving key IRK sent by a server, and generates a resolvable private address by using the IRK.

S202: The first Bluetooth device sends a broadcast message that carries the resolvable private address, where the broadcast message can be successfully parsed by a second Bluetooth device pre-configured with a same IRK.

S701: The first Bluetooth device uploads user identity information to the server.

S702: The first Bluetooth device receives a Bluetooth connection request sent by the second Bluetooth device after the resolvable private address is successfully verified, and the first Bluetooth device establishes a Bluetooth connection to the second Bluetooth device.

S703: The first Bluetooth device receives, through the Bluetooth connection, an identifier sent by the second Bluetooth device, and uploads the identifier to the server, where the identifier is used to indicate the server to complete user identity authentication based on the user identity information and the identifier.

In this embodiment of this application, the first Bluetooth device sends the broadcast message that carries the resolvable private address, and the second Bluetooth device returns the Bluetooth connection request after the broadcast message is successfully parsed, to establish the Bluetooth connection between the first Bluetooth device and the second Bluetooth device.

After establishing the Bluetooth connection between the first Bluetooth device and the second Bluetooth device, the second Bluetooth device sends the identifier to the first Bluetooth device through the Bluetooth connection. In other words, the second Bluetooth device encrypts the identifier by using a link key and sends the identifier that is encrypted to the first Bluetooth device. The first Bluetooth device receives, through the Bluetooth connection, the identifier sent by the second Bluetooth device, and uploads the identifier to the server.

When a user or a merchant initiates a service transaction on the first Bluetooth device, that is, after the first Bluetooth device detects that a transaction event is triggered, for example, a user or a cashier triggers a transaction request, such as a facial recognition payment request, the first Bluetooth device collects current user identity information (for example, user's face, user's pupil, user's iris, or user's fingerprint) and uploads the user identity information to the server. It should be noted that the user identity information and the identifier may be uploaded to the server together, or may be separately uploaded to the server. This is not limited in this application.

The server stores the identifier in association with user account information in advance. The server finds the user account information based on the identifier, and compares the obtained current user identity information with the user account information, so as to perform user identity authentication. The transaction, such as payment or unlocking, is completed after user identity authentication succeeds.

In this embodiment of this application, on the basis of Embodiment 5, Bluetooth binding is performed between the first Bluetooth device and the second Bluetooth device in advance, so that the Bluetooth connection between the first Bluetooth device and the second Bluetooth device can be implemented in a service interaction process without a user operation, and identity authentication is performed without active intervention of the user. The identifier is encrypted and transmitted through Bluetooth communication. This further improves security of data interaction and implements a more secure imperceptible solution.

On the basis of Embodiment 5 and Embodiment 6, optionally, in another embodiment of this application, after completing user identity authentication, the server returns an authentication result, a transaction result, or an authentication result and a transaction result. In this case, the first Bluetooth device receives the authentication result generated when the server completes user identity authentication, receives the transaction result generated when the server executes the transaction, or receives the authentication result generated when the server completes user identity authentication and the transaction result generated when the server executes the transaction. In addition, on this basis, the server may further send the authentication result, the transaction result, or the authentication result and the transaction result to the second Bluetooth device.

On the basis of Embodiment 5 and Embodiment 6, optionally, in another embodiment of this application, when a user or a merchant initiates a service transaction on the first Bluetooth device, that is, after the first Bluetooth device detects that the user triggers a transaction event, the first Bluetooth device sends the broadcast message that carries the resolvable private address, and starts a user identity information collection module to collect the user identity information. Such setting reduces resource consumption of the first Bluetooth device, and also avoids a problem in which user privacy is infringed by unwarranted information collection.

On the basis of Embodiment 5 and Embodiment 6, optionally, in another embodiment of this application, the step in which the first Bluetooth device sends a broadcast message that carries the resolvable private address includes: The first Bluetooth device sends the broadcast message that carries the resolvable private address and the service identifier. Such setting ensures that the second Bluetooth device can quickly identify the broadcast message (namely, a specific service) that comes from the first Bluetooth device, and does not parse all broadcast messages. This improves processing efficiency. It should be noted that the service identifier is to be configured in the Bluetooth module of the second Bluetooth device in advance, so that the second Bluetooth device can first screen, based on the service identifier, the broadcast message sent by the first Bluetooth device, and parse only the broadcast message that includes the service identifier. This improves processing efficiency. The service identifier may be pre-stored by the second Bluetooth device, activated and configured in the Bluetooth module when the corresponding service is subscribed to, or may be sent by the server and configured in the Bluetooth module. A process of sending the service identifier is similar to a process of sending the user identifier.

A host in a Bluetooth module of the first Bluetooth device registers the service identifier, and configures that the broadcast message carries the service identifier. After the first Bluetooth device completes deployment, the server may send the service identifier to the first Bluetooth device, and configure the service identifier on the Bluetooth module. Alternatively, the service identifier may be pre-configured on the Bluetooth module of the first terminal device before the first terminal device is delivered from the factory.

In some embodiments, the step in which the first Bluetooth device uploads the identifier to the server includes: The first Bluetooth device positions all second Bluetooth devices that send the identifier to the first Bluetooth device, and uploads the identifier of the second Bluetooth device closest to the first Bluetooth device to the server.

When there may be a plurality of second Bluetooth devices that are near the first Bluetooth device and that have subscribed to the preset service, the first Bluetooth device can receive the identifiers sent by the plurality of second Bluetooth devices. In this case, the first Bluetooth device sends all the received identifiers to the server, and the server may perform identity authentication on a specific user in a range corresponding to the plurality of second terminals, instead of an entire database. This can greatly improve efficiency and performance of retrieval and comparison during biometric recognition.

This embodiment further has a limitation that the first Bluetooth device positions all the second Bluetooth devices that send the identifier to the first Bluetooth device, and uploads the identifier of the nearest second Bluetooth device to the server, so that the server performs a 1:1 identity authentication process. This greatly shortens transaction duration, simplifies algorithm development, improves algorithm performance, and reduces system resource usage.

By way of example and not limitation, the first Bluetooth device positions the second Bluetooth device based on strength of a received signal, and uses the second Bluetooth device with the strongest signal as the nearest second Bluetooth device. It should be further noted that, when the Bluetooth device modulates signal strength, a signal strength field may be carried in the broadcast message, so that a receiver can more accurately determine an object with the strongest signal.

By way of another example and not limitation, the first Bluetooth device positions, based on AOA information, all the second Bluetooth devices that send the identifier to the first Bluetooth device, to determine the nearest second Bluetooth device.

By way of another example and not limitation, the first terminal device positions, based on an HADM technology, all the second terminal devices that send the identifier to the first terminal device, to determine the nearest second terminal device.

Embodiment 7

FIG. 8 is a schematic flowchart of a method for mutual recognition between Bluetooth devices according to this application. Corresponding to the embodiment shown in FIG. 2B, the method is applied to a second Bluetooth device, and the second Bluetooth device is pre-configured with an identity resolving key IRK that is the same as an IRK in a first Bluetooth device. For example, the second Bluetooth device may be the mobile phone or the facial recognition machine shown in FIG. 2A. When the first Bluetooth device is a mobile phone, the second terminal device is the facial recognition machine; or when the first Bluetooth device is a facial recognition machine, the second terminal device is the mobile phone. A specific implementation principle of each step is as follows: It should be noted that steps that are the same as those in the foregoing embodiment are not described herein again. For details, refer to the foregoing embodiment.

S801: The second Bluetooth device successfully verifies a resolvable private address by using the pre-configured IRK when scanning a broadcast message sent by the first Bluetooth device, where the broadcast message carries the resolvable private address, and the resolvable private address is generated by the first Bluetooth device by using the IRK sent by a server.

In this embodiment of this application, the first Bluetooth device generates the resolvable private address by using the IRK, and sends the broadcast message that carries the resolvable private address. When the second Bluetooth device scans the broadcast message from the first Bluetooth device, because the second Bluetooth device is configured with the same IRK as that of the first Bluetooth device, the second Bluetooth device can successfully verify the resolvable private address carried in the broadcast message.

In a case in which the second Bluetooth device is a service machine

The second Bluetooth device may be a payment machine based on biometric recognition, such as a facial recognition machine, or an intelligent lock/gate based on biometric recognition.

By way of example and not limitation, the IRK in the second Bluetooth device is sent by the server. The server may be an application server, for example, a server on a service application such as payment or unlocking, or may be a cloud server, a distributed server, a server cluster, or the like. After completing deployment, the second Bluetooth device establishes a communication link with the server. The second Bluetooth device receives the IRK sent by the server. The second Bluetooth device receives the IRK, and registers the IRK with a host of a Bluetooth module or a Bluetooth chip.

By way of another example and not limitation, the IRK in the second Bluetooth device may be an IRK pre-configured in the second Bluetooth device. A manufacturer of a Bluetooth device usually configures the IRK in the first Bluetooth device before delivery, that is, registers the IRK with the host of the Bluetooth module or the Bluetooth chip.

The IRK in the first Bluetooth device is sent by the server. When a user sends a service subscription request to the server by using the first Bluetooth device, the server sends the IRK to the first Bluetooth device based on the service subscription request and after the service subscription request is approved. The first Bluetooth device receives the IRK, and registers the IRK with a host host of a Bluetooth module or a Bluetooth chip. The IRK in the first Bluetooth device and the IRK in the second Bluetooth device are the same.

It should be noted that, in another embodiment of this application, the IRK in the first Bluetooth device may be an IRK pre-configured in the first Bluetooth device. When subscribing to preset service, the first Bluetooth device activates the IRK, and registers the IRK with the host host of the Bluetooth module or the Bluetooth chip, so that the first Bluetooth device generates the resolvable private address by using the IRK. The preset service may be a payment service or an unlocking service based on biometric recognition for example, fingerprint recognition, facial recognition, pupil recognition. The preset service may be subscribed to based on a manner in which the user installs a corresponding application or an applet on and registers the corresponding application or the applet with the first Bluetooth device, or perform registration on a service website. In the following embodiments, for ease of description, descriptions are provided by using the service application as an example.

In a case in which the second Bluetooth device is a user terminal

The second Bluetooth device may be a mobile phone, a tablet computer, a wearable device, an AR device/a VR device, a notebook computer, a UMPC, a netbook, a PDA, or the like.

By way of example and not limitation, the IRK in the second Bluetooth device is sent by the server. When a user sends a service subscription request to the server by using the second Bluetooth device, the server receives the service subscription request, and sends the IRK to the second Bluetooth device after the service subscription request is approved. The second Bluetooth device receives the IRK, and registers the IRK with a host host of a Bluetooth module or a Bluetooth chip.

By way of another example and not limitation, the IRK in the second Bluetooth device is an IRK pre-configured in the second Bluetooth device. When subscribing to a preset service, the second Bluetooth device activates the IRK, and registers the IRK with the host host of the Bluetooth module or the Bluetooth chip, so that the second Bluetooth device generates a resolvable private address by using the IRK.

The IRK in the first Bluetooth device may come from the server. After completing deployment, the first Bluetooth device establishes a communication link with the server. The first Bluetooth device receives the IRK sent by the server. The first Bluetooth device receives the IRK, and registers the IRK with a host of a Bluetooth module or a Bluetooth chip.

In another embodiment of this application, the IRK in the first Bluetooth device may be an IRK pre-configured in the first Bluetooth device. A manufacturer of a Bluetooth device usually configures the IRK in the first Bluetooth device before delivery, that is, registers the IRK with the host of the Bluetooth module or the Bluetooth chip. The IRK in the first Bluetooth device and the IRK in the second Bluetooth device are the same.

It should be noted that, in the first Bluetooth device and the second Bluetooth device, one of the terminal devices may actively send a broadcast message, and the other terminal device scans the broadcast message. Therefore, which sends the broadcast message and which scans the broadcast message is not specifically limited in the first Bluetooth device and the second Bluetooth device, and roles of the first Bluetooth device and the second Bluetooth device may be exchanged. Embodiment 7 of this application includes the two possible implementations.

Embodiment 8

Figure 9:
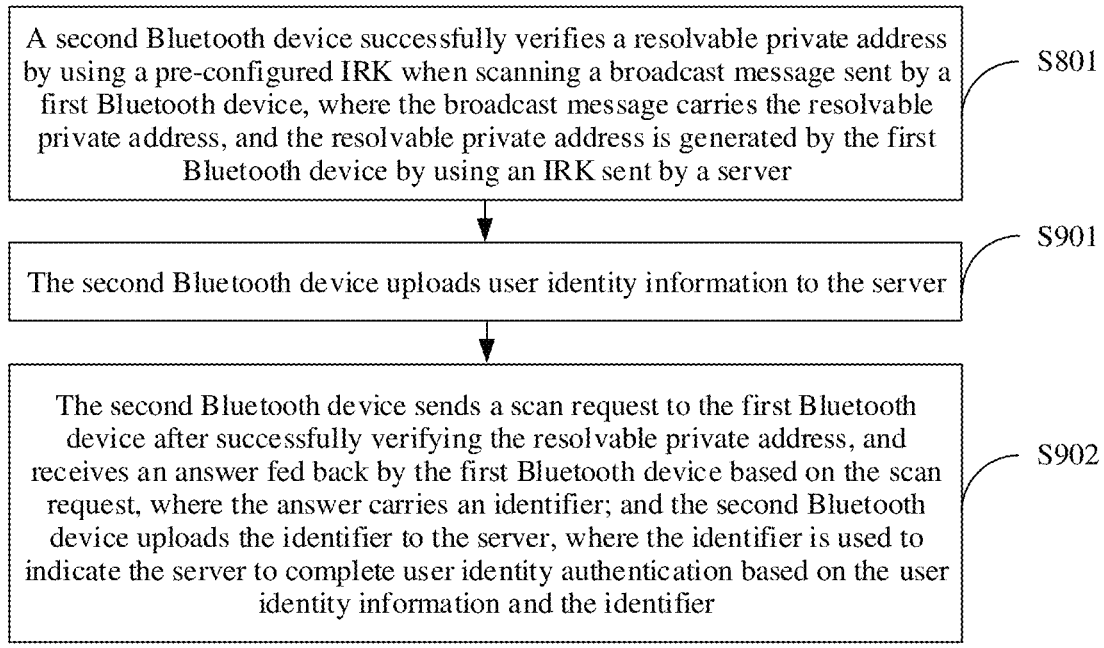
FIG. 9 is a schematic flowchart of another method for mutual recognition between Bluetooth devices according to at least an embodiment of this application.

On the basis of a case in which the first Bluetooth device is the user terminal and the second Bluetooth device is the service machine in the embodiment shown in FIG. 8, FIG. 9 is a flowchart of an implementation of another method for mutual recognition between Bluetooth devices. Corresponding to the embodiment shown in FIG. 3, the method is applied to a second Bluetooth device, and the second Bluetooth device is pre-configured with an identity resolving key IRK that is the same as an IRK in a first Bluetooth device. As shown in FIG. 9, steps 901 and 902 are further added after step 801 in the embodiment shown in FIG. 8. It should be noted that steps that are the same as those in the foregoing embodiment are not described herein again. For details, refer to the foregoing embodiment.

S801: The second Bluetooth device successfully verifies a resolvable private address by using the pre-configured IRK when scanning a broadcast message sent by the first Bluetooth device, where the broadcast message carries the resolvable private address, and the resolvable private address is generated by the first Bluetooth device by using the IRK sent by a server.

S901: The second Bluetooth device uploads user identity information to the server.

S902: The second Bluetooth device sends a scan request to the first Bluetooth device after successfully verifying the resolvable private address, and receives an answer fed back by the first Bluetooth device based on the scan request, where the answer carries an identifier; and the second Bluetooth device uploads the identifier to the server, where the identifier is used to indicate the server to complete user identity authentication based on the user identity information and the identifier.

Embodiment 9

Figure 10:
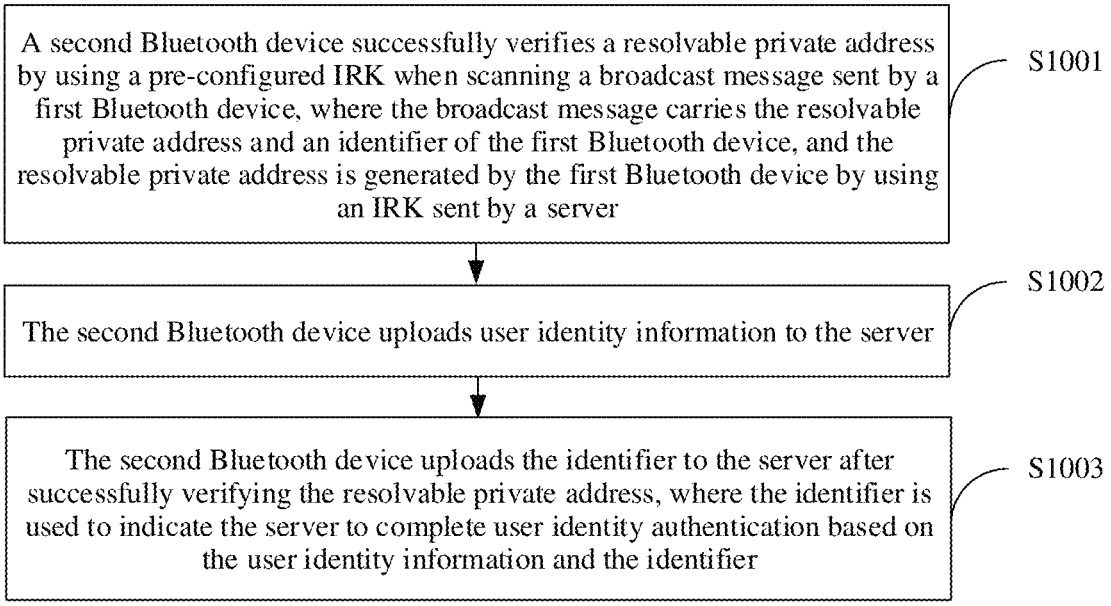
FIG. 10 is a schematic flowchart of another method for mutual recognition between Bluetooth devices according to at least an embodiment of this application.

On the basis of a case in which the first Bluetooth device is the user terminal and the second Bluetooth device is the service machine in the embodiment shown in FIG. 8, FIG. 10 is a flowchart of an implementation of another method for mutual recognition between Bluetooth devices. Corresponding to the embodiment shown in FIG. 4, the method is applied to a second Bluetooth device, and the second Bluetooth device is pre-configured with an identity resolving key IRK that is the same as an IRK in a first Bluetooth device. As shown in FIG. 10, on the basis of the embodiment shown in FIG. 8, the broadcast message data further carries an identifier. It should be noted that steps that are the same as those in the foregoing embodiment are not described herein again. For details, refer to the foregoing embodiment.

S1001: The second Bluetooth device successfully verifies a resolvable private address by using the pre-configured IRK when scanning the broadcast message sent by the first Bluetooth device, where the broadcast message carries the resolvable private address and the identifier of the first Bluetooth device, and the resolvable private address is generated by the first Bluetooth device by using the IRK sent by a server.

S1002: The second Bluetooth device uploads user identity information to the server.

S1003: The second Bluetooth device uploads the identifier to the server after successfully verifying the resolvable private address, where the identifier is used to indicate the server to complete user identity authentication based on the user identity information and the identifier.

Embodiment 10

Figure 11:
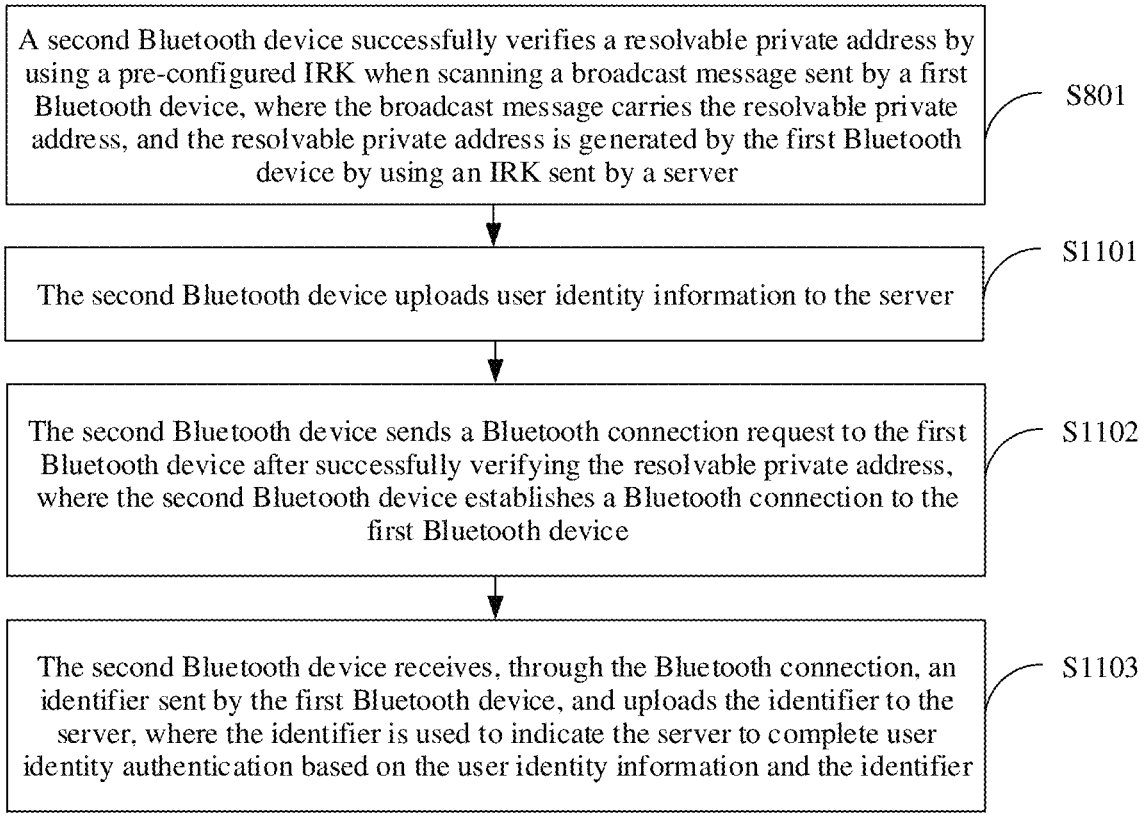
FIG. 11 is a schematic flowchart of another method for mutual recognition between Bluetooth devices according to at least an embodiment of this application.

On the basis of a case in which the first Bluetooth device is the user terminal and the second Bluetooth device is the service machine in the embodiment shown in FIG. 8, FIG. 11 is a flowchart of an implementation of another method for mutual recognition between Bluetooth devices. Corresponding to the embodiment shown in FIG. 5, the method is applied to a second Bluetooth device, and the second Bluetooth device is pre-configured with an identity resolving key IRK that is the same as an IRK in a first Bluetooth device. As shown in FIG. 11, steps 1101 to 1103 are further added after step 801 in the embodiment shown in FIG. 8. It should be noted that steps that are the same as those in the foregoing embodiment are not described herein again. For details, refer to the foregoing embodiment.

S801: The second Bluetooth device successfully verifies a resolvable private address by using the pre-configured IRK when scanning a broadcast message sent by the first Bluetooth device, where the broadcast message carries the resolvable private address, and the resolvable private address is generated by the first Bluetooth device by using the IRK sent by a server.

S1101: The second Bluetooth device uploads user identity information to the server.

S1102: The second Bluetooth device sends a Bluetooth connection request to the first Bluetooth device after successfully verifying the resolvable private address, where the second Bluetooth device establishes a Bluetooth connection to the first Bluetooth device.

S1103: The second Bluetooth device receives, through the Bluetooth connection, an identifier sent by the first Bluetooth device, and uploads the identifier to the server, where the identifier is used to indicate the server to complete user identity authentication based on the user identity information and the identifier.

Embodiment 11

Figure 12:
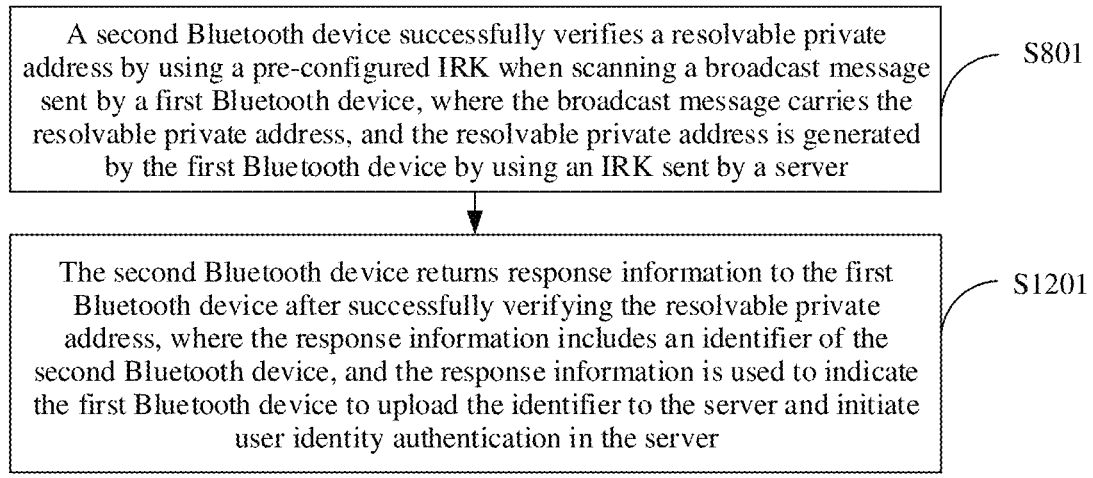
FIG. 12 is a schematic flowchart of another method for mutual recognition between Bluetooth devices according to at least an embodiment of this application.

On the basis of a case in which the first Bluetooth device is the service machine and the second Bluetooth device is the user terminal in the embodiment shown in FIG. 8, FIG. 12 is a flowchart of an implementation of another method for mutual recognition between Bluetooth devices. Corresponding to the embodiment shown in FIG. 6, the method is applied to a second Bluetooth device, and the second Bluetooth device is pre-configured with an identity resolving key IRK that is the same as an IRK in a first Bluetooth device. As shown in FIG. 12, step 1201 is further added after step 801 in the embodiment shown in FIG. 8. It should be noted that steps that are the same as those in the foregoing embodiment are not described herein again. For details, refer to the foregoing embodiment.

S801: The second Bluetooth device successfully verifies a resolvable private address by using the pre-configured IRK when scanning a broadcast message sent by the first Bluetooth device, where the broadcast message carries the resolvable private address, and the resolvable private address is generated by the first Bluetooth device by using the IRK sent by a server.

S1201: The second Bluetooth device returns response information to the first Bluetooth device after successfully verifying the resolvable private address, where the response information includes an identifier of the second Bluetooth device, and the response information is used to indicate the first Bluetooth device to upload the identifier to the server and initiate user identity authentication in the server.

Embodiment 12

Figure 13:
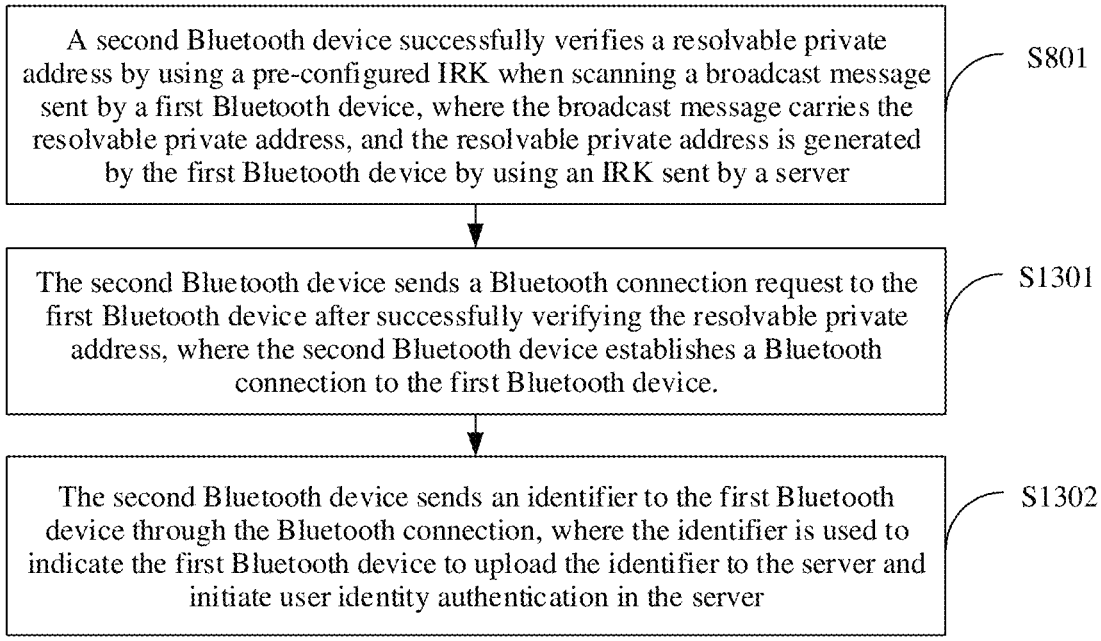
FIG. 13 is a schematic flowchart of another method for mutual recognition between Bluetooth devices according to at least an embodiment of this application.

On the basis of a case in which the first Bluetooth device is the service machine and the second Bluetooth device is the user terminal in the embodiment shown in FIG. 8, FIG. 13 is a flowchart of an implementation of another method for mutual recognition between Bluetooth devices. Corresponding to the embodiment shown in FIG. 7, the method is applied to a second Bluetooth device, and the second Bluetooth device is pre-configured with an identity resolving key IRK that is the same as an IRK in a first Bluetooth device. As shown in FIG. 13, steps 1301 and 1302 are further added after step 801 in the embodiment shown in FIG. 8. It should be noted that steps that are the same as those in the foregoing embodiment are not described herein again. For details, refer to the foregoing embodiment.

S801: The second Bluetooth device successfully verifies a resolvable private address by using the pre-configured IRK when scanning a broadcast message sent by the first Bluetooth device, where the broadcast message carries the resolvable private address, and the resolvable private address is generated by the first Bluetooth device by using the IRK sent by a server.

S1301: The second Bluetooth device sends a Bluetooth connection request to the first Bluetooth device after successfully verifying the resolvable private address, where the second Bluetooth device establishes a Bluetooth connection to the first Bluetooth device.

S1302: The second Bluetooth device sends an identifier to the first Bluetooth device through the Bluetooth connection, where the identifier is used to indicate the first Bluetooth device to upload the identifier to the server and initiate user identity authentication in the server.

Embodiment 13

Figure 14:
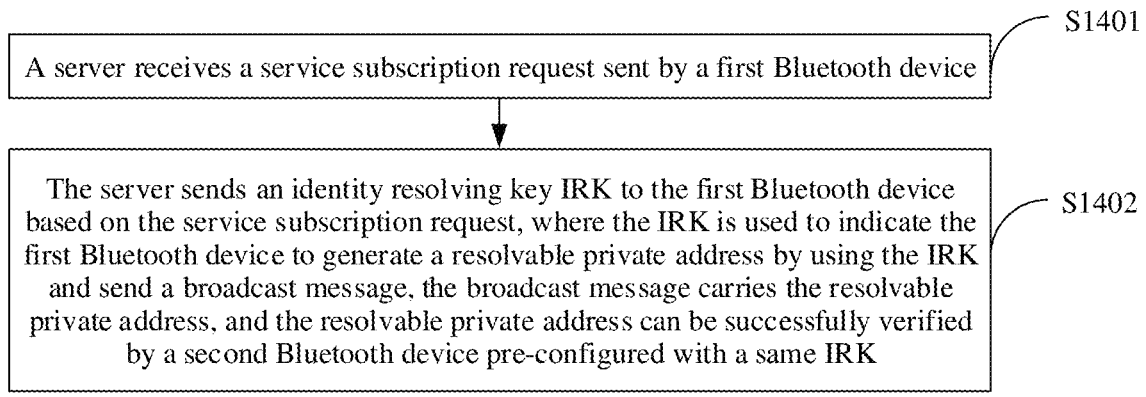
FIG. 14 is a schematic flowchart of another method for mutual recognition between Bluetooth devices according to at least an embodiment of this application.

FIG. 14 is a flowchart of an implementation of another method for mutual recognition between Bluetooth devices. Corresponding to the embodiments shown in FIG. 2A and FIG. 2B and FIG. 8, the method is applied to a server. A specific implementation principle of each step is as follows: It should be noted that steps that are the same as those in the foregoing embodiment are not described herein again. For details, refer to the foregoing embodiment.

S1401: The server receives a service subscription request sent by a first Bluetooth device.

S1402: The server sends an identity resolving key IRK to the first Bluetooth device based on the service subscription request, where the IRK is used to indicate the first Bluetooth device to generate a resolvable private address by using the IRK and send a broadcast message, the broadcast message carries the resolvable private address, and the resolvable private address can be successfully verified by a second Bluetooth device pre-configured with a same IRK.

In this embodiment of this application, the first Bluetooth device is a user terminal, and the second Bluetooth device is a service machine.

A user triggers the service subscription request in a service application on the first Bluetooth device. The first Bluetooth device sends the service subscription request to the server. After receiving the service subscription request, the server sends the IRK to the first Bluetooth device, and registers the IRK with a host of a Bluetooth module or a Bluetooth chip of the first Bluetooth device. The first Bluetooth device generates the resolvable private address by using the IRK and sends the broadcast message, where the broadcast message carries the resolvable private address. The second Bluetooth device is configured with a same IRK as the IRK in the first Bluetooth device, and can successfully verify the resolvable private address carried in the broadcast message sent by the first terminal device.

It should be noted that the server includes an application server, a cloud server, a distributed server, a clustered server, and the like.

In this embodiment of this application, the server sends the IRK to the first Bluetooth device, and the first Bluetooth device can generate the resolvable private address by using the IRK, and send the broadcast message that carries the resolvable private address. In addition, the second Bluetooth device is set to be capable of successfully verifying the resolvable private address by using the IRK. This achieves an effect of recognition between the Bluetooth terminal devices without an active operation of the user. In addition, the second Bluetooth device recognizes the first Bluetooth device that generates the resolvable private address by using the IRK. This reduces a range of information reported by the second Bluetooth device to the server, avoids a possible problem in which user privacy is infringed, and narrows an object range for collecting information.

On the basis of Embodiment 13, optionally, in another embodiment of this application, the method further includes: The server receives user identity information and the identifier of the first Bluetooth device that are sent by the second Bluetooth device, and completes user identity authentication based on the user identity information and the identifier. The identifier is pre-stored by the server in association with user account information.

In some embodiments, after the server receives the service subscription request sent by the first Bluetooth device, the method further includes: The server stores an identifier of the first Bluetooth device in association with user account information, where the identifier includes at least one of a Bluetooth address of a terminal and a subscriber identifier of the first Bluetooth device.

When the identifier includes the Bluetooth address of the terminal of the first Bluetooth device, the first Bluetooth device is configured to send the Bluetooth address of the terminal of the first Bluetooth device to the server. It should be noted that the first Bluetooth device may send the Bluetooth address of the terminal when sending the service subscription request, or may send the Bluetooth address of the terminal before or after sending the service subscription request. This is not limited in this application. It may be understood that when the Bluetooth address of the terminal and the service subscription request are sent at the same time, a case in which the service subscription request carries the Bluetooth address of the terminal is included.

When the identifier includes the user identifier of the first Bluetooth device, the server further is configured to send the identifier to the first Bluetooth device.

It should be noted that the server is configured in advance that the broadcast message or a scan response from a Bluetooth module of the first Bluetooth device is configured to carry dedicated data (the identifier).

In some embodiments, in addition to sending the IRK, the server may further send a service identifier to the first Bluetooth device based on the service subscription request. In this case, the server further is configured to obtain the service identifier, and sends the service identifier to the first Bluetooth device.

The service identifier may be preset data pre-stored by the server.

It should be noted that the server is configured to configure the service identifier in the Bluetooth module of the first Bluetooth device, so that the first Bluetooth device can first screen, based on the service identifier, the broadcast message sent by the second Bluetooth device, and parse only the broadcast message that includes the service identifier. This improves processing efficiency.

In some embodiments, in addition to sending the IRK, the server may further send Bluetooth binding information based on the service subscription request. Specifically, the server generates the Bluetooth binding information, and sends the Bluetooth binding information to the first Bluetooth device and the second Bluetooth device.

The Bluetooth binding information is used for Bluetooth binding between the first Bluetooth device and the second Bluetooth device. The Bluetooth binding information includes a Bluetooth address of a terminal of the other peer device and a link key In Bluetooth modules of the two terminal devices, the Bluetooth address of the terminal of the other peer device is bound to the link key, so that a Bluetooth connection between the first Bluetooth device and the second Bluetooth device can be established when one of the terminal devices sends a Bluetooth connection request.

It should be noted that Bluetooth binding information sent by the server may further include a Bluetooth address of a terminal of the first Bluetooth device, a Bluetooth address of a terminal of the second Bluetooth device, and a link key.

Embodiment 14

Figure 15:
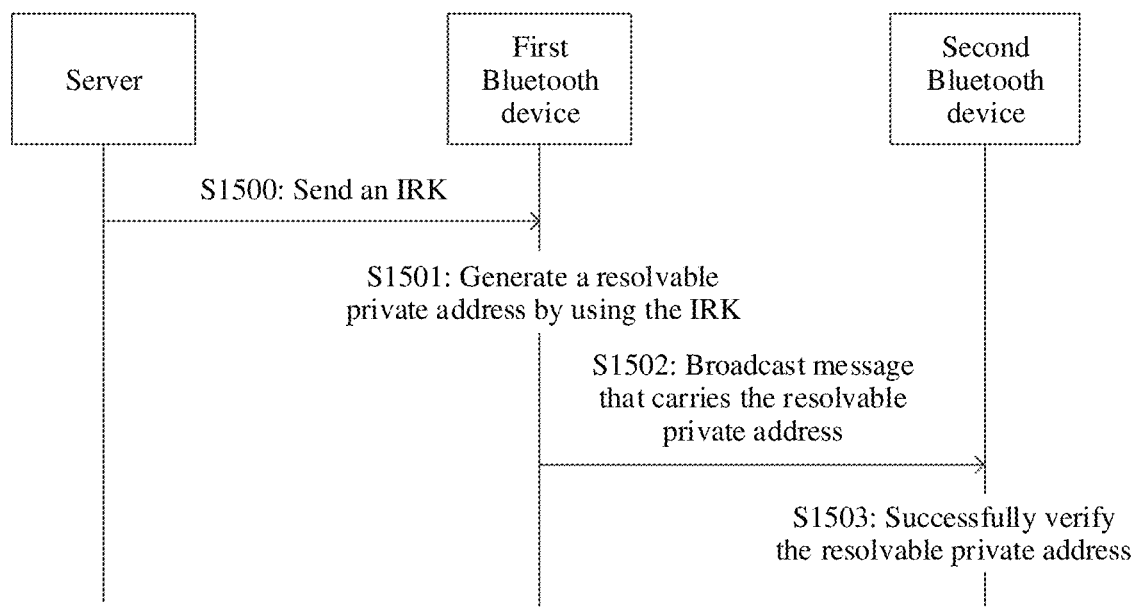
FIG. 15 is a schematic flowchart of another method for mutual recognition between Bluetooth devices according to at least an embodiment of this application.

FIG. 15 is a flowchart of an implementation of another method for mutual recognition between Bluetooth devices. The method is applied to a scenario of mutual recognition between Bluetooth devices, for example, the scenario shown in FIG. 2A. A specific implementation principle of each step is as follows: It should be noted that steps that are the same as those in the foregoing embodiment are not described herein again. For details, refer to the foregoing embodiment.

S1500: A server sends an IRK to a first Bluetooth device.

S1501: The first Bluetooth device generates a resolvable private address by using the IRK.

S1502: The first Bluetooth device sends a broadcast message that carries the resolvable private address.

S1503: A second Bluetooth device scans the broadcast message and successfully verifies the resolvable private address, where the second Bluetooth device is preconfigured with an IRK that is the same as the IRK in the first Bluetooth device.

It should be noted that the IRK sent by the server is an IRK related to a service, and may be an IRK pre-agreed upon.

Embodiment 15

Figure 16:
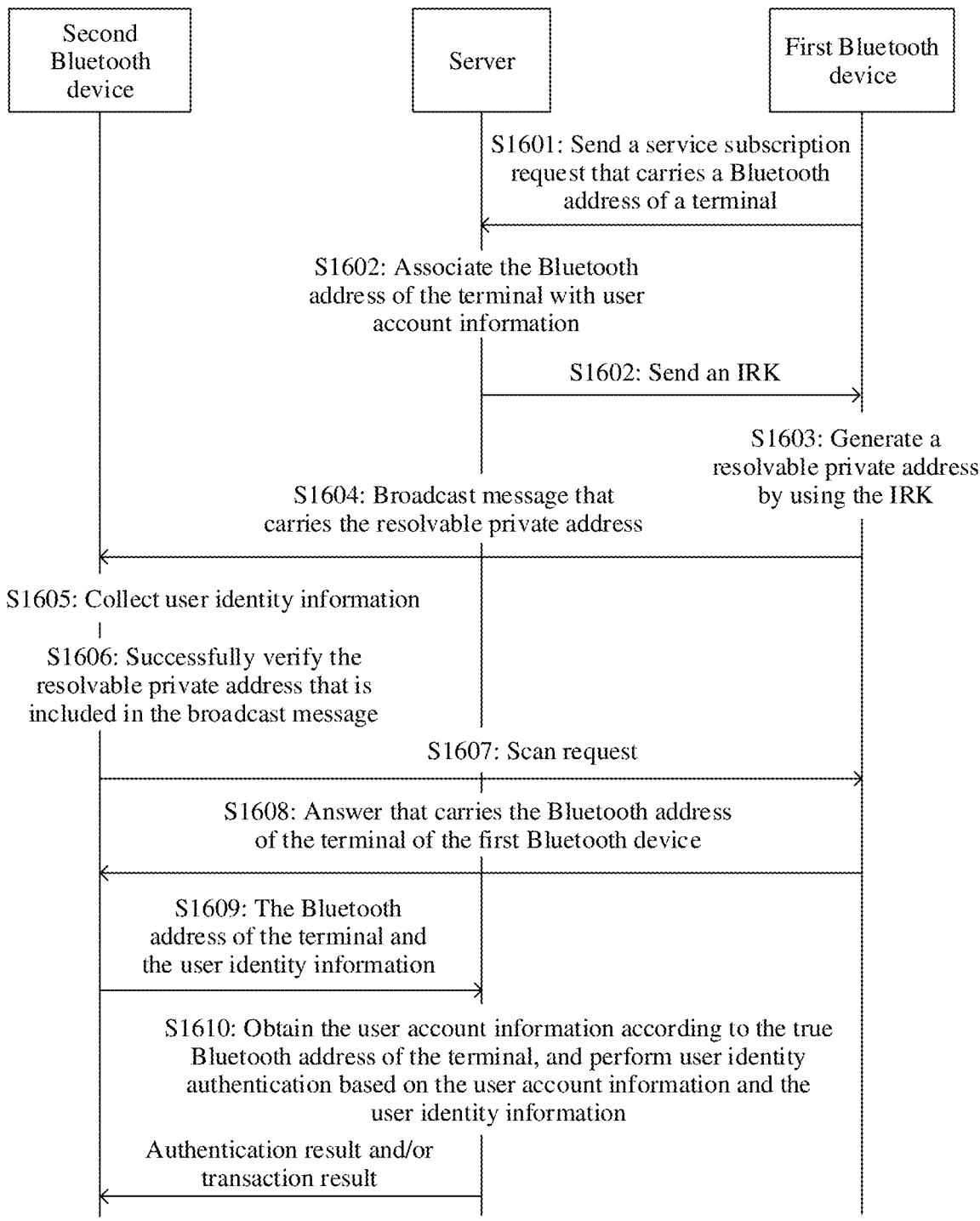
FIG. 16 is a schematic flowchart of another method for mutual recognition between Bluetooth devices according to at least an embodiment of this application.

FIG. 16 is a flowchart of an implementation of another method for mutual recognition between Bluetooth devices. The method is applied to a system of mutual recognition between Bluetooth devices, for example, the scenario shown in FIG. 2A. A specific implementation principle of each step is as follows: It should be noted that steps that are the same as those in the foregoing embodiment are not described herein again. For details, refer to the foregoing embodiment.

S1601: A first Bluetooth device sends a service subscription request to a server, where the service subscription request carries a Bluetooth address of a terminal of the first Bluetooth device.

S1602: The server associates the Bluetooth address of the terminal of the first Bluetooth device with user account information, and sends an IRK to the first Bluetooth device.

S1603: The first Bluetooth device generates a resolvable private address by using the IRK.

S1604: The first Bluetooth device sends a broadcast message that carries the resolvable private address.

S1605: A second Bluetooth device detects that a transaction event is triggered, and collects user identity information.

S1606: The second Bluetooth device scans the broadcast message and verifies the resolvable private address, where the second Bluetooth device is configured with an IRK that is the same as the IRK in the first Bluetooth device.

S1607: The second Bluetooth device sends a scan request to the first Bluetooth device after successfully verifying the resolvable private address.

S1608: The first Bluetooth device feeds back an answer to the second Bluetooth device based on the scan request, where the answer carries a Bluetooth address of a terminal of the first Bluetooth device.

S1609: The second Bluetooth device receives the answer, and uploads the Bluetooth address of the terminal and the user identity information to the server.

S1610: The server obtains the user account information according to the Bluetooth address of the terminal, and performs user identity authentication based on the user account information and the user identity information.

After performing user identity authentication, the server returns an authentication result, a transaction result, or an authentication result and a transaction result to the second Bluetooth device. It may be understood that after performing user identity authentication, the server may further return the authentication result, the transaction result, or the authentication result and the transaction result to the first Bluetooth device.

In this embodiment of this application, the first Bluetooth device is a user terminal, and the second Bluetooth device is a service machine.

On the basis of Embodiment 15, optionally, in another embodiment of this application, the server further sends a user identifier to the first Bluetooth device in addition to sending the IRK to the first Bluetooth device. In this case, that the server obtains the Bluetooth address of the terminal of the first Bluetooth device is optional.

When sending the user identifier, the server further is configured to store the user identifier in association with the user account information. In this case, the first Bluetooth device may no longer feed back the answer that carries the Bluetooth address of the terminal to the second Bluetooth device based on the scan request, but feed back an answer that carries the user identifier to the second Bluetooth device based on the scan request. The server obtains the user account information based on the user identifier to complete user identity authentication.

On the basis of Embodiment 15, optionally, in another embodiment of this application, the broadcast message sent by the first Bluetooth device according to the resolvable private address directly carries the Bluetooth address of the terminal or the user identifier of the first Bluetooth device. This omits a scan and response process, and improves data processing efficiency.

On the basis of Embodiment 15, optionally, in another embodiment of this application, in addition to sending the IRK to the first Bluetooth device, the server further sends Bluetooth binding information to the first Bluetooth device and the second Bluetooth device. The Bluetooth binding information is used for Bluetooth binding between the first Bluetooth device and the second Bluetooth device. The sent Bluetooth binding information includes at least a Bluetooth address of a terminal of the peer terminal device and a link key. In this case, the first Bluetooth device and the second Bluetooth device first automatically establish a Bluetooth connection, and send an identifier through the Bluetooth communication link, where the identifier includes a Bluetooth address of a terminal, a user identifier, or a Bluetooth address of a terminal and a user identifier.

In some embodiments, when the second Bluetooth device receives the identifier sent by a plurality of first Bluetooth devices, in an example, the second Bluetooth device may first position the plurality of first Bluetooth devices that send the identifier, and send the identifier of the nearest first Bluetooth device to the server, so that the server performs 1:1 user identity authentication. This improves an overall data processing speed. In another example, after obtaining a plurality of pieces of user account information based on a plurality of identifiers, the server feeds back the plurality of pieces of user account information to the second Bluetooth device for display. After receiving a selection instruction for selecting a user triggered by a user on the second Bluetooth device, the server performs user identity authentication on user identity information based on the user selected by the user. In this case, the server can perform 1:1 user identity authentication, but only one active operation is required.

Embodiment 16

Figure 17:
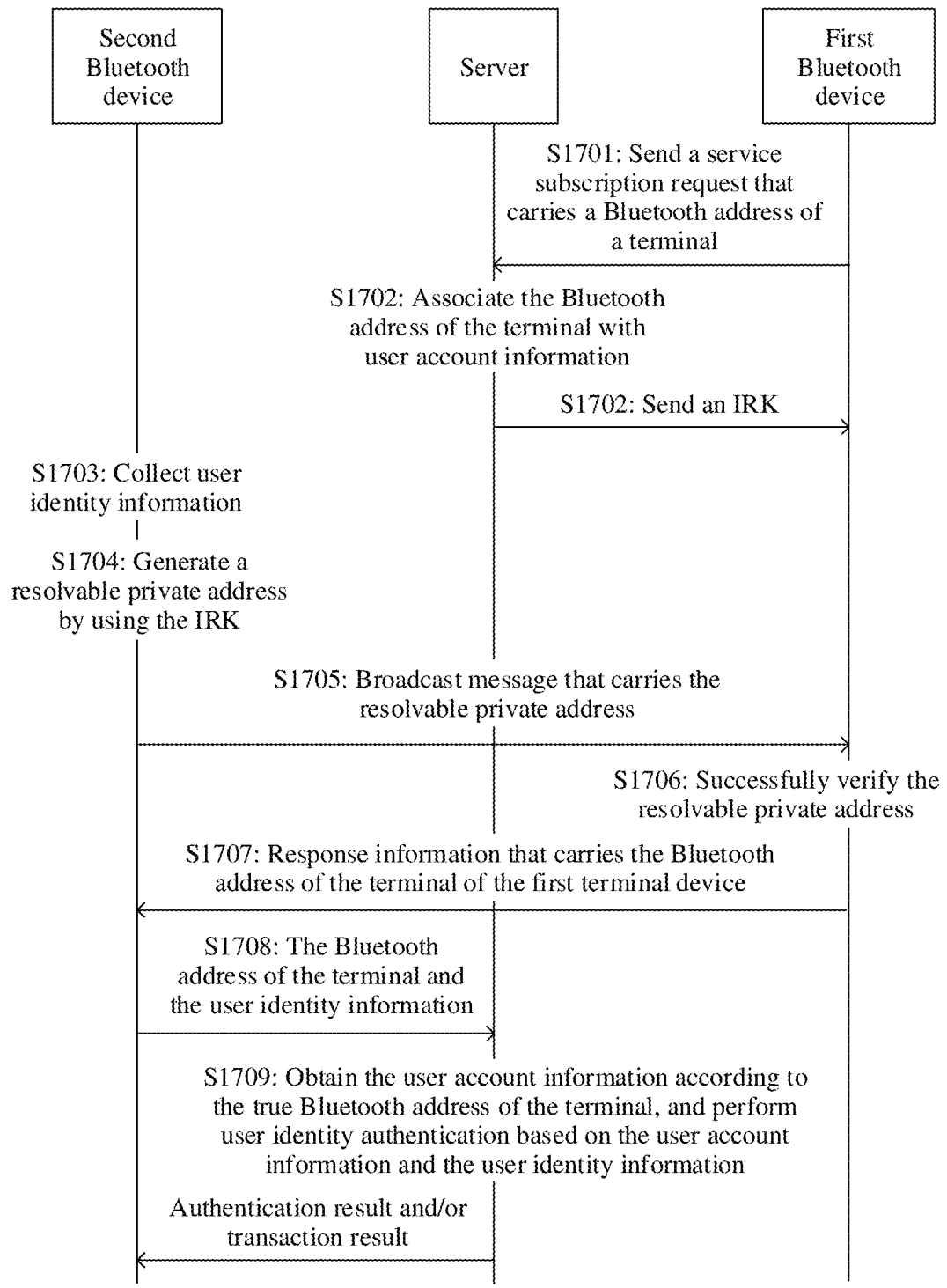
FIG. 17 is a schematic flowchart of another method for mutual recognition between Bluetooth devices according to at least an embodiment of this application.

FIG. 17 is a flowchart of an implementation of another method for mutual recognition between Bluetooth devices. The method is applied to a scenario of mutual recognition between Bluetooth devices, for example, the scenario shown in FIG. 2A. A specific implementation principle of each step is as follows: It should be noted that steps that are the same as those in the foregoing embodiment are not described herein again. For details, refer to the foregoing embodiment.

S1701: A first Bluetooth device sends a service subscription request to a server, where the service subscription request carries a Bluetooth address of a terminal of the first Bluetooth device.

S1702: The server associates the Bluetooth address of the terminal of the first Bluetooth device with user account information, and sends an IRK to the first Bluetooth device.

S1703: A second Bluetooth device detects that a transaction event is triggered, and collects user identity information.

S1704: The second Bluetooth device generates a resolvable private address by using an IRK, where the second Bluetooth device is pre-configured with the IRK that is the same as the IRK in the first Bluetooth device.

S1705: The second Bluetooth device sends a broadcast message according to the resolvable private address.

S1706: The first Bluetooth device scans the broadcast message and verifies the resolvable private address.

S1707: After successfully verifying the resolvable private address, the first Bluetooth device sends, to the second Bluetooth device, response information that carries the Bluetooth address of the terminal.

S1708: The second terminal receives the response information, and uploads the Bluetooth address of the terminal and the user identity information to the server.

S1709: The server obtains the user account information according to the Bluetooth address of the terminal, and performs user identity authentication based on the user account information and the user identity information.

After performing user identity authentication, the server returns an authentication result, a transaction result, or an authentication result and a transaction result to the second Bluetooth device. It may be understood that after performing user identity authentication, the server may further return the authentication result, the transaction result, or the authentication result and the transaction result to the first Bluetooth device.

In this embodiment of this application, the first Bluetooth device is a user terminal, and the second Bluetooth device is a service machine.

On the basis of Embodiment 16, optionally, in another embodiment of this application, the server further sends a user identifier to the first Bluetooth device in addition to sending the IRK to the first Bluetooth device.

When sending the user identifier, the server further is configured to store the user identifier in association with the user account information. In this case, after successfully verifying the resolvable private address, the first Bluetooth device no longer sends, to the second Bluetooth device, the response information that carries the Bluetooth address of the terminal, but sends and feeds back, to the second Bluetooth device, response information that carries the user identifier. The server obtains the user account information based on the user identifier to complete user identity authentication.

On the basis of Embodiment 16, optionally, in another embodiment of this application, in addition to sending the IRK to the first Bluetooth device, the server further sends Bluetooth binding information to the first Bluetooth device and the second Bluetooth device. The Bluetooth binding information is used for Bluetooth binding between the first Bluetooth device and the second Bluetooth device. The sent Bluetooth binding information includes at least a Bluetooth address of a terminal of the peer terminal device and a link key. In this case, the first Bluetooth device and the second Bluetooth device first automatically establish a Bluetooth connection, and send an identifier through the Bluetooth communication link, where the identifier includes at least one of a Bluetooth address of a terminal and a user identifier.

On the basis of Embodiment 16, optionally, in another embodiment of this application, the server further sends a service identifier to the first Bluetooth device in addition to sending the IRK to the first Bluetooth device. In this case, the broadcast message sent by the second Bluetooth device according to the resolvable private address carries the service identifier. The first Bluetooth device first screens the broadcast message by using the service identifier, and then verifies the resolvable private address that includes the IRK.

On the basis of Embodiment 16, optionally, in another embodiment of this application, the server further sends a link key to the first Bluetooth device in addition to sending the IRK to the first Bluetooth device. The link key is a Bluetooth communication key between the first Bluetooth device and the second Bluetooth device. In this case, the second Bluetooth device is also pre-configured with a link key. All second Bluetooth devices may share the same link key.

When the first Bluetooth device feeds back, in response to a scan request from the second Bluetooth device, an answer that carries the identifier, the first Bluetooth device may first encrypt the identifier by using the link key. When the first terminal sends the broadcast message that carries the identifier, the first terminal may first encrypt the identifier by using the link key. When the first Bluetooth device feeds back a response message that carries the identifier after successfully verifying the resolvable private address, the first Bluetooth device may first encrypt the identifier by using the link key. The link key is used to encrypt the identifier before being transmitted. This further improves data security and protects user privacy.

The following describes implementation processes of Embodiment 2 to Embodiment 16 in this application by using specific scenario descriptions. It should be noted that the descriptions herein are merely examples, and cannot be construed as a specific limitation on this application.

Scenario 1

A user Liu Yi purchases a car, and Liu Yi is a car owner. The car includes an in-vehicle terminal, and the in-vehicle terminal includes at least a Bluetooth module.

After verifying a mobile phone of the owner (Liu Yi) of the car, a car manufacturer server sends a digital car key to the mobile phone of the car owner, sends a same IRK to the mobile phone of the car owner and the car purchased by Liu Yi and Bluetooth binding information for establishing a Bluetooth binding relationship between the mobile phone of the car owner and the car, and registers the IRK in a Bluetooth module of the mobile phone of the car owner and the Bluetooth module of the car. Both the mobile phone of the car owner and the car may generate a resolvable private address by using the IRK, and send a broadcast message that carries the resolvable private address. In some embodiments, to distinguish a relationship between the mobile phone of the car owner and the car from a relationship between another user and the car, the same unique IRK may be further configured in the mobile phone of the car owner and the corresponding car.

For example, when the car sends the broadcast message by using the IRK, the mobile phone of the car owner directionally sends a Bluetooth connection establishment request to the car after successfully verifying the resolvable private address, and the mobile phone of the car owner and the car automatically implement a Bluetooth connection. After the Bluetooth connection is established, the car performs service layer check on the mobile phone of the car owner by using a car key service key on a Bluetooth channel After the check succeeds, the car positions the mobile phone of the car owner. If a positioning result is that the mobile phone of the car owner is within a preset range, for example, within a range of 2 m, a door of the car is opened.

For another example, when the car receives or scans the broadcast message sent by the mobile phone of the car owner by using the IRK, and the car sends a Bluetooth connection request to the mobile phone of the car owner after successfully verifying the resolvable private address. After a Bluetooth connection is established, the mobile phone of the car owner performs service layer check on the car by using a car key service key on a Bluetooth channel. After the check succeeds, the mobile phone of the car owner initiates positioning for the car. When the car is within a preset range, for example, within a range of 2 m, a door of the car is opened.

In this application scenario, the car owner takes the mobile phone that already has the car key and that has implemented remote Bluetooth binding with the car, and walks to the car. The mobile phone automatically and directly connects to the car through Bluetooth without interacting with the car before, and performs service layer check on the car by using the car key service key on the Bluetooth channel. After the check succeeds, the door of the car can be opened. The IRK is used to prove that the mobile phone is associated with the car. The car makes response only to Bluetooth data sent by the mobile phone with the same IRK, and the mobile phone makes response only to Bluetooth data sent by the car with the same IRK. After authenticating the car key service key in the mobile phone, the car controls door opening and closing of the car. Thus, the car owner does not perform operations such as actively connect to Bluetooth of the car in the entire process.

Scenario 2

A user Zhang San first downloads a financial application and installs the financial application on a mobile phone, registers the user with a financial application registration page, enters related user account information, including a face image of Zhang San, and uploads the user account information to a server. The server approves the registration Zhang San wants to subscribe to a facial recognition payment service based on a facial recognition machine by using the financial application on the mobile phone. Zhang San triggers a service subscription request for the facial recognition payment service in a facial recognition payment service subscription interface of the financial application. The mobile phone sends the service subscription request that carries a Bluetooth address of a terminal of the mobile phone to the server. The server reviews the user account information. After the user account information is approved, the server grants permission of the facial recognition payment service to Zhang San. The server receives the Bluetooth address of the terminal and stores the Bluetooth address of the terminal in association with the user account information. The server sends an IRK to the mobile phone, and the financial application registers the IRK with a host of a Bluetooth module or a Bluetooth chip of the mobile phone. The mobile phone generates a resolvable private address by using the IRK and sends a broadcast message that carries the resolvable private address. The IRK is also registered with or pre-configured in a host of a Bluetooth module or a Bluetooth chip of the facial recognition machine. When the user Zhang San is to pay for consumption at a merchant, the user Zhang San or a cashier of the merchant triggers a facial recognition payment transaction on a facial recognition machine, the facial recognition machine collects the face image of Zhang San, and the facial recognition machine scans a broadcast message from peripheral device. Because the IRK is registered with the host of the Bluetooth module or the Bluetooth chip of the facial recognition machine, the facial recognition machine can scan and successfully parse the broadcast message that is sent by the mobile phone and that carries the resolvable private address. After successfully verifying the resolvable private address in the broadcast message, the facial recognition machine directionally sends a scan request to the mobile phone. The mobile phone feeds back, in response to the scan request, an answer that carries the Bluetooth address of the terminal. The facial recognition machine receives the answer, and sends the collected face image of Zhang San and the Bluetooth address of the terminal to the server. The server finds the corresponding user account information according to the Bluetooth address of the terminal, extracts the face image of Zhang San, and matches the face image of Zhang San with the collected face image of Zhang San. When the matching succeeds, identity authentication on Zhang San succeeds. The server completes the payment transaction, and feeds back a payment transaction result to the facial recognition machine, the mobile phone, or the facial recognition machine and the mobile phone.

In this application scenario, the facial recognition machine can collect Bluetooth addresses of a plurality of terminals, but it can be ensured that all uploaded Bluetooth addresses of terminals are from Bluetooth devices holding the same IRK. The server performs 1:N user identity comparison on a small range of users, that is, one-to-many user identity comparison, without traversing an entire database. This reduces privacy risks and simplifies algorithm development.

Scenario 3

A user Li Si first downloads an access control manager application and installs the access control manager application on a mobile phone, registers the user with an access control manager application registration page, enters related user account information, including fingerprint information of Li Si, and uploads the user account information to a server. The server approves the registration. After renting an apartment or a suit of apartments, Li Si is to unlock a gate of a building. Li Si wants to subscribe to a fingerprint unlocking service based on a fingerprint collection device by using the access control manager application on the mobile phone. Li Si triggers a service subscription request for the fingerprint unlocking service in a fingerprint unlocking service subscription interface of the access control manager application. The mobile phone sends the service subscription request that carries a Bluetooth address of a terminal of the mobile phone to the server. The server reviews the user account information. After the user account information is approved, the server grants permission that Li Si subscribes to the fingerprint unlocking service. The server receives the Bluetooth address of the terminal and stores the Bluetooth address of the terminal in association with the user account information. The server sends an IRK to the mobile phone, and the access control manager application registers the IRK with a host of a Bluetooth module or a Bluetooth chip of the mobile phone. The mobile phone generates a resolvable private address by using the IRK and sends a broadcast message that carries the resolvable private address. The IRK is also registered with a host of a Bluetooth module or a Bluetooth chip of an intelligent lock including a fingerprint collection module. When Li Si arrives at the gate of the rented building to perform unlocking, Li Si triggers a fingerprint unlocking transaction on the intelligent lock, the intelligent lock starts the fingerprint collection module to collect a fingerprint image of Li Si, and the intelligent lock sends the broadcast message that carries the resolvable private address. The mobile phone scans a broadcast message from a peripheral device. Because the IRK is registered with the host of the Bluetooth module or the Bluetooth chip of the mobile phone, the mobile phone can successfully verify the broadcast message that carries the resolvable private address and that is sent by the intelligent lock. After successfully verifying the resolvable private address, the mobile phone sends a response message that carries the Bluetooth address of the terminal of the mobile phone to the intelligent lock. The intelligent lock receives the response message, and sends the collected fingerprint image of Li Si and the Bluetooth address of the terminal to the server. The server finds the corresponding user account information according to the Bluetooth address of the terminal, extracts the fingerprint information of Li Si, and matches the fingerprint information of Li Si with the collected fingerprint image of Li Si. When the matching succeeds, identity authentication on Li Si succeeds. The server controls the intelligent lock to complete unlocking.

Embodiment 17

Figure 18A:
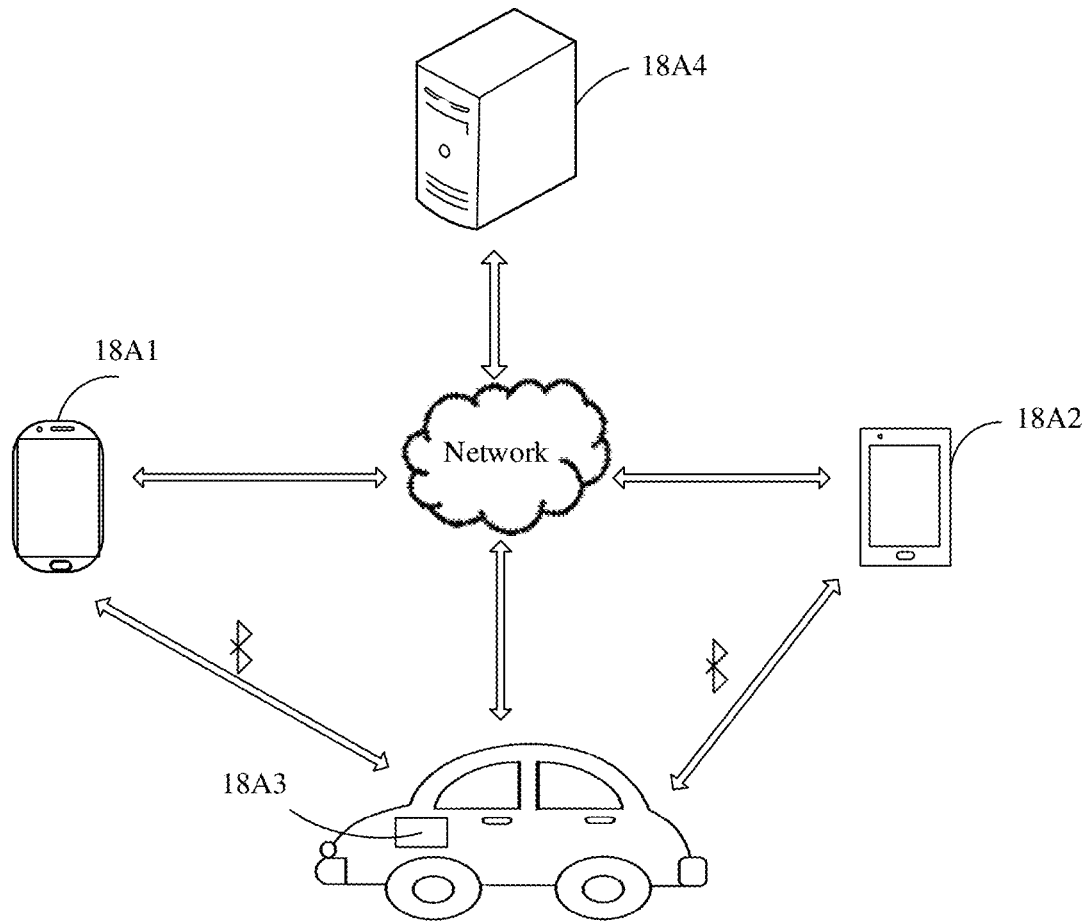
FIG. 18A is a schematic diagram of an application scenario of a method for mutual trust between Bluetooth devices according to at least an embodiment of this application.

FIG. 18A is a schematic diagram of a system for mutual trust between Bluetooth devices. The system includes a mobile phone 18A1 of a car owner, a mobile phone 18A2 of a friend, an in-vehicle terminal 18A3, and a car manufacturer server 18A4. The car manufacturer server 18A4 is a management server of the vehicle-mounted terminal 18A3, and the mobile phone 18A3 of a car owner may be understood as a client of the car manufacturer server 18A4. The mobile phone 18A3 of a car owner, the mobile phone 18A2 of a friend, and the vehicle-mounted terminal 18A3 may communicate with the car manufacturer server 18A4 through a network. The mobile phone 18A3 of a car owner and the vehicle-mounted terminal 18A3 may perform Bluetooth communication by using a Bluetooth module. The in-vehicle terminal 18A3 and the mobile phone 18A3 of a friend can perform Bluetooth communication after a Bluetooth binding relationship is established.

Figure 18B:
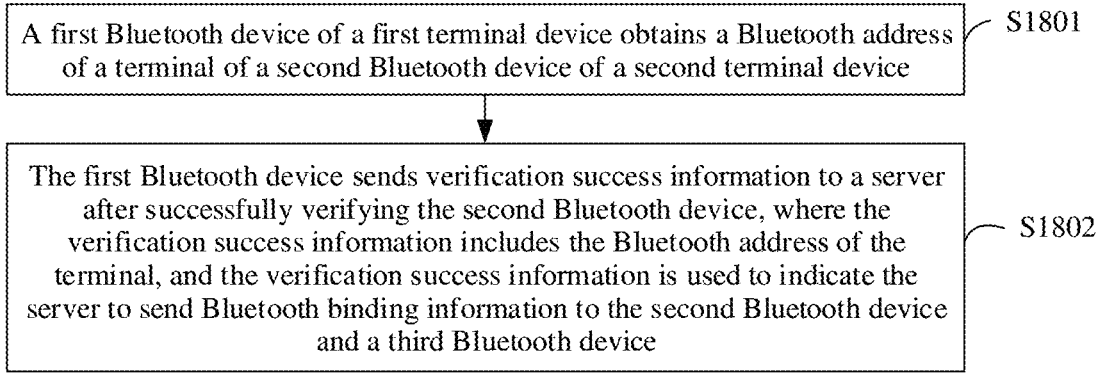
FIG. 18B is a schematic flowchart of a method for mutual trust between Bluetooth devices according to at least an embodiment of this application.

FIG. 18B is a flowchart of an implementation of a method for mutual trust between Bluetooth devices. The method is applied to a first Bluetooth device. A specific implementation principle of each step is as follows:

S1801: The first Bluetooth device obtains a Bluetooth address of a terminal of a second Bluetooth device.

S1802: The first Bluetooth device sends verification success information to a server after successfully verifying the second Bluetooth device, where the verification success information includes the Bluetooth address of the terminal, the verification success information is used to indicate the server to send Bluetooth binding information to the second Bluetooth device and a third Bluetooth device, and the Bluetooth binding information is used for Bluetooth binding between the second Bluetooth device and the third Bluetooth device.

In this embodiment of this application, the third Bluetooth device is a device that completes mutual authentication with the first Bluetooth device. Mutual authentication is completed between the first Bluetooth device and the third Bluetooth device, that is, mutual authentication between the first Bluetooth device and the third Bluetooth device succeeds. The authentication may be mutual authentication at a service layer. A service relationship between the first Bluetooth device and the third Bluetooth device is established. After successfully verifying the second Bluetooth device, the first Bluetooth device sends the Bluetooth address of the terminal of the second Bluetooth device to the server, and the server sends the Bluetooth binding information to the second Bluetooth device and the third Bluetooth device.

The verification success information is used to authorize a sharing operation. When the first Bluetooth device sends the verification success information to the server, it indicates that the first Bluetooth device authorizes the server to perform the sharing operation, for example, the first Bluetooth device authorizes the server to perform key sharing. The verification success information sent by the first Bluetooth device to the server carries the Bluetooth address of the terminal of the second Bluetooth device. In some embodiments, the verification success information may be encrypted by the first Bluetooth device by using a service private key. The server pre-stores a service public key of the first Bluetooth device, or may interact with the first Bluetooth device and obtain a service public key of the first Bluetooth device, for example, the verification success information also carries the service public key of the first Bluetooth device.

After obtaining the Bluetooth address of the terminal of the second Bluetooth device, the server generates and sends the Bluetooth binding information to the second Bluetooth device and the third Bluetooth device, so as to establish a Bluetooth binding relationship between the second Bluetooth device and the third Bluetooth device.

By way of example and not limitation, the Bluetooth binding information sent to the second Bluetooth device includes a Bluetooth address of a terminal of the third Bluetooth device and a link key. The Bluetooth binding information sent to the third Bluetooth device includes the Bluetooth address of the terminal of the second Bluetooth device and a link key.

The link key is a Bluetooth communication key, and is used for encryption and decryption in Bluetooth communication. The link key may be randomly generated by the server, may be randomly generated by a third-party server obtained by the server, or may be generated through negotiation between the server and a third-party server. The third-party server may be, for example, a terminal server. It should be noted that the server pre-stores the Bluetooth address of the terminal of the third Bluetooth device, or may interact with the third Bluetooth device and obtain the Bluetooth address of the terminal of the third Bluetooth device.

By way of example and not limitation, both the Bluetooth binding information sent to the second Bluetooth device and the Bluetooth binding information sent to the third Bluetooth device may include the Bluetooth address of the terminal of the second Bluetooth device, a Bluetooth address of a terminal of the third Bluetooth device, and a link key.

By way of example and not limitation, the Bluetooth binding information sent to the second Bluetooth device includes a Bluetooth address of a terminal of the third Bluetooth device, a Bluetooth public key of the third Bluetooth device, and a link key seed. The Bluetooth binding information sent to the third Bluetooth device includes at least the Bluetooth address of the terminal of the second Bluetooth device, a Bluetooth public key of the second Bluetooth device, and a link key seed. After receiving the Bluetooth address of the terminal of the third Bluetooth device, the Bluetooth public key of the third Bluetooth device, and the link key seed, the second Bluetooth device first generates a link key based on a key derivation function algorithm defined in a Bluetooth specification by using a Bluetooth private key of the second Bluetooth device, the Bluetooth public key of the third Bluetooth device, the Bluetooth address of the terminal of the third Bluetooth device, the Bluetooth address of the terminal of the second Bluetooth device, and the link key seed, and then binds the Bluetooth address of the terminal of the third Bluetooth device to the link key. After receiving the Bluetooth address of the terminal of the second Bluetooth device, the Bluetooth public key of the second Bluetooth device, and the link key seed, the third Bluetooth device first generates a link key based on the key derivation function algorithm defined in the Bluetooth specification by using a Bluetooth private key of the third Bluetooth device, the Bluetooth public key of the second Bluetooth device, the Bluetooth address of the terminal of the second Bluetooth device, the Bluetooth address of the terminal of the third Bluetooth device, and the link key seed, and then binds the Bluetooth address of the terminal of the second Bluetooth device to the link key.

It should be noted that the verification success information sent by the first Bluetooth device to the server includes the Bluetooth public key of the second Bluetooth device and the Bluetooth public key of the third Bluetooth device. The first Bluetooth device obtains the Bluetooth public key of the second Bluetooth device in a process of verifying the second Bluetooth device, and obtains the Bluetooth public key of the third Bluetooth device in a process of pairing the first Bluetooth device with the third Bluetooth device. Alternatively, the server pre-stores the Bluetooth public key of the third Bluetooth device, and the first Bluetooth device does not send the Bluetooth public key to the server.

The verification performed by the first Bluetooth device on the second Bluetooth device may be device validity verification. For example, a process in which the first Bluetooth device performs verification on the second Bluetooth device may be implemented by using a CA root certificate preset in the first Bluetooth device, a certificate chain sent by a second terminal, and a digital signature. The second Bluetooth device signs, by using a service private key, information including the service public key, service data, and the Bluetooth address of the terminal of the second Bluetooth device. The service public key includes at least one level of digital certificate issued by a CA. The second Bluetooth device generates a device validity certificate of the service public key by using the at least one level of digital certificate. After the validity verification performed on the second Bluetooth device by using the CA root certificate succeeds, the first Bluetooth device determines that the information sent by the second Bluetooth device, such as the service public key, the service data, and the Bluetooth address of the terminal, comes from the valid second Bluetooth device, then signs the specific data by using the service private key of the first Bluetooth device, and generates the verification success information. The descriptions herein are merely examples, and cannot be construed as a specific limitation on this application.

Service private keys of the second Bluetooth device and the third Bluetooth device may be stored in a trusted execution environment (TEE), a secure element (SE), or a TEE and an SE of the terminal device, to further improve data security. The SE includes but is not limited to an embedded secure element (eSE), an SE integrated into a system-on-a-chip (SoC) of the terminal device, and the like. It may be understood that, as long as another terminal device uses the service private key, the service private key may be stored in the TEE or the SE, or may be stored in the TEE and the SE.

Based on the Bluetooth binding information sent by the server, the second Bluetooth device and the third Bluetooth device establish the Bluetooth binding relationship between each other in advance, that is, the host of the Bluetooth module of the second Bluetooth device and the host of the Bluetooth module of the third Bluetooth device are configured with the Bluetooth binding information of each other in advance. A secure Bluetooth connection can be established when one of the Bluetooth devices requests to establish a connection according to the Bluetooth address (a specified Bluetooth address) of a terminal of the other device. It should be noted that for each Bluetooth binding scenario, link keys may be different. In other words, a link key deployed by the server to the second Bluetooth device and a link key deployed by the server to the third Bluetooth device may be unique. Bluetooth binding performed by using the unique link key can improve security of Bluetooth communication between the second Bluetooth device and the third Bluetooth device, and is applied to a scenario with a high security requirement.

In this embodiment of this application, the first Bluetooth device sends the Bluetooth address of the terminal of the second Bluetooth device that is successfully verified to the server. The server sends the Bluetooth binding information, and establishes the Bluetooth binding relationship between the second Bluetooth device and the third Bluetooth device in advance. Thus, implementing secure pairing between the second Bluetooth device and the third Bluetooth device through a manual operation of a user and then exchange data are not performed. This embodiment of this application implements the secure Bluetooth connection between the second Bluetooth device and the third Bluetooth device without the user operation. In addition, transmitted data is encrypted, and this improves security of data exchange.

On the basis of Embodiment 17, optionally, in another example of this application, the verification success information further includes an identity resolving key IRK, and the IRK belongs to a key at a communication layer.

During pairing, the first Bluetooth device and the third Bluetooth device each generate the IRK, and configure the IRK to the host of the Bluetooth module, the Bluetooth chip, or a Bluetooth controller controlled or configured by the host, so that the first Bluetooth device and the third Bluetooth device each can generate a resolvable private address by using the IRK, send a broadcast message that carries the resolvable private address, and can successfully verify the resolvable private address carried in the broadcast message. As described above, such setting can implement mutual recognition between the first Bluetooth device and the third Bluetooth device, so as to perform a subsequent data exchange process, and implement a control process such as unlocking and locking.

When the verification success information further includes the IRK, the server sends the IRK to the second Bluetooth device before, when, or after sending the Bluetooth binding information. Such setting implements the secure Bluetooth connection between the second Bluetooth device and the third Bluetooth device on the basis of mutual recognition established by using the IRK. Interaction is performed by using the resolvable random address. The third Bluetooth device can make a response only to Bluetooth information sent by the second Bluetooth device holding the IRK. This further improves the overall efficiency, security, and privacy of the solution.

In another example of this application, when the verification success information does not include an IRK, the first Bluetooth device may send the IRK to the second Bluetooth device after successfully verifying the verification on the second Bluetooth device. The second Bluetooth device registers the IRK with a host or a Bluetooth chip.

In another example of this application, when the verification success information does not include an IRK, the server may send the IRK used by the third Bluetooth device to the second Bluetooth device before, when, or after sending the Bluetooth binding information.

In other words, the IRK may come from the first Bluetooth device, or may be provided by the server for the second Bluetooth device. It should be noted that the IRK sent by the server to the second Bluetooth device may be the same as or different from the IRK generated when the first Bluetooth device is paired with the third Bluetooth device. It may be understood that when the IRKs are different, the server further is configured to configure the IRK sent to the second Bluetooth device to a host of a Bluetooth module or a Bluetooth chip of the third Bluetooth device.

Embodiment 18

Figure 19:
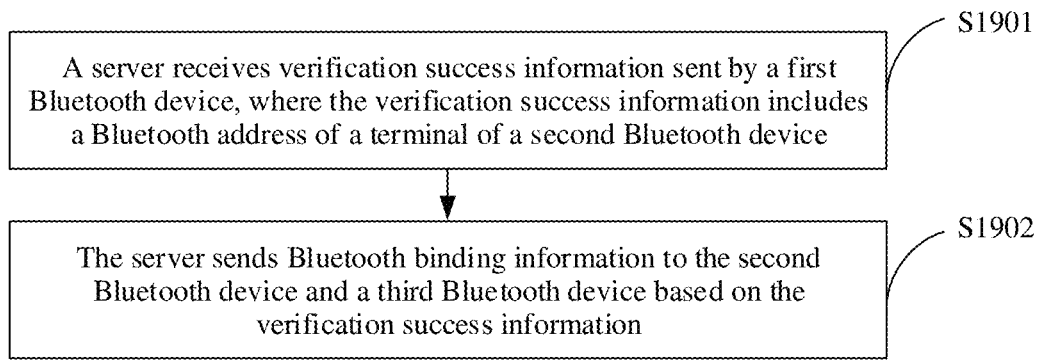
FIG. 19 is a schematic flowchart of another method for mutual trust between Bluetooth devices according to at least an embodiment of this application.

FIG. 19 is a flowchart of an implementation of another method for mutual trust between Bluetooth devices. Corresponding to the embodiment shown in FIG. 18B, the method is applied to a server. A specific implementation principle of each step is as follows: It should be noted that steps that are the same as those in the foregoing embodiment are not described herein again. For details, refer to the foregoing embodiment.

S1901: The server receives verification success information sent by a first Bluetooth device, where the verification success information includes a Bluetooth address of a terminal of a second Bluetooth device, and the verification success information is generated after the first Bluetooth device successfully verifies the second Bluetooth device and is sent to the server.

S1902: The server sends Bluetooth binding information to the second Bluetooth device and a third Bluetooth device based on the verification success information, where the Bluetooth binding information is used for Bluetooth binding between the second Bluetooth device and the third Bluetooth device.

In some embodiments, in addition to sending the Bluetooth binding information to the second Bluetooth device, the server further sends an IRK used by the third Bluetooth device to the second Bluetooth device. The IRK may come from the first Bluetooth device or be provided by the server for the second Bluetooth device.

By way of example and not limitation, on the basis of the method shown in FIG. 19, the method further includes: The server sends the same IRK to the second Bluetooth device and the third Bluetooth device, where the IRK is used to indicate the second Bluetooth device and the third Bluetooth device to generate a resolvable private address and send a broadcast message, and the broadcast message carries the resolvable private address.

By way of another example and not limitation, on the basis of the method shown in FIG. 19, the verification success information further carries an IRK in the first Bluetooth device, and the IRK is generated when the first Bluetooth device and the third Bluetooth device perform Bluetooth pairing and is configured on the first Bluetooth device and the third Bluetooth device. In this case, the method shown in FIG. 19 further includes: The server sends the IRK from the first terminal device to the second Bluetooth device, where the IRK is used to indicate the second Bluetooth device and the third Bluetooth device to generate a resolvable private address and send a broadcast message, and the broadcast message carries the resolvable private address.

In some embodiments, the first Bluetooth device is a device integrated into the server, and the device is an authorized device configured to verify the second Bluetooth device. In this case, the server integrates a function of the first Bluetooth device. It should be noted that the authorized device may further not include a Bluetooth module, that is, may not be a Bluetooth device.

In an example of this application, the server verifies the second Bluetooth device. After the verification succeeds, the server generates and sends the Bluetooth binding information to the second Bluetooth device and the third Bluetooth device. The Bluetooth binding information is used for Bluetooth binding between the second Bluetooth device and the third Bluetooth device. The Bluetooth binding information sent to the second Bluetooth device and the third Bluetooth device may be the same or different.

It should be noted that the server pre-stores a Bluetooth address of a terminal of the third Bluetooth device, or may interact with the third Bluetooth device and obtain a Bluetooth address of a terminal of the third Bluetooth device. The server is configured to interact with the second Bluetooth device to obtain the Bluetooth address of the terminal of the second Bluetooth device.

It should be further noted that, in addition to sending the Bluetooth binding information to the second Bluetooth device, the server further sends the IRK that is the same as that of the third Bluetooth device to the second Bluetooth device. The IRK may come from the third Bluetooth device, or the server provides the same IRK to the second Bluetooth device and the third Bluetooth device.

By way of example and not limitation, after a user initiates a car rental service to the server by using the second Bluetooth device and successfully places an order, the second Bluetooth device sends the Bluetooth address of the terminal to the server. The server verifies the second Bluetooth device, and the verification performed by the server on the second Bluetooth device may be device validity verification. For example, the verification process may be implemented by using a CA root certificate preset in the server, a certificate chain sent by a second terminal, and a digital signature. When successfully verifying the second Bluetooth device, the server generates the Bluetooth binding information, and sends the Bluetooth binding information to the second Bluetooth device and the third Bluetooth device. In this example, the third Bluetooth device is an in-vehicle terminal.

Embodiment 19

Figure 20:
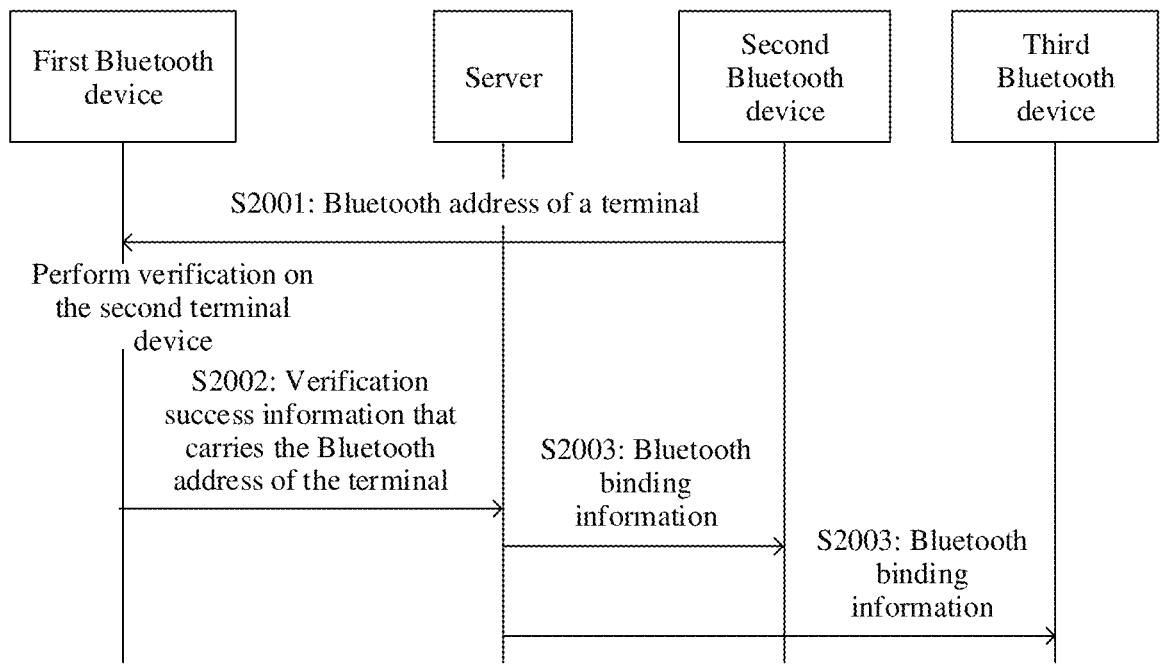
FIG. 20 is a schematic flowchart of another method for mutual trust between Bluetooth devices according to at least an embodiment of this application.

FIG. 20 is a flowchart of an implementation of another method for mutual trust between Bluetooth devices. The method is applied to a system for mutual trust between Bluetooth devices, for example, the system for mutual trust between Bluetooth devices shown in FIG. 18A. A specific implementation principle of each step is as follows: It should be noted that steps that are the same as those in the foregoing embodiment are not described herein again. For details, refer to the foregoing embodiment.

S2001: A second Bluetooth device sends a Bluetooth address of a terminal of the second Bluetooth device to a first Bluetooth device.

S2002: The first Bluetooth device obtains the Bluetooth address of the terminal of the second Bluetooth device, and after verifying the second Bluetooth device succeeds, sends verification success information that carries the Bluetooth address of the terminal to a server.

S2003: The server receives the verification success information sent by the first Bluetooth device, and sends Bluetooth binding information to the second Bluetooth device and a third Bluetooth device.

The Bluetooth binding information is used for Bluetooth binding between the second Bluetooth device and the third Bluetooth device. It should be noted that, after receiving the Bluetooth binding information, the second Bluetooth device and the third Bluetooth device bind a Bluetooth address of a terminal of the peer device to a link key, and configure the banded Bluetooth address and link key to a host of a Bluetooth module or a Bluetooth chip.

The Bluetooth binding information sent to the second Bluetooth device and the third Bluetooth device may be the same or different. For example, the Bluetooth binding information includes Bluetooth addresses of terminals of the two devices and the link key, the Bluetooth binding information includes the Bluetooth address of the terminal of the peer device and the link key, or the Bluetooth binding information includes a Bluetooth public key of the peer device, the Bluetooth address of the terminal of the peer device, and a link key seed.

In this embodiment of this application, the first Bluetooth device sends the Bluetooth address of the terminal of the second Bluetooth device that is successfully verified to the server. The server sends the Bluetooth binding information, and establishes the Bluetooth binding relationship between the second Bluetooth device and the third Bluetooth device in advance. Thus, implementing secure Bluetooth binding between the second Bluetooth device and the third Bluetooth device through a manual operation of a user and then exchange data is not performed. This embodiment of this application implements, without the user operation, the Bluetooth connection between the second terminal device and the third terminal device that were without interaction before. In addition, transmitted data is encrypted, and this improves security of data exchange.

Embodiment 20

Figure 21:
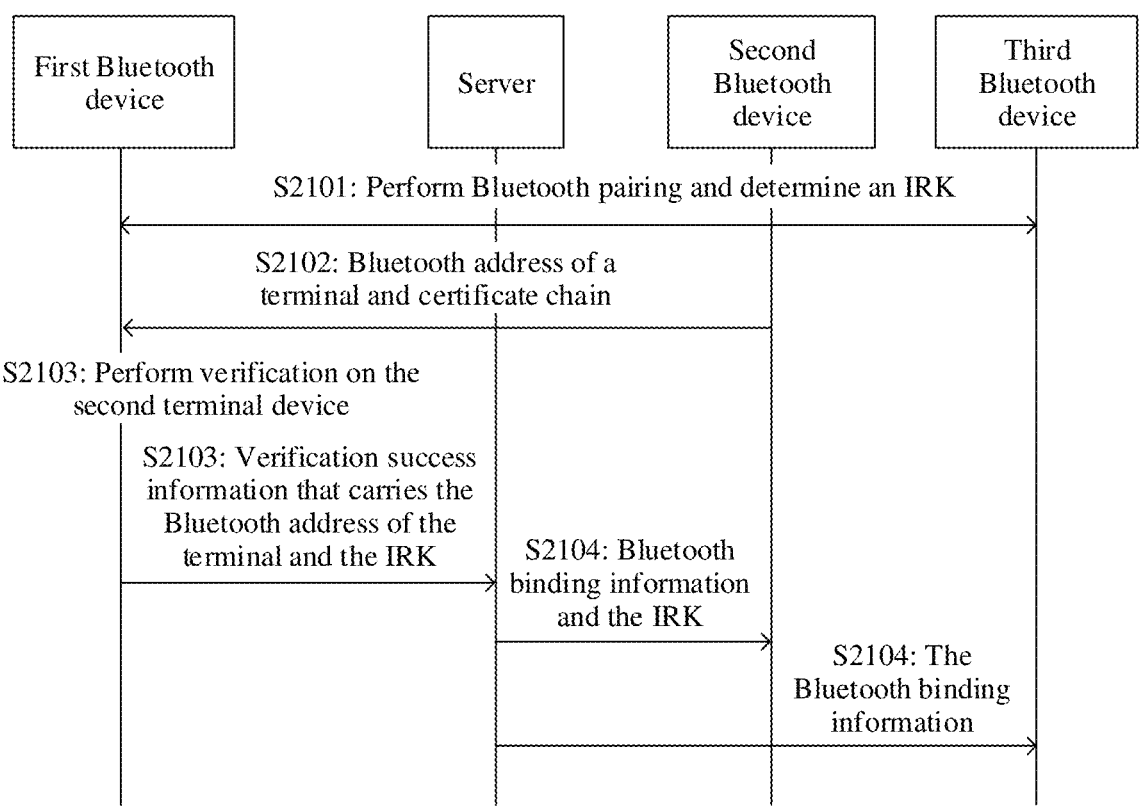
FIG. 21 is a schematic flowchart of another method for mutual trust between Bluetooth devices according to at least an embodiment of this application.

On the basis of the embodiment shown in FIG. 20, FIG. 21 is a flowchart of an implementation of another method for mutual trust between Bluetooth devices. The method is applied to a system for mutual trust between Bluetooth devices, for example, the system for mutual trust between Bluetooth devices shown in FIG. 18A. A specific implementation principle of each step is as follows: It should be noted that steps that are the same as those in the foregoing embodiment are not described herein again. For details, refer to the foregoing embodiment.

S2101: A first Bluetooth device performs Bluetooth pairing with a third Bluetooth device to determine an IRK.

S2102: A second Bluetooth device sends a device validity certificate that includes a Bluetooth address of a terminal of the second Bluetooth device and a certificate chain to the first Bluetooth device.

S2103: The first Bluetooth device obtains the Bluetooth address of the terminal of the second Bluetooth device, verifies validity of the second Bluetooth device based on the certificate chain, and after successfully verifying the second Bluetooth device, sends verification success information that carries the Bluetooth address of the terminal and the IRK to a server.

S2104: The server receives the verification success information sent by the first Bluetooth device, sends Bluetooth binding information to the second Bluetooth device and the third Bluetooth device, and sends the IRK to the second Bluetooth device.

After receiving the verification success information, the server may send the IRK and the Bluetooth binding information together or separately send the IRK and the Bluetooth binding information. This is not limited in this application.

Embodiment 21

Figure 22:
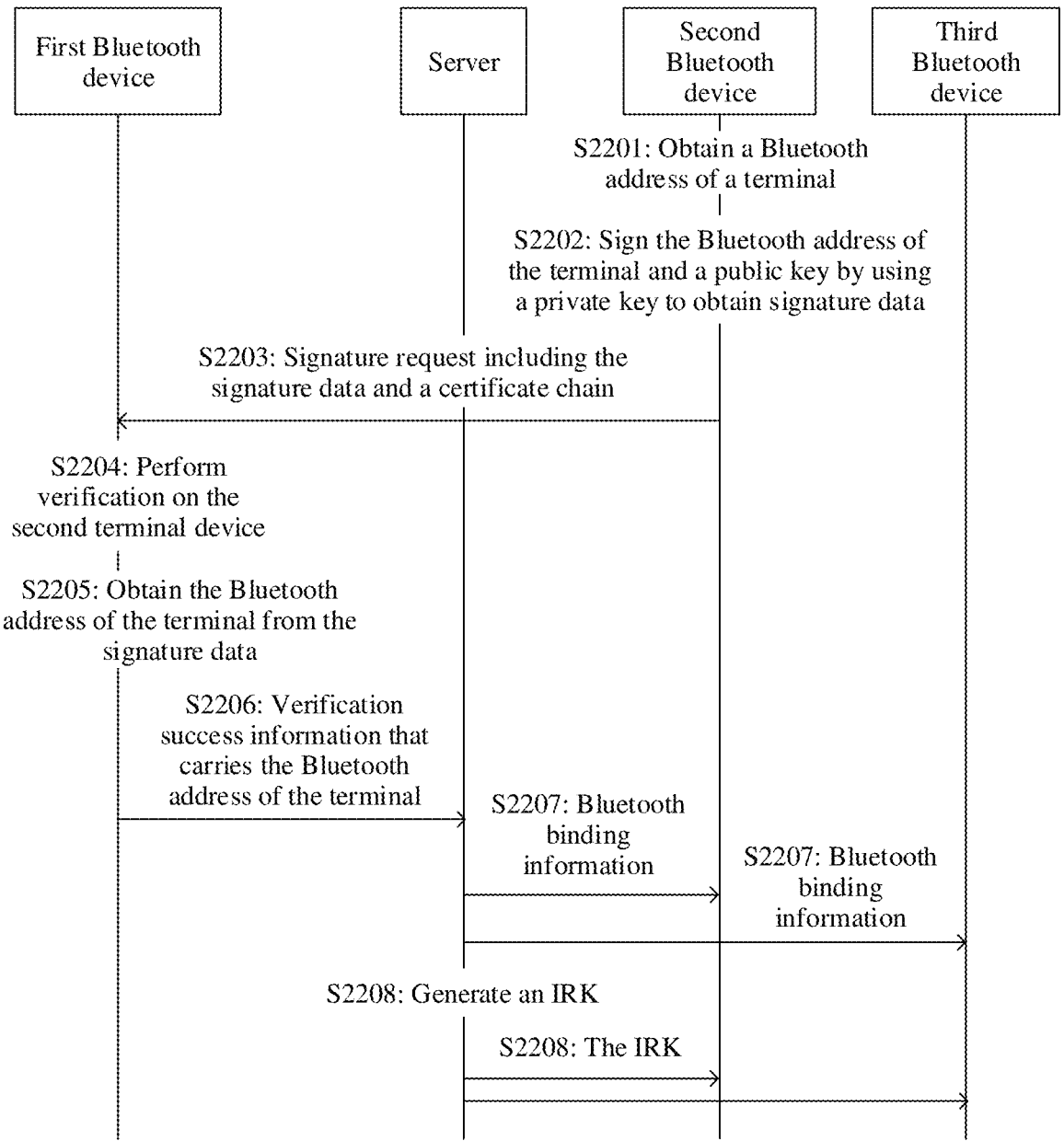
FIG. 22 is a schematic flowchart of another method for mutual trust between Bluetooth devices according to at least an embodiment of this application.

On the basis of the embodiment shown in FIG. 20, FIG. 22 is a flowchart of an implementation of another method for mutual trust between Bluetooth devices. The method is applied to a system for mutual trust between Bluetooth devices, for example, the system for mutual trust between Bluetooth devices shown in FIG. 18A. A specific implementation principle of each step is as follows: It should be noted that steps that are the same as those in the foregoing embodiment are not described herein again. For details, refer to the foregoing embodiment.

S2201: A second Bluetooth device obtains a Bluetooth address of a terminal of the second Bluetooth device.

S2202: The second Bluetooth device signs the Bluetooth address of the terminal and a service public key of the second Bluetooth device by using a service private key of the second Bluetooth device to obtain signature data.

S2203: The second Bluetooth device sends a signature request including the signature data and a certificate chain to a first Bluetooth device.

S2204: The first Bluetooth device verifies device validity of the second Bluetooth device based on a preset root CA certificate.

S2205: After the verification succeeds, the first Bluetooth device obtains the Bluetooth address of the terminal of the second Bluetooth device from the signature data.

S2206: The second Bluetooth device sends verification success information that carries the Bluetooth address of the terminal to a server.

S2207: The server receives the verification success information sent by the first Bluetooth device, and sends Bluetooth binding information to the second Bluetooth device and a third Bluetooth device.

S2208: The server generates an IRK, sends the IRK to the second Bluetooth device and the third Bluetooth device.

In some embodiments, the server may first generate the IRK and the Bluetooth binding information after receiving the verification success information, and then send the IRK and the Bluetooth binding information together, or send the IRK first, and then send the Bluetooth binding information.

The following describes implementation processes of Embodiment 17 to Embodiment 21 in this application by using specific scenario descriptions. It should be noted that the descriptions herein are merely examples, and cannot be construed as a specific limitation on this application.

Scenario 4

Figure 23A:
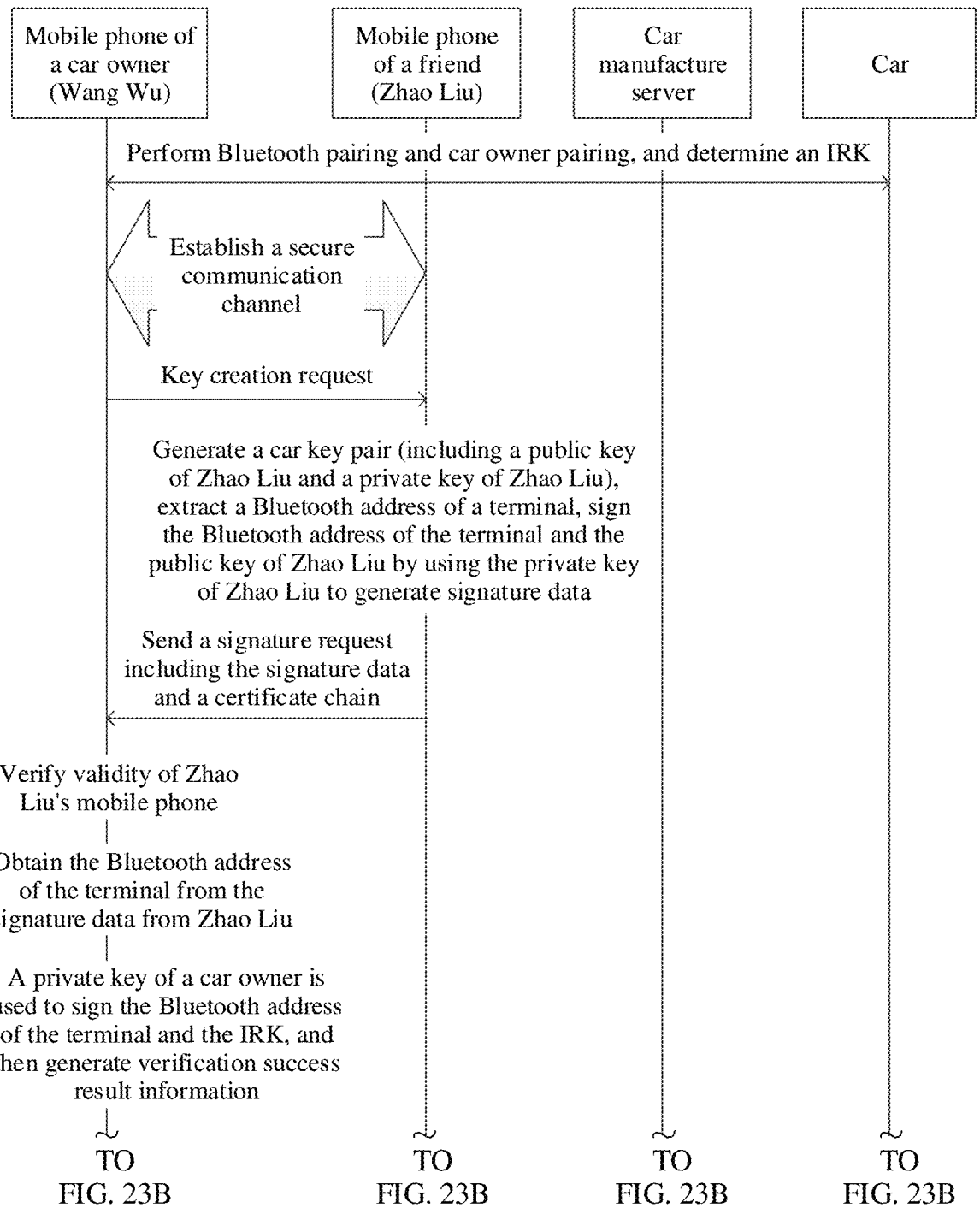
FIG. 23A and FIG. 23B are a schematic diagram of interaction of another method for mutual trust between Bluetooth devices according to at least an embodiment of this application.
Figure 23B:
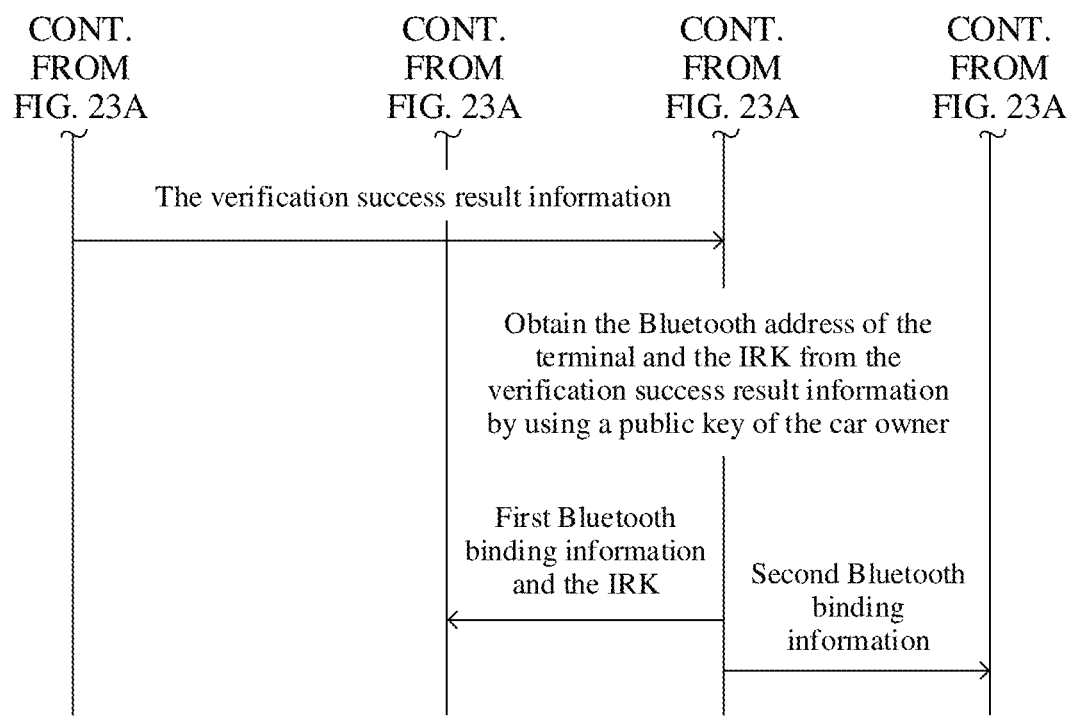

As shown in FIG. 23A and FIG. 23B, a user Wang Wu purchases a car, and Wang Wu is a car owner. The car is a car including an in-vehicle terminal, and the in-vehicle terminal includes a Bluetooth module.

Wang Wu performs Bluetooth pairing (at a communication layer) and car owner pairing (at a service layer) with the car for the first time by using a mobile phone of the car owner. For example, the mobile phone of the car owner is paired with the car and an engine of the car is activated for the first time by using the mobile phone, and the mobile phone of the car owner and the car determine an IRK. The IRK may be generated by a mobile phone server or a car manufacturer server and sent from a cloud to the mobile phone of the car owner and the car, or may be generated by one of the two parties and exchanged with each other. The IRK is registered with hosts of Bluetooth modules or Bluetooth chips of the two parties.

When Wang Wu is to share a digital car key with his friend Zhao Liu for use, a secure communication channel is to be established between Wang Wu's mobile phone and Zhao Liu's mobile phone (a mobile phone of a friend). That Wang Wu sends a sharing link to Zhao Liu's mobile phone by using the mobile phone may be specifically that Wang Wu sends the sharing link, such as URL, to Zhao Liu's mobile phone by using an instant chat tool, a short message, an email, or Bluetooth communication. Zhao Liu taps the sharing link to establish the secure communication channel between the mobile phone of the car owner and Zhao Liu's mobile phone. It should be noted that the communication channel is a communication channel authorized by the car manufacturer server.

After the secure communication channel is established between Wang Wu's mobile phone and Zhao Liu's mobile phone, service data between Wang Wu's mobile phone and Zhao Liu's mobile phone is exchanged through the secure communication channel. Wang Wu's mobile phone sends a key creation request including a key configuration parameter (such as a validity period, or key permission) to Zhao Liu's mobile phone. Zhao Liu's mobile phone generates a car key pair (including a public key of Zhao Liu and a private key of Zhao Liu), extracts a Bluetooth address of a terminal, signs the Bluetooth address of the terminal and the public key of Zhao Liu by using the private key of Zhao Liu to generate signature data, and sends a signature request including the signature data and a certificate chain to Wang Wu's mobile phone. Wang Wu's mobile phone verifies the signature data and the certificate chain, namely, validity of Zhao Liu's mobile phone based on a pre-stored root CA certificate. After the verification succeeds, Wang Wu's mobile phone determines that the public key of Zhao Liu in the signature request indeed comes from the valid mobile phone.

After successfully verifying Zhao Liu's mobile phone, Wang Wu's mobile phone obtains the Bluetooth address of the terminal in the signature data from Zhao Liu, signs the Bluetooth address of the terminal and the IRK that are from Zhao Liu by using a private key of the car owner Wang Wu, then generates verification success information, and sends the verification success information to the car manufacturer server. The car manufacturer server pre-stores a public key of the car owner and a Bluetooth address of the car.

The car manufacturer server obtains the Bluetooth address of the terminal and the IRK from the verification success information by using the public key of the car owner, and generates first Bluetooth binding information sent to Zhao Liu's mobile phone and second Bluetooth binding information sent to the car. The first Bluetooth binding information includes the car Bluetooth address and a link key. The second Bluetooth binding information includes the Bluetooth address of the terminal and the link key. The car manufacturer server sends the first Bluetooth binding information and the IRK to Zhao Liu's mobile phone, and sends the second Bluetooth binding information to the car. Zhao Liu's mobile phone receives the first Bluetooth binding information, registers the IRK with the host of the Bluetooth module or the Bluetooth chip, and configures Bluetooth binding between the car Bluetooth address and the link key. The car receives the second Bluetooth binding information, registers the IRK with the host of the Bluetooth module or the Bluetooth chip, and configures Bluetooth binding between the Bluetooth address of the terminal and the link key.

Technical effects of this scenario are as follows: Zhao Liu takes the mobile phone that has shared the key and remote Bluetooth binding, and walks to Wang Wu's car. Zhao Liu's mobile phone automatically connects to the car through Bluetooth without interacting with the car before, and performs service layer check by using the shared key on the Bluetooth channel. After the check succeeds, a door of the car is opened. Zhao Liu does not have to perform an operation such as actively connect to a Bluetooth of the car in the entire process.

Scenario 5

Figure 24:
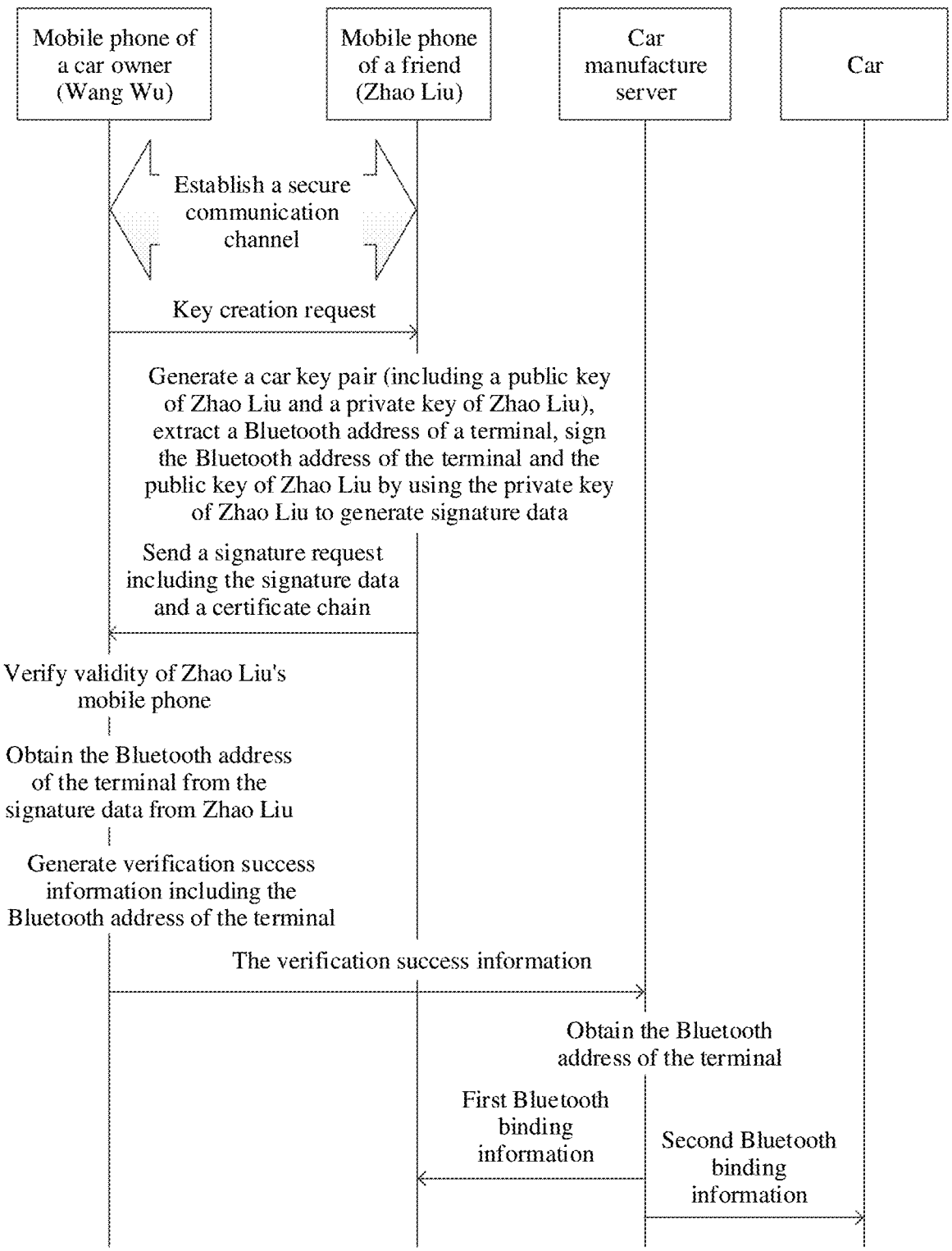
FIG. 24 is a schematic diagram of interaction of another method for mutual trust between Bluetooth devices according to at least an embodiment of this application.

As shown in FIG. 24, a user Wang Wu purchases a car, and Wang Wu is a car owner. The car includes at least a Bluetooth module.

When Wang Wu is to share a digital car key with his friend Zhao Liu for use, a secure communication channel is to be established between Wang Wu's mobile phone (a mobile phone of the car owner) and Zhao Liu's mobile phone (a mobile phone of a friend). That Wang Wu sends a sharing link to Zhao Liu's mobile phone by using the mobile phone may be specifically that Wang Wu sends the sharing link, such as URL, to Zhao Liu's mobile phone by using an instant chat tool, a short message, an email, or Bluetooth communication. Zhao Liu taps the sharing link to establish the secure communication channel between the mobile phone of the car owner and Zhao Liu's mobile phone. It should be noted that the secure communication channel is a communication channel authorized by a car manufacturer server.

After the secure communication channel is established between Wang Wu's mobile phone and Zhao Liu's mobile phone, service data between Wang Wu's mobile phone and Zhao Liu's mobile phone is exchanged through the secure communication channel. Wang Wu's mobile phone sends a key creation request including a key configuration parameter (such as a validity period, or key permission) to Zhao Liu's mobile phone. Zhao Liu's mobile phone generates a car key pair (including a public key of Zhao Liu and a private key of Zhao Liu), extracts a Bluetooth address of a terminal, signs the Bluetooth address of the terminal and the public key of Zhao Liu by using the private key of Zhao Liu to generate signature data, and sends a signature request including the signature data and a certificate chain to Wang Wu's mobile phone. Wang Wu's mobile phone verifies the signature data and the certificate chain, namely, validity of Zhao Liu's mobile phone based on a pre-stored root CA certificate. After the verification succeeds, Wang Wu's mobile phone determines that the public key of Zhao Liu in the signature request indeed comes from the valid mobile phone.

After successfully verifying Zhao Liu's mobile phone, Wang Wu's mobile phone obtains the Bluetooth address of the terminal in the signature data from Zhao Liu, generates verification success information including the Bluetooth address of the terminal, and sends the verification success information to the car manufacturer server. The car manufacturer server pre-stores a car Bluetooth address of the car.

The car manufacturer server obtains the Bluetooth address of the terminal from the verification success information, and generates first Bluetooth binding information sent to Zhao Liu's mobile phone and second Bluetooth binding information sent to the car. The first Bluetooth binding information includes the car Bluetooth address and a link key. The second Bluetooth binding information includes the Bluetooth address of the terminal and the link key. Zhao Liu's mobile phone receives the first Bluetooth binding information, and configures Bluetooth binding between the car Bluetooth address and the link key in a host of a Bluetooth module of the terminal. The car receives the second Bluetooth binding information, and configures Bluetooth binding between the Bluetooth address of the terminal and the link key in a host of a Bluetooth module of the car.

In Scenario 4 and Scenario 5, the Bluetooth binding relationship is established between the owner's car and the mobile phone of the friend. When the friend controls the owner's car by using the mobile phone of the friend, the Bluetooth connection between the mobile phone of the friend and the owner's car is implemented without active operation, and a control instruction is directly sent through the Bluetooth connection. This reduces user operations, and ensures security.

It should be noted that, in Scenario 4 and Scenario 5, information sent by the car manufacturer server to Zhao Liu's mobile phone, such as the Bluetooth binding information and the IRK, may be pushed to Zhao Liu' mobile phone by using a terminal server. It should be further noted that, in Scenario 4 and Scenario 5, the car manufacturer server may generate the link key by the car manufacturer server, or may generate the link key after negotiation with the terminal server.

Scenario 6

A user Qian Ba sends a car rental request to a server of a car rental application by using a car rental application on a mobile phone. When the server approves the car rental request, the server delivers a payment order to Qian Ba's mobile phone, and waits for Qian Ba to pay successfully. Qian Ba's mobile phone signs a Bluetooth address of a terminal and a public key of Qian Ba by using a private key of Qian Ba to generate signature data, and sends a signature request including the signature data and a certificate chain to the server.

The server verifies the signature data and the certificate chain, that is, validity of Qian Ba's mobile phone based on a pre-stored root CA certificate. After the verification succeeds, the server determines that the public key of Qian Ba in the signature request is indeed from the valid mobile phone.

After successfully verifying Qian Ba's mobile phone, the server signs the public key of Qian Ba by using the private key (the private key of the authorized device) to generate authorization information, obtains the Bluetooth address of the terminal of Qian Ba from the signature data from the Qian Ba, and generates first Bluetooth binding information and second Bluetooth binding information, sends the authorization information and the first Bluetooth binding information to Qian Ba's mobile phone, and sends the second Bluetooth binding information to a car. The server pre-stores a car Bluetooth address of the car. The first Bluetooth binding information includes the car Bluetooth address and a link key. The second Bluetooth binding information includes the Bluetooth address of the terminal and the link key.

Qian Ba's mobile phone receives the first Bluetooth binding information, and configures Bluetooth binding between the car Bluetooth address and the link key in a host of a Bluetooth module or a Bluetooth chip. The car receives the second Bluetooth binding information, and configures Bluetooth binding between the Bluetooth address of the terminal and the link key in a host of a Bluetooth module or a Bluetooth chip. After a Bluetooth connection is established between Qian Ba's mobile phone and the car by using the Bluetooth binding information, Qian Ba's mobile phone submits the authorization information to the car. After successfully verifying the authorization information, the car saves the public key of Qian Ba, acknowledges the identity of the shared user (Qian Ba), and allows Qian Ba to operate the car.

In Scenario 6, a Bluetooth binding relationship is established between a mobile phone of a tenant and a car. When one Bluetooth device requests to another specified Bluetooth device to establish a connection, a secure Bluetooth connection between the two Bluetooth devices can be established. The Bluetooth connection between the mobile phone of the tenant and the car can be implemented without active operation, and a control instruction is directly sent through the Bluetooth connection. This reduces user operations and ensures security.

It should be noted that, in Scenario 6, information sent by the server to Qian Ba's mobile phone may further include an IRK in addition to the Bluetooth binding information. It should be further noted that the information sent by the server to Qian Ba's mobile phone may be pushed to Qian Ba's mobile phone by using a terminal server. It should be further noted that, in Scenario 6, a car manufacturer server may generate the link key by the car manufacturer server, or may generate the link key after negotiation with the terminal server.

It should be understood that sequence numbers of the steps do not mean execution orders in the foregoing embodiments. The execution sequences of the processes should be determined based on functions and internal logic of the steps and should not be construed as any limitation on the implementation processes of the embodiments of this application.

Corresponding to the method for mutual recognition or mutual trust between Bluetooth devices in the foregoing embodiments, the following shows a block diagram of a structure of an apparatus for mutual recognition or mutual trust between Bluetooth devices according to the embodiments of this application. For ease of description, only a part related to the embodiments of this application is shown.

Figure 25:
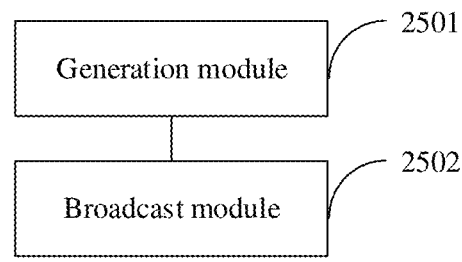
FIG. 25 is a schematic diagram of a structure of an apparatus for mutual recognition between Bluetooth devices according to at least an embodiment of this application.

As shown in FIG. 25, an apparatus for mutual recognition between Bluetooth devices includes:
 a generation module 2501, configured to receive an identity resolving key IRK sent by a server, and generate a resolvable private address by using the IRK; and
 a broadcast module 2502, configured to send a broadcast message, where the broadcast message carries the resolvable private address, and the resolvable private address can be successfully verified by a second Bluetooth device pre-configured with a same IRK.

Figure 26:
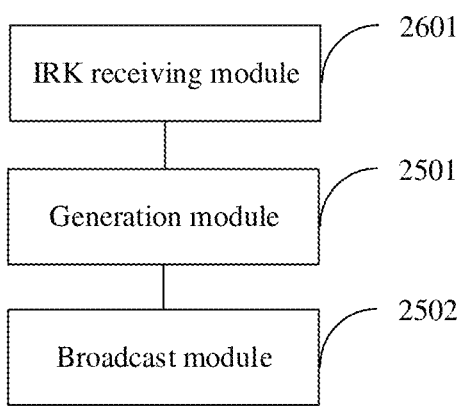
FIG. 26 is a schematic diagram of a structure of another apparatus for mutual recognition between Bluetooth devices according to at least an embodiment of this application.

Optionally, on the basis of the embodiment shown in FIG. 25, as shown in FIG. 26, the apparatus further includes:
 an IRK receiving module 2601, configured to send a service subscription request to the server, where the service subscription request is used to indicate the server to send the IRK to a first Bluetooth device.

Figure 27:
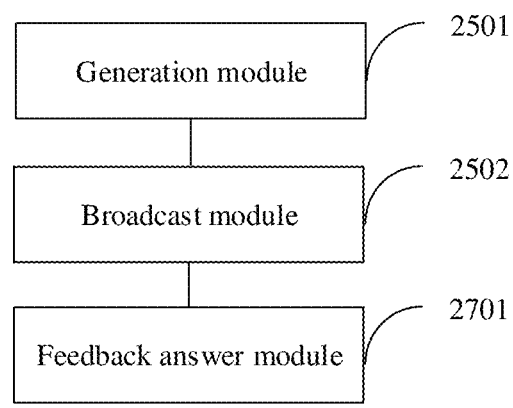
FIG. 27 is a schematic diagram of a structure of another apparatus for mutual recognition between Bluetooth devices according to at least an embodiment of this application.

Optionally, on the basis of the embodiment shown in FIG. 25 or FIG. 26, FIG. 25 is used as an example herein. As shown in FIG. 27, the apparatus further includes:
 a feedback answer module 2701, configured to receive a scan request sent by the second Bluetooth device after the resolvable private address is verified, and feed back an answer based on the scan request, where the answer carries an identifier of the first Bluetooth device, and the answer is used to indicate the second Bluetooth device to upload the identifier to the server and initiate user identity authentication in the server.

Figure 28:
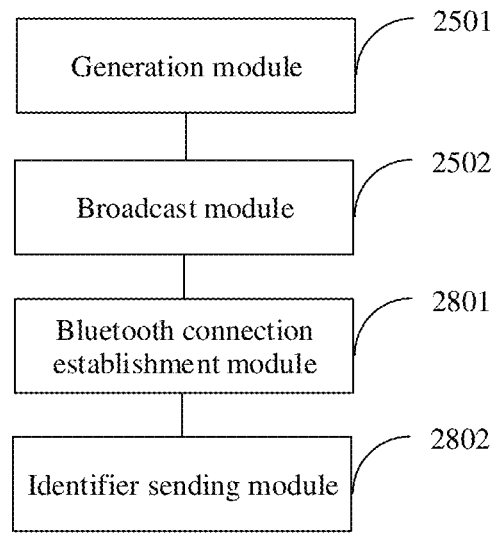
FIG. 28 is a schematic diagram of a structure of another apparatus for mutual recognition between Bluetooth devices according to at least an embodiment of this application.

Optionally, on the basis of the embodiment shown in FIG. 25 or FIG. 26, FIG. 25 is used as an example herein. As shown in FIG. 28, the apparatus further includes:
 a Bluetooth connection establishment module 2801, configured to receive a Bluetooth connection request sent by the second Bluetooth device after the resolvable private address is successfully verified, where the first Bluetooth device establishes a Bluetooth connection to the second Bluetooth device; and
 an identifier sending module 2802, configured to send an identifier to the second Bluetooth device through the Bluetooth connection, where the identifier is used to indicate the second Bluetooth device to upload the identifier to the server and initiate user identity authentication in the server.

Optionally, on the basis of the embodiment shown in FIG. 25, the broadcast message further carries an identifier of the first Bluetooth device.
 the broadcast module is specifically configured to:
 send the broadcast message, where the broadcast message carries the resolvable private address and the identifier, and the broadcast message is used to indicate the second Bluetooth device to upload the identifier to the server after the resolvable private address is successfully verified.

Figure 29:
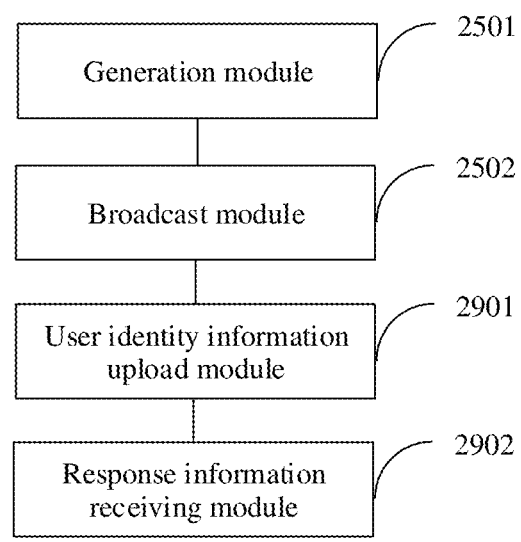
FIG. 29 is a schematic diagram of a structure of another apparatus for mutual recognition between Bluetooth devices according to at least an embodiment of this application.

Optionally, on the basis of the embodiment shown in FIG. 25 or FIG. 26, FIG. 25 is used as an example herein. As shown in FIG. 29, the apparatus further includes:
 a user identity information upload module 2901, configured to upload user identity information to the server;
 a response information receiving module 2902, configured to receive response information returned by the second Bluetooth device after the resolvable private address is verified, where the response message includes an identifier; and the first Bluetooth device uploads the identifier to the server, where the identifier is used to indicate the server to complete user identity authentication based on the user identity information and the identifier.

Figure 30:
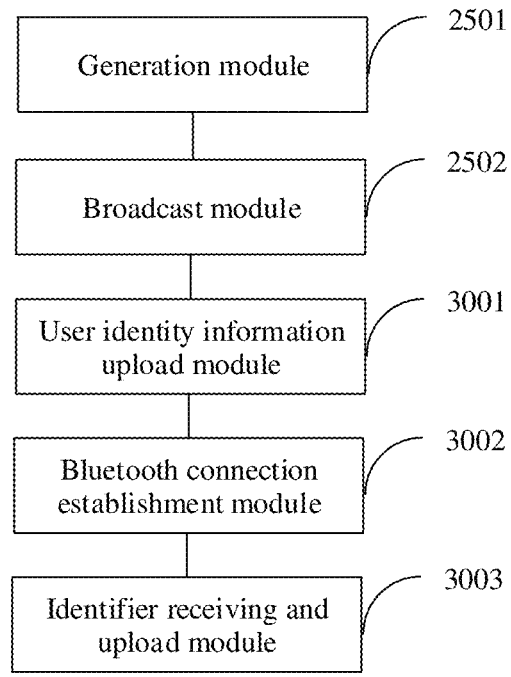
FIG. 30 is a schematic diagram of a structure of another apparatus for mutual recognition between Bluetooth devices according to at least an embodiment of this application.

Optionally, on the basis of the embodiment shown in FIG. 25 or FIG. 26, FIG. 25 is used as an example herein. As shown in FIG. 30, the apparatus further includes:
 a user identity information upload module 3001, configured to upload user identity information to the server;
 a Bluetooth connection establishment module 3002, configured to receive a Bluetooth connection request sent by the second Bluetooth device after the resolvable private address is successfully verified, where the first Bluetooth device establishes a Bluetooth connection to the second Bluetooth device, and the first Bluetooth device and the second Bluetooth device are pre-configured with Bluetooth binding information between each other; and
 an identifier receiving upload module 3003, configured to receive, through the Bluetooth connection, an identifier sent by the second Bluetooth device, and upload the identifier to the server, where the identifier is used to indicate the server to complete user identity authentication based on the user identity information and the identifier.

Optionally, on the basis of the embodiment shown in FIG. 29 or FIG. 30, that the identifier is uploaded to the server includes:
 The first Bluetooth device positions all second Bluetooth devices that send the identifier to the first Bluetooth device, and uploads the identifier of a second Bluetooth device closest to the first Bluetooth device to the server.

Figure 31:
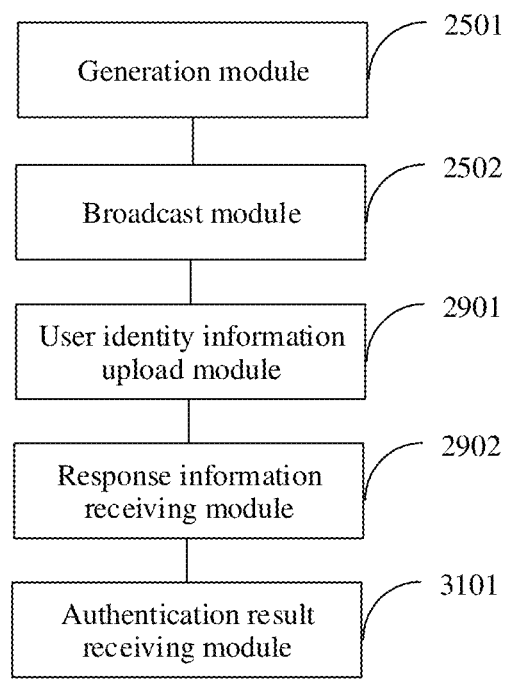
FIG. 31 is a schematic diagram of a structure of another apparatus for mutual recognition between Bluetooth devices according to at least an embodiment of this application.

Optionally, on the basis of the embodiment shown in FIG. 29 or FIG. 30, FIG. 29 is used as an example herein. As shown in FIG. 31, the apparatus further includes:
 an authentication result receiving module 3101, configured to receive an authentication result generated when the server completes the user identity authentication.

Optionally, on the basis of FIG. 29 or FIG. 30, the apparatus further includes a transaction result receiving module, configured to receive a transaction result generated after the server executes a transaction.

Optionally, on the basis of any one of the embodiments in FIG. 27 to FIG. 31, the unique identifier includes at least one of a Bluetooth address of a terminal and a unique user identifier.

Figure 32:
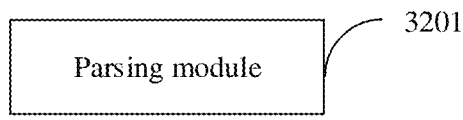
FIG. 32 is a schematic diagram of a structure of another apparatus for mutual recognition between Bluetooth devices according to at least an embodiment of this application.

As shown in FIG. 32, an apparatus for mutual recognition between Bluetooth devices is provided, which is configured in a second Bluetooth device. The second Bluetooth device is pre-configured with an identity resolving key IRK that is the same as an IRK in a first Bluetooth device. The apparatus includes:
- a parsing module 3201, configured to successfully verify a resolvable private address by using the pre-configured IRK when a broadcast message sent by the first Bluetooth device is scanned, where the broadcast message carries the resolvable private address, and the resolvable private address is generated by the first Bluetooth device by using the IRK sent by a server.

Optionally, on the basis of the embodiment shown in FIG. 32, the IRK in the first Bluetooth device is sent by the server to the first Bluetooth device when the server receives a service subscription request sent by the first Bluetooth device.

Figure 33:
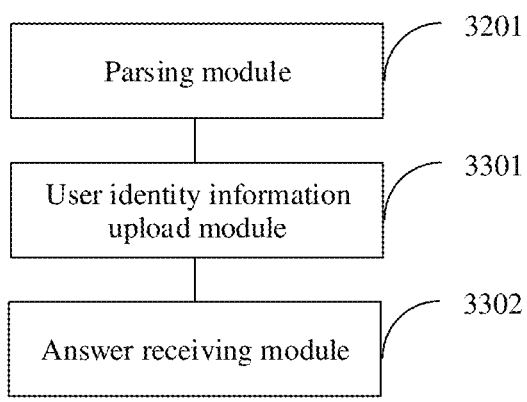
FIG. 33 is a schematic diagram of a structure of another apparatus for mutual recognition between Bluetooth devices according to at least an embodiment of this application.

Optionally, on the basis of the embodiment shown in FIG. 32, as shown in FIG. 33, the apparatus further includes:
- a user identity information upload module 3301, configured to upload user identity information to the server;
- an answer receiving module 3302, configured to send a scan request to the first Bluetooth device after the resolvable private address is successfully verified, receive an answer fed back by the first Bluetooth device based on the scan request, where the answer carries an identifier of the first Bluetooth device; and the second Bluetooth device uploads the identifier to the server, where the identifier is used to indicate the server to complete user identity authentication based on the user identity information and the identifier.

Figure 34:
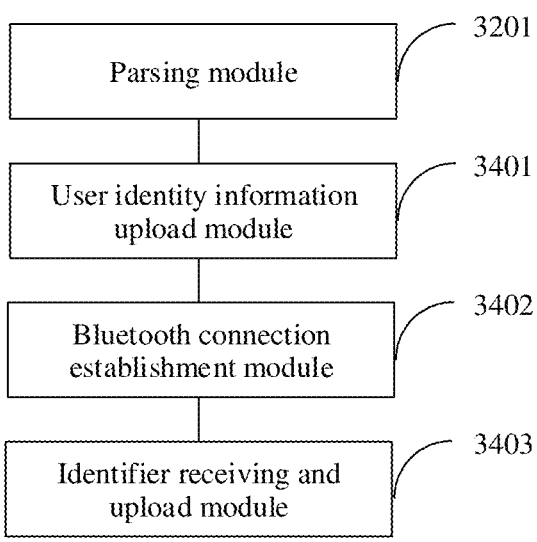
FIG. 34 is a schematic diagram of a structure of another apparatus for mutual recognition between Bluetooth devices according to at least an embodiment of this application.

Optionally, on the basis of the embodiment shown in FIG. 32, as shown in FIG. 34, the apparatus further includes:
- a user identity information upload module 3401, configured to upload user identity information to the server;
- a Bluetooth connection establishment module 3402, configured to send a Bluetooth connection request after the resolvable private address is successfully verified, where the second Bluetooth device establishes a Bluetooth connection to the first Bluetooth device; and
- an identifier receiving and upload module 3403, configured to receive, through the Bluetooth connection, an identifier sent by the first Bluetooth device, and upload the identifier to the server, where the identifier is used to indicate the server to complete user identity authentication based on the user identity information and the identifier.

Figure 35:
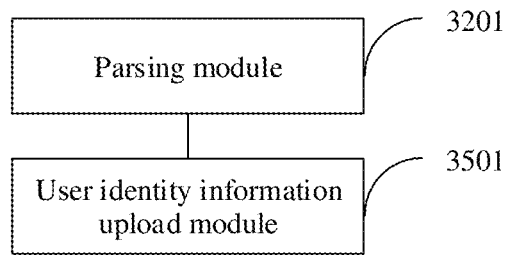
FIG. 35 is a schematic diagram of a structure of another apparatus for mutual recognition between Bluetooth devices according to at least an embodiment of this application.

Optionally, on the basis of the embodiment shown in FIG. 32, as shown in FIG. 35, the apparatus further includes a user identity information upload module 3501, configured to upload user identity information to the server.
- the broadcast message further carries an identifier of the first Bluetooth device; and
- the parsing module is further configured to:
  - after the resolvable private address is successfully verified, obtain the identifier of the first Bluetooth device, and upload the identifier to the server, where the identifier is used to indicate the server to complete user identity authentication based on the user identity information and the identifier.

Optionally, on the basis of any embodiment shown in FIG. 32 to FIG. 35, that the identifier is uploaded to the server includes:

The second Bluetooth device positions all first Bluetooth devices that send the identifier to the second Bluetooth device, and uploads the identifier of a first Bluetooth device closest to the second Bluetooth device to the server.

Figure 36:
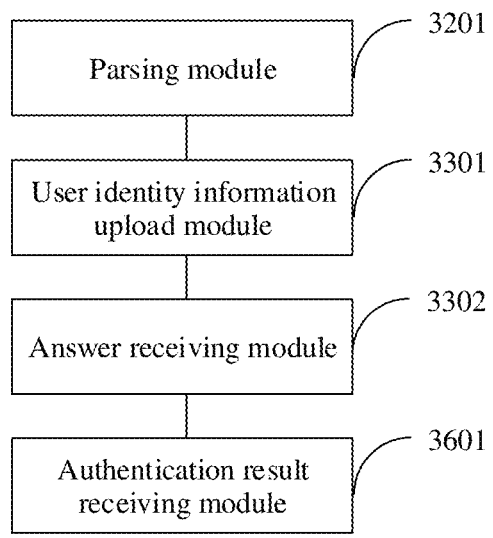
FIG. 36 is a schematic diagram of a structure of another apparatus for mutual recognition between Bluetooth devices according to at least an embodiment of this application.

Optionally, on the basis of any embodiment shown in FIG. 33 to FIG. 35, FIG. 33 is used as an example herein. As shown in FIG. 36, the apparatus further includes:
- an authentication result receiving module 3601, configured to receive an authentication result generated when the server completes the user identity authentication.

Optionally, on the basis of any embodiment shown in FIG. 33 to FIG. 35, the apparatus further includes a transaction result receiving module, configured to receive a transaction result after the server completes a transaction.

Figure 37:
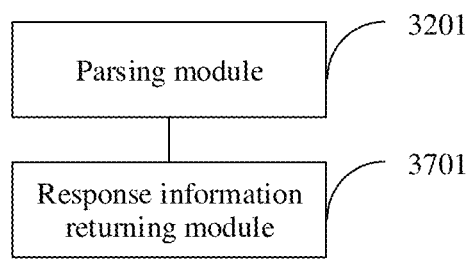
FIG. 37 is a schematic diagram of a structure of another apparatus for mutual recognition between Bluetooth devices according to at least an embodiment of this application.
Figure 38:
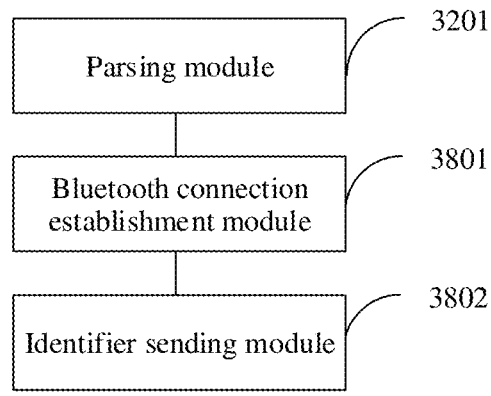
FIG. 38 is a schematic diagram of a structure of another apparatus for mutual recognition between Bluetooth devices according to at least an embodiment of this application.

Optionally, on the basis of the embodiment shown in FIG. 32, as shown in FIG. 37, the apparatus further includes:
- a response information returning module 3701, configured to return response information to the first Bluetooth device after the resolvable private address is successfully verified, where the response information includes an identifier of the second Bluetooth device, and the response message is used to indicate the first Bluetooth device to upload the identifier to the server and initiate user identity authentication in the server Optionally, on the basis of the embodiment shown in FIG. 32, as shown in FIG. 38, the apparatus further includes:
- a Bluetooth connection establishment module 3801, configured to send a Bluetooth connection request to the first Bluetooth device after the resolvable private address is successfully verified, where the second Bluetooth device establishes a Bluetooth connection to the first Bluetooth device; and
- a unique identifier sending module 3802, configured to send an identifier to the first Bluetooth device through the Bluetooth connection, where the identifier is used to indicate the first Bluetooth device to upload the identifier to the server and initiate user identity authentication in the server.

Optionally, on the basis of the embodiments shown in FIG. 33 to FIG. 38, the identifier includes at least one of a Bluetooth address of a terminal and a user identifier.

Figure 39:
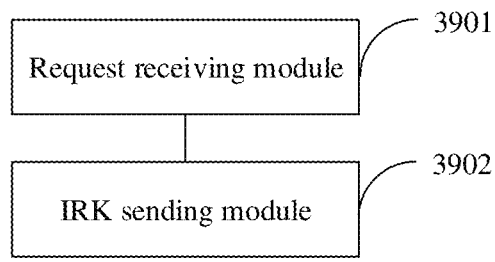
FIG. 39 is a schematic diagram of a structure of an apparatus for mutual trust between Bluetooth devices according to at least an embodiment of this application.

As shown in FIG. 39, an apparatus for mutual recognition between Bluetooth devices is provided. The apparatus includes:
- a request receiving module 3901, configured to receive a service subscription request sent by a first Bluetooth device; and
- an IRK sending module 3902, configured to send an identity resolving key IRK to the first Bluetooth device based on the service subscription request, where the IRK is used to indicate the first Bluetooth device to generate a resolvable private address by using the IRK and send a broadcast message, the broadcast message carries the resolvable private address, and the resolvable private address can be successfully verified by a second Bluetooth device pre-configured with a same IRK.

Figure 40:
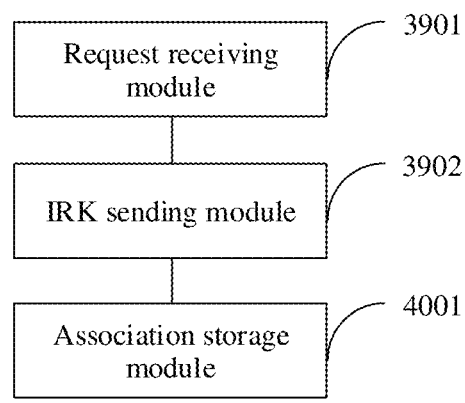
FIG. 40 is a schematic diagram of a structure of another apparatus for mutual trust between Bluetooth devices according to at least an embodiment of this application.

Optionally, on the basis of the embodiment shown in FIG. 39, as shown in FIG. 40, the apparatus further includes:
- an association storage module 4001, configured to store an identifier of the first Bluetooth device in association with user account information, where the identifier includes at least one of a Bluetooth address of a terminal of the first Bluetooth device and a user identifier.

Optionally, on the basis of the embodiment shown in FIG. 39, the apparatus further includes: an identity authentication module, configured to receive user identity information and the identifier of the first Bluetooth device that are sent by the second Bluetooth device, and complete user identity authentication based on the user identity information and the identifier.

Optionally, on the basis of the embodiments shown in FIG. 39 and FIG. 40, the service subscription request carries the Bluetooth address of the terminal of the first Bluetooth device.

Figure 41:
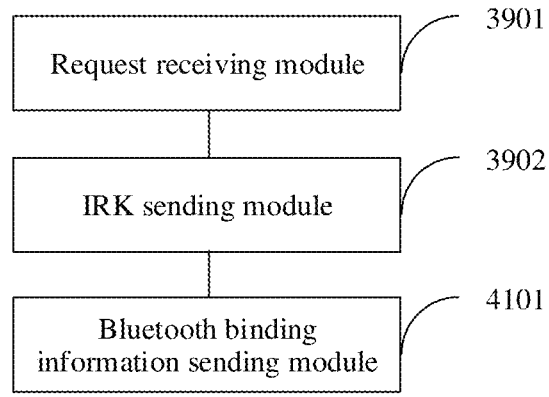
FIG. 41 is a schematic diagram of a structure of another apparatus for mutual trust between Bluetooth devices according to at least an embodiment of this application.

Optionally, on the basis of the embodiments shown in FIG. 39 and FIG. 40, FIG. 39 is used as an example herein. As shown in FIG. 41, the apparatus further includes: a Bluetooth binding information sending module 4101, configured to generate Bluetooth binding information, and send the Bluetooth binding information to the first Bluetooth device and the second Bluetooth device, where the Bluetooth binding information is used for Bluetooth binding between the first Bluetooth device and the second Bluetooth device.

Optionally, on the basis of the embodiment shown in FIG. 40, the Bluetooth binding information includes a Bluetooth communication key link key, a Bluetooth address of a terminal of the first Bluetooth device, and a Bluetooth address of a terminal of the second Bluetooth device, and the link key is a Bluetooth communication key for Bluetooth communication between the first Bluetooth device and the second Bluetooth device.

Figure 42:
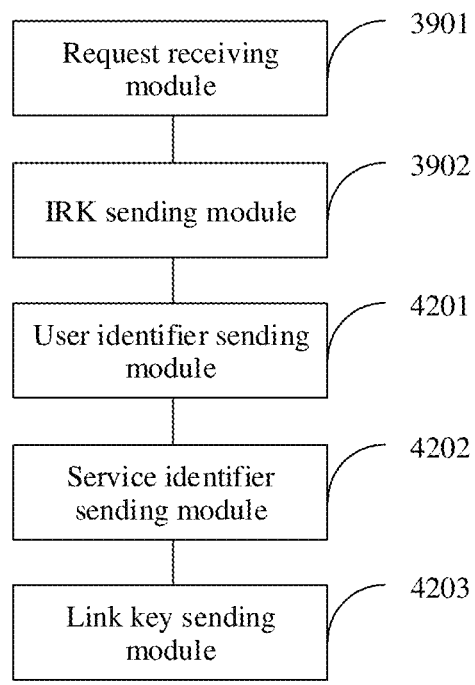
FIG. 42 is a schematic diagram of a structure of another apparatus for mutual trust between Bluetooth devices according to at least an embodiment of this application.

Optionally, on the basis of the embodiments shown in FIG. 39 and FIG. 41, FIG. 39 is used as an example herein. As shown in FIG. 42, the apparatus further includes at least one of a user identifier sending module 4201, a service identifier sending module 4202, and a link key sending module 4203.

The user identifier sending module 4201 is configured to generate a unique user identifier of the first Bluetooth device, and send the unique user identifier to the first Bluetooth device.

The service identifier sending module 4202 is configured to obtain a service identifier, and send the service identifier to the first Bluetooth device.

The link key sending module 4203 is configured to obtain a Bluetooth communication key link key, and send the link key to the first Bluetooth device, where the link key is a Bluetooth communication key between the first Bluetooth device and the second Bluetooth device.

Figure 43:
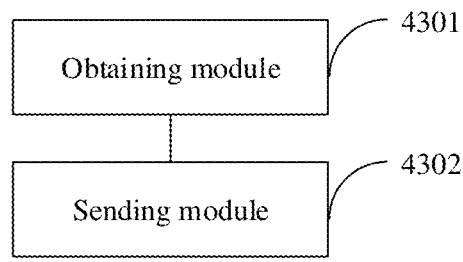
FIG. 43 is a schematic diagram of a structure of another apparatus for mutual trust between Bluetooth devices according to at least an embodiment of this application.

As shown in FIG. 43, an apparatus for mutual trust between Bluetooth devices is provided. The apparatus includes:
an obtaining module 4301, configured to obtain a Bluetooth address of a terminal of a second Bluetooth device; and
a sending module 4302, configured to send verification success information to a server after the second Bluetooth device is verified successfully, where the verification success information includes the Bluetooth address of the terminal, the verification success information is used to indicate the server to send Bluetooth binding information to the second Bluetooth device and a third Bluetooth device, and the Bluetooth binding information is used for Bluetooth binding between the second Bluetooth device and the third Bluetooth device.

Optionally, on the basis of the embodiment shown in FIG. 43, the verification success information further includes an identity resolving key IRK, and the IRK is generated when the first Bluetooth device and the third Bluetooth device perform Bluetooth pairing and is configured on the first Bluetooth device and the third Bluetooth device; and
the verification success information is further used to indicate the server to send the IRK to the second Bluetooth device based on the verification success information, the IRK is used to indicate the second Bluetooth device or the third Bluetooth device to generate a resolvable private address and send a broadcast message, and the broadcast message carries the resolvable private address.

Optionally, on the basis of the embodiment shown in FIG. 43, the verification success information is further used to indicate the server to generate and send an identity resolving key IRK to the second Bluetooth device and the third Bluetooth device based on the verification success information, the IRK is used to indicate the second Bluetooth device or the third Bluetooth device to generate a resolvable private address and send a broadcast message, and the broadcast message carries the resolvable private address.

Figure 44:
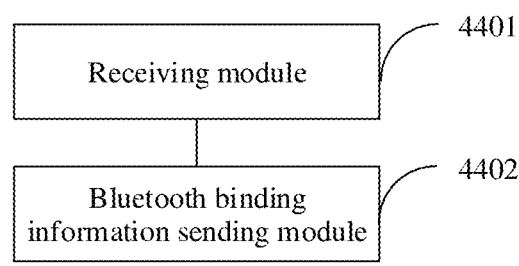
FIG. 44 is a schematic diagram of a structure of another apparatus for mutual trust between Bluetooth devices according to at least an embodiment of this application.

As shown in FIG. 44, an apparatus for mutual trust between Bluetooth devices is provided. The apparatus includes:
a receiving module 4401, configured to receive verification success information sent by a first Bluetooth device, where the verification success information includes a Bluetooth address of a terminal of a second Bluetooth device, and the verification success information is generated after the first Bluetooth device successfully verifies the second Bluetooth device and is sent to the server; and
a Bluetooth binding information sending module 4402, configured to send Bluetooth binding information to the second Bluetooth device and a third Bluetooth device based on the verification success information, and the Bluetooth binding information is used for Bluetooth binding between the second Bluetooth device and the third Bluetooth device.

Figure 45:
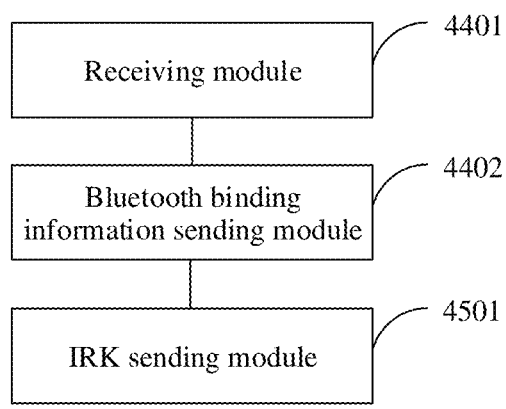
FIG. 45 is a schematic diagram of a structure of another apparatus for mutual trust between Bluetooth devices according to at least an embodiment of this application.

Optionally, on the basis of the embodiment shown in FIG. 44, as shown in FIG. 45, the apparatus further includes: an IRK sending module 4501, configured to generate and send an identity resolving key IRK to the second Bluetooth device and the third Bluetooth device, where the IRK is used to indicate the second Bluetooth device and the third Bluetooth device to generate a resolvable private address and send a broadcast message, and the broadcast message carries the resolvable private address; or configured to send, when the verification success information further includes an IRK in the first terminal device, the IRK to the second Bluetooth device, where the IRK is used to indicate the second Bluetooth device or the third Bluetooth device to generate a resolvable private address and send a broadcast message, the broadcast message carries the resolvable private address, and the IRK is generated when the first Bluetooth device and the third Bluetooth device perform Bluetooth pairing and is configured on the first Bluetooth device and the third Bluetooth device.

Optionally, on the basis of the embodiments shown in FIG. 43 to FIG. 45, the Bluetooth binding information includes a Bluetooth address of a terminal of the second Bluetooth device, a Bluetooth address of a terminal of the third Bluetooth device, and a Bluetooth communication key link key, and the link key is used for encryption and decryption of Bluetooth communication between the second Bluetooth device and the third Bluetooth device.

Optionally, on the basis of the embodiments shown in FIG. 43 to FIG. 45, the Bluetooth binding information includes a Bluetooth address of a terminal of the second Bluetooth device, a Bluetooth address of a terminal of the third Bluetooth device, and a Bluetooth communication key link key seed, and the link key seed is used by the second Bluetooth device and the third Bluetooth device to generate a Bluetooth communication key link key.

It may be clearly understood by persons skilled in the art that, for the purpose of convenient and brief description, division into the foregoing functional units and the modules is taken as an example for illustration. In actual application, the foregoing functions can be allocated to different functional units, and modules and implemented according to a requirement, that is, an inner structure of an apparatus is divided into different functional units or modules to implement all or part of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely used to distinguish each other, and are not intended to limit the protection scope of this application. For a specific working process of the units and modules in the foregoing system, refer to a corresponding process in the foregoing method embodiments. Details are not described herein again.

Figure 46:
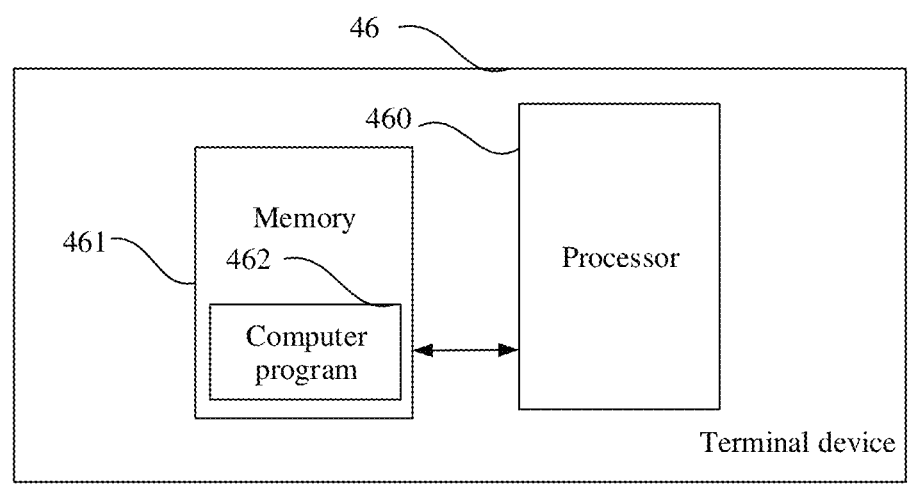
FIG. 46 is a schematic diagram of a structure of a terminal device according to at least an embodiment of this application.

At least an embodiment of this application further provides a terminal device. As shown in FIG. 46, the terminal device includes at least one processor 460 (only one processor is shown in the figure), a memory 461, and a computer program 462 that is stored in the memory 461 and can be run on the at least one processor 460. When executing the computer program 462, the processor 460 implements the steps in any one of the foregoing method embodiments.

At least an embodiment of this application further provides a computer-readable storage medium. The computer-readable storage medium stores a computer program. When the computer program is executed by a processor, the steps in the foregoing method embodiments can be implemented.

At least an embodiment of this application provides a computer program product. When the computer program product runs on a mobile terminal, the mobile terminal is enabled to implement the steps in the foregoing method embodiments when executing the computer program product.

When the integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable medium may include at least any entity or apparatus that can include the computer program code in a terminal device, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disk. In some jurisdictions, according to legislation and patent practice, a computer-readable medium cannot be an electrical carrier signal or a telecommunication signal.

In the foregoing embodiments, the description of each embodiment has respective focuses. For a part that is not described in detail or recorded in at least an embodiment, refer to related descriptions in other embodiments.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In the embodiments provided in this application, it should be understood that the disclosed apparatus and method may be implemented in other manners. For example, the described system embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application. Therefore, the protection scope of this application shall be subject to the protection scope of the claims.

What is claimed is:

1. A method, comprising:
receiving, by a first Bluetooth device, an identity resolving key (IRK) from a server, and generating a resolvable private address based on the IRK;
sending, by the first Bluetooth device, a broadcast message, wherein the broadcast message includes the resolvable private address, and the resolvable private address is successfully verified by a second Bluetooth device pre-configured with the IRK; and receiving, by the first Bluetooth device, a scan request from the second Bluetooth device after the resolvable private address is successfully verified, and sending, by the first Bluetooth device, a response to the second Bluetooth device based on the scan request, wherein the response includes an identifier of the first Bluetooth device, and the response is used to indicate to the second Bluetooth device to upload the identifier to the server and initiate user identity authentication in the server.

2. The method according to claim 1, wherein before the receiving, by the first Bluetooth device, the identity resolving key IRK from the server, the method further comprises:

sending, by the first Bluetooth device, a service subscription request to the server, wherein the service subscription request is used to trigger the server to send the IRK to the first Bluetooth device.

3. The method according to claim 1, further comprising:

receiving, by the first Bluetooth device, a Bluetooth connection request from the second Bluetooth device after the resolvable private address is successfully verified, wherein the first Bluetooth device establishes a Bluetooth connection to the second Bluetooth device; and sending, by the first Bluetooth device, an identifier to the second Bluetooth device through the Bluetooth connection, wherein the identifier is used to indicate to the second Bluetooth device to upload the identifier to the server and initiate user identity authentication in the server.

4. The method according to claim 1, wherein the broadcast message further includes an identifier of the first Bluetooth device; and the sending, by the first Bluetooth device, the broadcast message comprises:

sending, by the first Bluetooth device, the broadcast message, wherein the broadcast message includes the resolvable private address and the identifier, wherein the resolvable private address is successfully verified by the second Bluetooth device pre-configured with the IRK, and the broadcast message is used to indicate to the second Bluetooth device to upload the identifier to the server after the resolvable private address is successfully verified.

5. The method according to claim 1, further comprising:

uploading, by the first Bluetooth device, user identity information to the server;

receiving, by the first Bluetooth device, response information from the second Bluetooth device after the resolvable private address is successfully verified, wherein the response information comprises an identifier; and uploading, by the first Bluetooth device, the identifier to the server, wherein the identifier is used to indicate to the server to complete user identity authentication based on the user identity information and the identifier.

6. The method according to claim 1, further comprising:

uploading, by the first Bluetooth device, user identity information to the server;

receiving, by the first Bluetooth device, a Bluetooth connection request from the second Bluetooth device after the resolvable private address is successfully verified, wherein the first Bluetooth device establishes a Bluetooth connection to the second Bluetooth device; and receiving, by the first Bluetooth device through the Bluetooth connection, an identifier from the second Bluetooth device, and uploading the identifier to the server, wherein the identifier is used to indicate to the server to complete user identity authentication based on the user identity information and the identifier.

7. The method according to claim 1, wherein the identifier comprises at least one of a Bluetooth address of a terminal or a user identifier.

8. A method for mutual recognition between a first Bluetooth and a second Bluetooth device, wherein the second Bluetooth device is pre-configured with an identity resolving key (IRK), and the first Bluetooth device is configured with the IRK, and the method comprises:

successfully verifying, by the second Bluetooth device, a resolvable private address based on the pre-configured IRK in response to scanning a broadcast message from the first Bluetooth device, wherein the broadcast message includes the resolvable private address, and the resolvable private address is generated by the first Bluetooth device based on the IRK from a server; and returning, by the second Bluetooth device, response information to the first Bluetooth device after successfully verifying the resolvable private address, wherein the response information comprises an identifier of the second Bluetooth device, and the response message is used to indicate to the first Bluetooth device to upload the identifier to the server and initiate user identity authentication in the server.

9. The method according to claim 8, wherein the IRK configured in the first Bluetooth device is sent by the server to the first Bluetooth device in response to the server receiving a service subscription request from sent by the first Bluetooth device.

10. The method according to claim 8, further comprising:

uploading, by the second Bluetooth device, user identity information to the server;

sending, by the second Bluetooth device, a scan request to the first Bluetooth device after successfully verifying the resolvable private address, and receiving an answer from the first Bluetooth device based on the scan request, wherein the answer includes an identifier of the first Bluetooth device; and uploading, by the second Bluetooth device, the identifier to the server, wherein the identifier is used to indicate to the server to complete user identity authentication based on the user identity information and the identifier.

11. The method according to claim 8, further comprising:

uploading, by the second Bluetooth device, user identity information to the server;

sending, by the second Bluetooth device, a Bluetooth connection request to the first Bluetooth device after successfully verifying the resolvable private address, wherein the second Bluetooth device establishes a Bluetooth connection with the first Bluetooth device; and receiving, by the second Bluetooth device through the Bluetooth connection, an identifier sent by the first Bluetooth device, and uploading the identifier to the server, wherein the identifier is used to indicate to the server to complete user identity authentication based on the user identity information and the identifier.

12. The method according to claim 8, further comprising:
uploading, by the second Bluetooth device, user identity information to the server, wherein
the broadcast message further includes an identifier of the first Bluetooth device; and
after the successfully verifying the resolvable private address based on the pre-configured IRK, the method further comprises:
obtaining, by the second Bluetooth device, the identifier of the first Bluetooth device, and uploading the identifier to the server, wherein the identifier is used to indicate to the server to complete user identity authentication based on the user identity information and the identifier.

13. The method according to claim 8, further comprising:
sending, by the second Bluetooth device, a Bluetooth connection request to the first Bluetooth device after successfully verifying the resolvable private address, wherein the second Bluetooth device establishes a Bluetooth connection with the first Bluetooth device; and
sending, by the second Bluetooth device, an identifier to the first Bluetooth device through the Bluetooth connection, wherein the identifier is used to indicate to the first Bluetooth device to upload the identifier to the server and initiate user identity authentication in the server.

14. The method according to claim 10, wherein the identifier comprises at least one of a Bluetooth address of a terminal or a user identifier.

15. A method, comprising:
obtaining, by a first Bluetooth device, a Bluetooth address of a terminal of a second Bluetooth device; and
sending, by the first Bluetooth device, verification success information to a server after successfully verifying the second Bluetooth device, wherein the verification success information comprises the Bluetooth address of the terminal, the verification success information is used to trigger the server to send Bluetooth binding information to the second Bluetooth device and a third Bluetooth device, and the Bluetooth binding information is used for Bluetooth binding between the second Bluetooth device and the third Bluetooth device;
wherein the Bluetooth binding information comprises the Bluetooth address of the terminal of the second Bluetooth device, a Bluetooth address of a terminal of the third Bluetooth device, and a Bluetooth communication key link key, and the Bluetooth communication link key is used for encryption and decryption of Bluetooth communication between the second Bluetooth device and the third Bluetooth device; or
the Bluetooth binding information comprises the Bluetooth address of the terminal of the second Bluetooth device, the Bluetooth address of the terminal of the third Bluetooth device, and a Bluetooth communication key link key seed, and the Bluetooth communication link key seed is used by the second Bluetooth device and the third Bluetooth device to generate the Bluetooth communication key link key.

16. The method according to claim 15, wherein the verification success information further comprises an identity resolving key (IRK), and the IRK is generated in response to the first Bluetooth device and the third Bluetooth device performing Bluetooth pairing, and the IRK is configured on the first Bluetooth device and the third Bluetooth device; and
the verification success information is further used to trigger the server to send the IRK to the second Bluetooth device, the IRK is used to trigger the second Bluetooth device or the third Bluetooth device to generate a resolvable private address and send a broadcast message, and the broadcast message includes carries the resolvable private address.

17. The method according to claim 15, wherein
the verification success information is further used to trigger the server to generate and send an identity resolving key (IRK) to the second Bluetooth device and the third Bluetooth device, the IRK is used to trigger the second Bluetooth device or the third Bluetooth device to generate a resolvable private address and send a broadcast message, and the broadcast message includes the resolvable private address.

* * * * *